US008401956B2

(12) United States Patent
Mott

(10) Patent No.: US 8,401,956 B2
(45) Date of Patent: *Mar. 19, 2013

(54) SYSTEM AND METHOD FOR TRANSFERRING LONGEVITY RISK

(76) Inventor: Antony R. Mott, New York, NY (US)

(*) Notice: Subject to any disclaimer, the term of this patent is extended or adjusted under 35 U.S.C. 154(b) by 170 days.

This patent is subject to a terminal disclaimer.

(21) Appl. No.: 12/959,316

(22) Filed: Dec. 2, 2010

(65) Prior Publication Data

US 2011/0137686 A1 Jun. 9, 2011

Related U.S. Application Data

(63) Continuation-in-part of application No. 11/889,411, filed on Aug. 13, 2007, now Pat. No. 7,870,061.

(51) Int. Cl.
*G06Q 40/00* (2012.01)
(52) U.S. Cl. .......... 705/37; 705/35; 705/30; 705/36; 705/38; 705/4
(58) Field of Classification Search ............. 705/30, 705/35, 36, 37, 38, 4
See application file for complete search history.

(56) References Cited

U.S. PATENT DOCUMENTS

| | | | | |
|---|---|---|---|---|
| 2002/0042770 | A1* | 4/2002 | Slyke et al. | 705/37 |
| 2002/0178102 | A1* | 11/2002 | Scheinberg et al. | 705/37 |
| 2005/0086156 | A1* | 4/2005 | Conroy et al. | 705/38 |
| 2006/0265296 | A1* | 11/2006 | Glinberg et al. | 705/35 |
| 2007/0219883 | A1* | 9/2007 | Bronsnick et al. | 705/35 |

* cited by examiner

*Primary Examiner* — Tien Nguyen
(74) *Attorney, Agent, or Firm* — Jennifer Meredith, Esq.; Meredith & Keyhani, PLLC

(57) ABSTRACT

A method for transferring longevity comprising: receiving an order to trade a financial instrument associated with at least one asset or liability affected by longevity risk; calculating a morbidity description for at least one age of each individual, a survivorship distribution and a mortality distribution, a net cash flow projection distribution, where each distribution value in the net cash flow projection distribution is computed as the probability-adjusted cash in-flow expected over a period, less the probability-adjusted cash out-flow expected over the same period; calculating a net present and net forward value distribution; accepting starting and ending dates over which counterparties wish to exchange the difference to provide at least one exposure period; accepting an input for computing a performance bond; receiving through a computing device, over time, updated mortality information and morbidity information; and recalculating distributions affected to provide recalculated distributions; calculating the difference to be exchanged.

17 Claims, 56 Drawing Sheets

SYSTEM AND METHOD FOR TRANSFERRING LONGEVITY RISK

This application is a continuation-in-part of application Ser. No. 11/889,411 filed Aug. 13, 2007 now U.S. Pat. No. 7,870,061 and entitled "System and Method for Transferring Longevity Risk."

The present application relates to methods for transferring risk in financial instruments, and more particularly, to transferring mortality-based longevity risk. Mortality-based longevity risk affects many types of financial instruments, such as life settlements. Life settlements pertain to life insurance policies that are sold by insured individuals to an investor—usually for more than the surrender value offered by the insurance company. The investor takes over responsibility for paying the premiums and becomes the beneficiary of the policy, receiving the face-value (i.e., death benefit) of the policy when the insured individual dies.

Pools of life settlements can be significantly affected by face-value variance risk and longevity risk or, put simply: who dies when. Face-value risk arises when the insured individuals underlying a pool of life settlements have policies with differing face values. Face value variance risk is sometimes called severity risk or event risk.

To illustrate each risk, one can first look at what happens if there is neither face-value risk nor longevity risk. FIG. 1 shows the most probable cash flows generated by a typical pool of $1 billion worth of life insurance written on 300 or so health-impaired individuals.

Typical pools of life settlements, including this example, start as negative yield assets. For the first year or two, nearly all the individuals are expected to remain alive and therefore the premiums must be paid to keep the policies in force. If one paid $200 million (⅕th of face value) for a pool, and yearly premiums average 5% of face value, then one will pay close to $50 million a year just to maintain the investment—at least for a few years.

Longevity risk leads to excess return or loss when the actual mortality experience of a pool differs from projected. Usually lumped together, there are actually two types of longevity risk: alpha-longevity risk and beta-longevity risk, with one compounding the other. Alpha-longevity risk arises from information asymmetries between market participants, and is akin to the alpha technical risk ratio used in the stock markets. Beta-longevity risk is the sensitivity of pool returns to changes affecting general population longevity, and parallels the beta technical risk ratio used in the stock markets.

To contrast one type of longevity risk with the other, consider a pool of life settlements linked to 300 insured individuals, each of whom is health-impaired. One might expect the pool's 300 health-impaired individuals to live, on average, 8 years, while 300 people drawn at random from the general population might live 11 years.

An example of alpha-longevity risk is the risk that one has miscalculated the degree of health impairment, or maybe a drug is invented that helps manage or cure the specific impairments of the insured individuals linked to the pool, with the result that the insured linked to the pool live 10, and not 8, years. An example of beta-longevity risk is the risk of an unexpected increase in longevity of the general population so that the individuals linked to the pool live perhaps 8.1, not 8, years.

Not only is alpha-longevity risk greater than beta-longevity risk, but also the two risks aren't necessarily correlated, and there is basis risk between them.

Medical underwriters have the job of predicting life expectancies. If a medical underwriter states that the pool has a life expectancy of 11 years, then approximately half the insured individuals will be living at the start of the 12th year. Relying on these predictions introduces both types of longevity risk.

If the pool's cash flows depended on the lives of 10,000 individuals, one might reasonably expect the smooth and predictable cash flows illustrated above in FIG. 1. Yet the pool's cash flows depend on the lives of 300 or so individuals. FIG. 2 illustrates what happens when one adds a dose of realism into the modeling.

The degree of randomness of the path is the thing to note here, not the path itself, which is just one of a near infinite number of possibilities modeled, using a combination of actual results from similar pools and stochastic techniques.

The only source of variance introduced so far comes from a lack of diversity, and the chaotic cash flow projections in FIG. 2 arise even if the medical underwriter does a perfect job and one knows for certain the average life expectancy of the pool.

Medical underwriters do not generally have enough data to do a perfect job. Systematic under- or overestimation of life expectancies is called table bias. For clarity, the next few figures show the effect of table bias on cash flow, and ignore the ever-present and compounding effect of random variance.

FIG. 3 illustrates mean-extension, which is to say that the insured linked to the pool generally live longer than the medical underwriter expects.

Mean-extension nearly halves the net present value (NPV) because the pool owner will receive cash later—and pay premiums longer—than thought.

Even if the medical underwriter correctly predicts the average life estimate, other less-obvious forms of table bias will, if overlooked, lead one to over- or underestimate the pool's NPV.

FIG. 4 shows how NPV is affected when there are fewer early mortalities than expected, an acceleration of mortalities in the middle of the pool's life, and fewer mortalities toward the end of the pool's life. The average life expectancy alone fails to warn that the NPV of the pool is nearer to $150 million than $200 million.

To help an investor better value the pool, the medical underwriter might draw the distribution for the investor, or include three other statistical measures: standard deviation, kurtosis, and skewness. Whereas standard deviation measures how tightly a distribution is clustered, kurtosis describes the degree of "pointiness" or "flatness" of a distribution, and skewness measures its lopsidedness. Statisticians refer to the shape of the distribution in FIG. 4 as leptokurtic, which roughly translates to "thinly bulging."

FIG. 5 illustrates the inverse form of table bias to that of FIG. 4. Without knowing the standard deviation and kurtosis, one doesn't realize that the NPV of the pool is higher than one thinks it is. Statisticians refer to the squished-looking distribution in FIG. 5 as platykurtic, which means "broadly bulging".

The variance in NPV illustrated by FIGS. 3 through 5 highlights the potential dangers in the standard industry practice of simplifying mortality distributions to a single number: the average. A mortality distribution, like any probability distribution, is a range concept, and all but the most basic require more than one statistic for proper description.

As mentioned above, alpha longevity risk arises from information asymmetries among market participants. Life settlement investors think they'll make money from insurance companies through the investors' special skills in actuarial science. However, insurance companies are also knowledgeable about actuarial science.

1. Insurance companies, intermediaries, and investors are concerned about life settlement buyers arbitraging the insurance company's lapse-based pricing model. For certain policy types, lapse rates approach 80% so the insurance company's apparent vulnerability appears to be a compelling opportunity for investors. Less widely known is that the policies written on seniors—those most likely to wind up as life settlements—can have lapse rates as low as 9%, which is a far cry from 80%. If the arbitrage is thinner than thought, the insurance company needs only to raise premiums a little to level the playing field, or even gain the upper hand.

2. Some investors assume that if the individual is health-impaired, the policy must have value. Only if the insured has become unexpectedly impaired after the policy was issued does this make sense, and aging is not unexpected. If the individual already was health-impaired when the policy was issued, then the investor is betting that the insurance company either didn't do its underwriting properly, or assumed a high lapse rate.

3. Some investors are looking at "carrier approved" premium-finance origination programs, where the insurance company is apparently aware of the high probability that the life insurance policies will be sold as life settlements. Shareholders of insurance companies are unlikely to let management write new business that will destroy shareholder value. Unless insurance companies have higher costs of capital than life settlement investors, an investment in policies that are supposedly part of carrier-endorsed origination programs may have high alpha longevity risk—unfavorable to the investor.

4. Some investors think that life settlements constitute such a small portion of the insurers' business, that insurers don't care to do much about the problem, and that insurance companies are generally slow to react to a changing marketplace that creates opportunities for investors. Insurance companies have demonstrated both that they can care greatly about small sections of their business, and that they are able to react swiftly. In the 1990s, the viaticum market (predecessor of today's senior life settlement market) was all but wiped out, in part through medical advancements, but mainly through the introduction, by insurance companies, of the accelerated death benefit that is now included in most life policies.

5. Investors value a life settlement based, in part, on the impairment opinion prepared by one or more medical underwriters. The impairment opinion is based on available medical records, so a major risk to investors is the degree to which medical records do not accurately portray the health status of an individual. This is not the risk that medical records may be falsified, but the risk that they may have only limited value. For example, doctors may indicate a condition exists even when they are not too sure. Conservative diagnoses are in line with most doctors' motivation to care for patients (not investors), and avoid a negligence suit later for failing to alert a patient to the possibility of an illness or condition.

6. Medical underwriters can and do make unsystematic and systematic errors. The effects of unsystematic errors are minimized by increasing the number of unique insured underlying the pool. The effects of systematic error, or table bias, can dramatically impact the net present value of the pool as explained above.

Many policies do have value as life settlements. However, two other Non longevity-related hurdles may affect the value: 1) the intermediaries who represent the insured also know that the policy has value; and 2) only three out of four dollars will get past the intermediaries as invested capital, so one's investment has to increase in value by one third just to break even.

Techniques to manage longevity risk include insurance and annuities, as well as new derivatives that may provide cheaper, more liquid alternatives to insurance.

Barring a cure for old age, a worldwide plague, or other global catastrophe, the chance of a small increase in longevity is closer to a certainty than a risk. Beta-longevity risk can, therefore, be managed simply by increasing the number of insured individuals underlying the pool of life settlements.

Alpha-longevity risk is not necessarily reduced through diversification, so one of the few options available to the investor is the purchase of longevity-extension insurance.

Issuers of longevity-extension insurance—otherwise known as a mortality wrap—charge the pool owner an up-front fee as high as 30% of the pool's market value. The wrap issuer agrees to purchase any outstanding polices on a future date, for an agreed value, which is usually less than the face value.

The future date is usually the pool's average life expectancy—as determined by the issuer, not the pool owner—with a couple of years tacked on for good measure. Some issuers require the owner to prepay all premiums that would fall due before the exercise date. If the average life expectancy of the pool is 10 years, then the pool owner must wait 12 years before exercise. The credit rating of the issuers is sometimes lower than AA, or the issuer may be unrated.

One might wonder why mortality wraps are so expensive. Early pool owners had more information about the insured than the issuer of the wrap, so the owners used the additional information to select the insured with a higher likelihood of outliving their life estimates. Also, sellers of policies had more information about their own health than the pool owners. Compounding the problem further was that medical underwriters had little experience forecasting the mortality of people who choose to sell their life insurance to strangers. The result was that the insured tended to outlive their life expectancies, and the wrap issuers lost money. Some issuers refused to pay, blaming the medical underwriters, so the pool owners lost, too. Today's wrap issuers are aware they'll be the targets of adverse selection, and price accordingly.

Another technique is for a pool owner to purchase an annuity to partially offset premium payments. The expected yield on the combined asset may be close to, or below, LIBOR.

Mortality wraps and annuities have been around for several years, but newly launched longevity indices are paving the way for derivative transactions, because the indices can be used as a reference value against which to settle trades. Most indices were launched by institutions whose customers are affected by longevity risk.

Longevity indices allow derivatives and hedging strategies that settle yearly—sometimes more frequently—rather than pay out once in 10 or 12 years. Some market participants who might wish to make markets in longevity risk would prefer shorter-dated exposure. A series of short-dated derivatives based on these indices could provide an alternative to mortality wraps.

The Credit Suisse Longevity Index, released in December 2005, is designed to enable the structuring and settlement of longevity risk transfer instruments, such as longevity swaps and structured notes. Credit Suisse expects their index to spur the development of a liquid, tradable market in longevity risk, as it provides a standardized measure of the expected average lifetime for general populations, based on publicly available U.S. statistics. The index includes both historical and forward values, and is released annually.

JPMorgan launched its LifeMetrics Index$^{SM}$ in March 2007. An international index designed to benchmark and trade longevity risk, the index is part of a platform aimed at measuring and managing both longevity and mortality exposure. The index will enable pension plans to calibrate and hedge the risk associated with the longevity of their beneficiaries. The index incorporates historical and current statistics on mortality rates and life expectancy, across genders, ages, and nationalities.

However, the existing techniques to manage longevity risk suffer from many disadvantages. For example, mortality guarantees or puts are expensive, require upfront cash, make the credit rating of the guarantor critically important, do not solve intermediate cash short-fall problems, and generate a solution that pays out years from now, with no mark-to-market. SPIA (Single Payment Immediate Annuity) or other forms of annuity to partially or fully offset liability to pay premiums are expensive, may hinder individual policy sales as usually annuities are sold as a package, and cannot be sold per policy. With fixed-for-floating yield swaps, pools consume cash for early years, then eventually generate net cash. As a result, the fixed payer is disadvantaged in the early years. They are prone to credit rating problems and are not fungible, as the deal is asymmetric for years. Securitization and tranching are expensive and lock up policies for the entire term. With some techniques, investors learn of personally identifiable information when they don't need that information. And, as explained above, using life expectancies to price life settlements are insufficient to describe mortality distributions, because they are more or less the mean of a mortality distribution. Two different mortality distributions can have identical means, yet different timing of cash flows, leptokurtic, skew and polymodal considerations, standard deviation and other moments about the mean are not taken into account well.

DETAILED DESCRIPTION

The present disclosure teaches an implementation of a cash flow swap that transfers longevity risk associated with one or more mortality-affected assets or liabilities. With this cash flow swap, counterparties agree to exchange the difference between the asset or liability's forecasted, or expected, cash flow stream and its realized, or actual, cash flow stream for a predetermined period of time. The predetermined period of time includes one or more calculation periods that each last less than the term of the one or more assets or liabilities.

Figure 1:
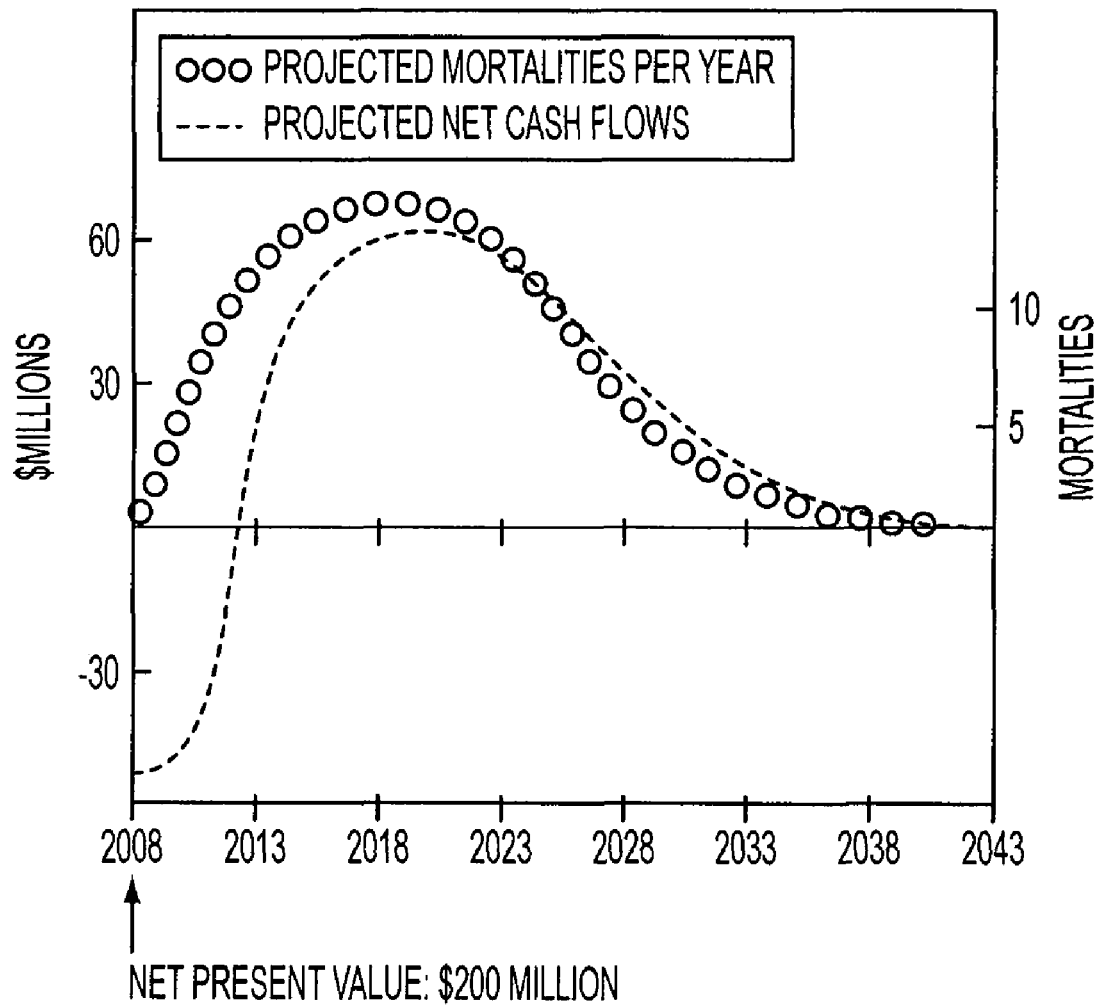
FIG. 1 is a graph of an example of projected cash flows to an owner of a pool of life settlements.
Figure 2:
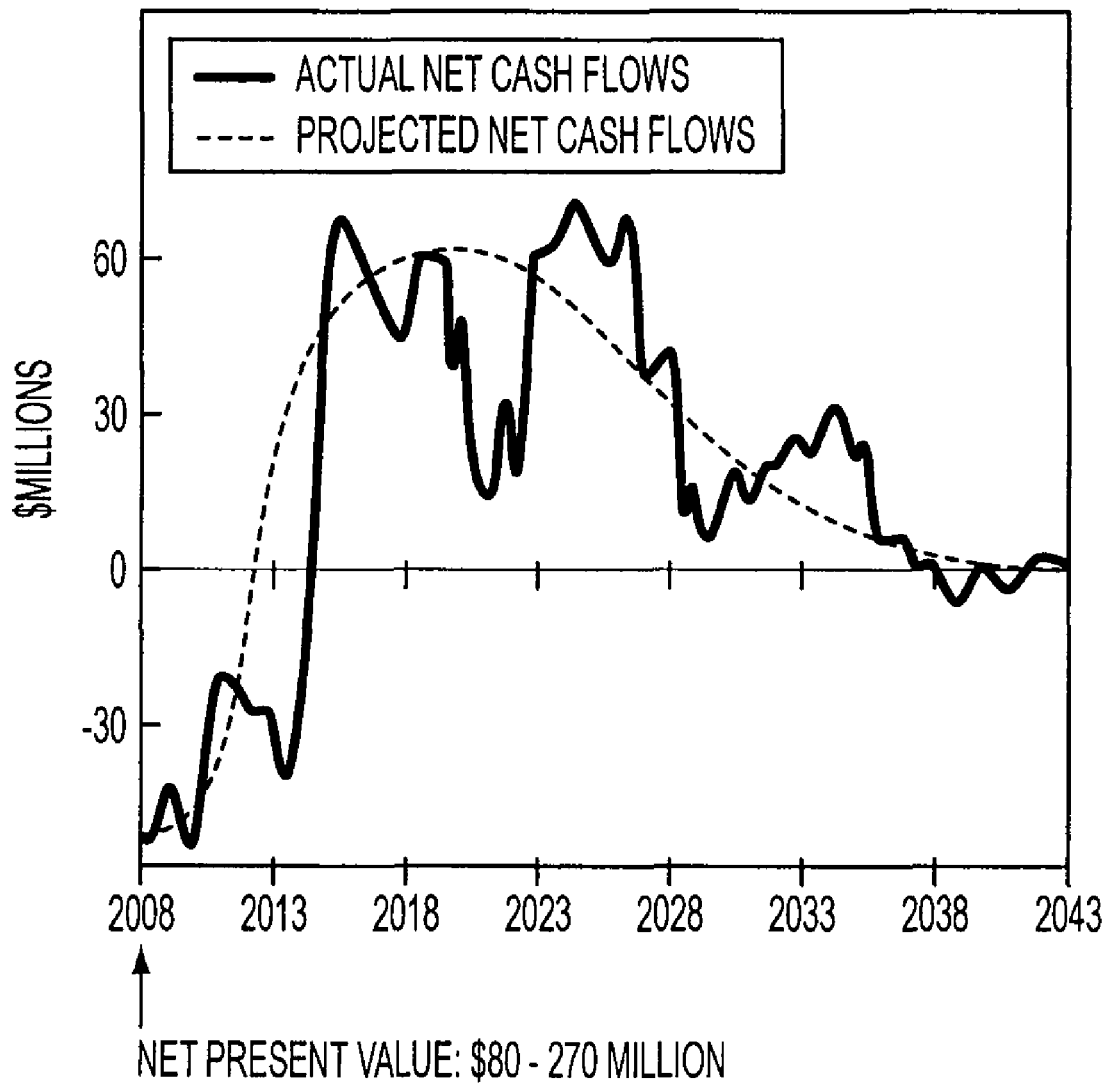
FIG. 2 is a graph of an example of projected and actual cash flows.
Figure 3:
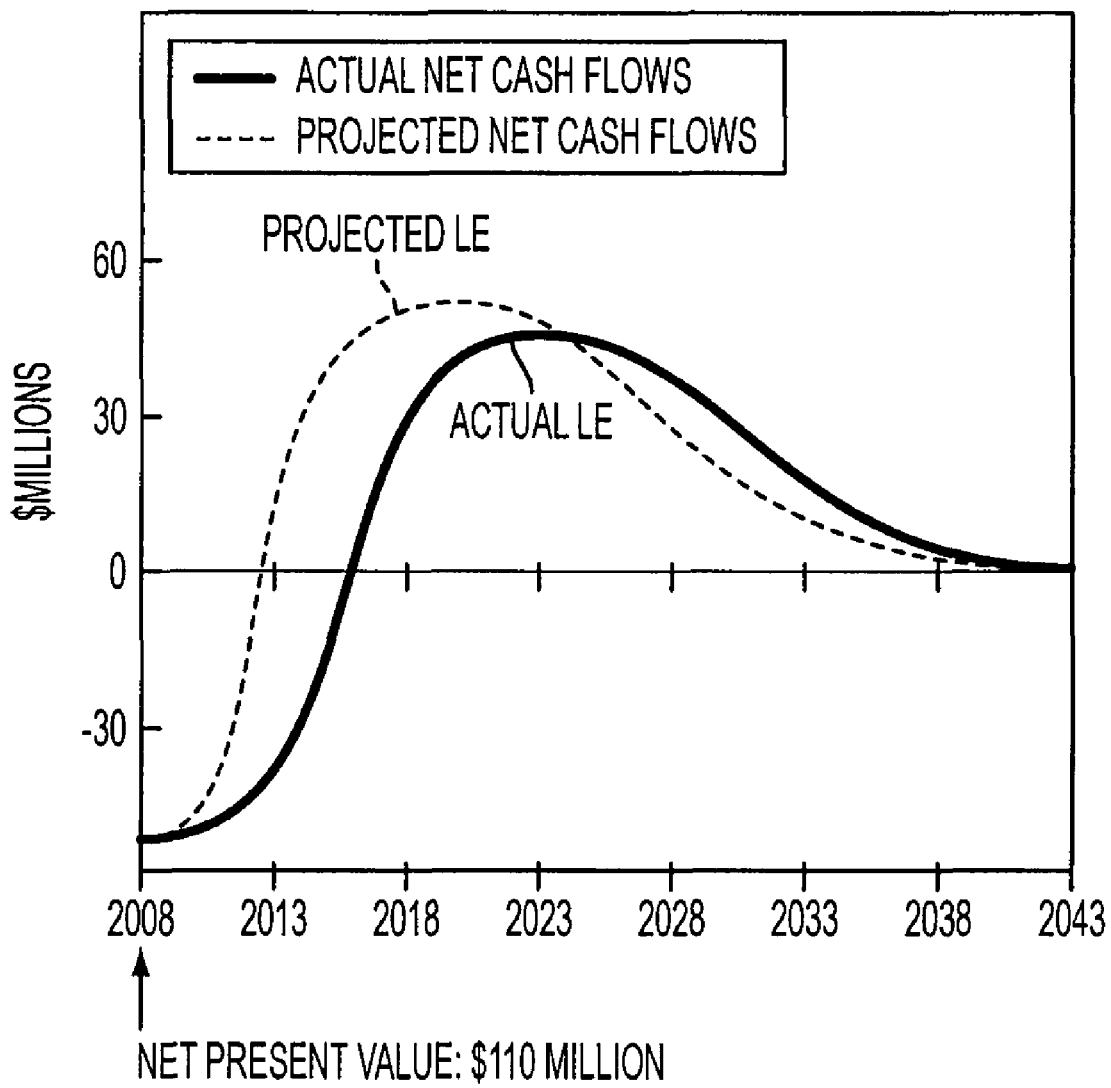
FIG. 3 is a graph of an example of projected cash flows understating life estimates.
Figure 4:
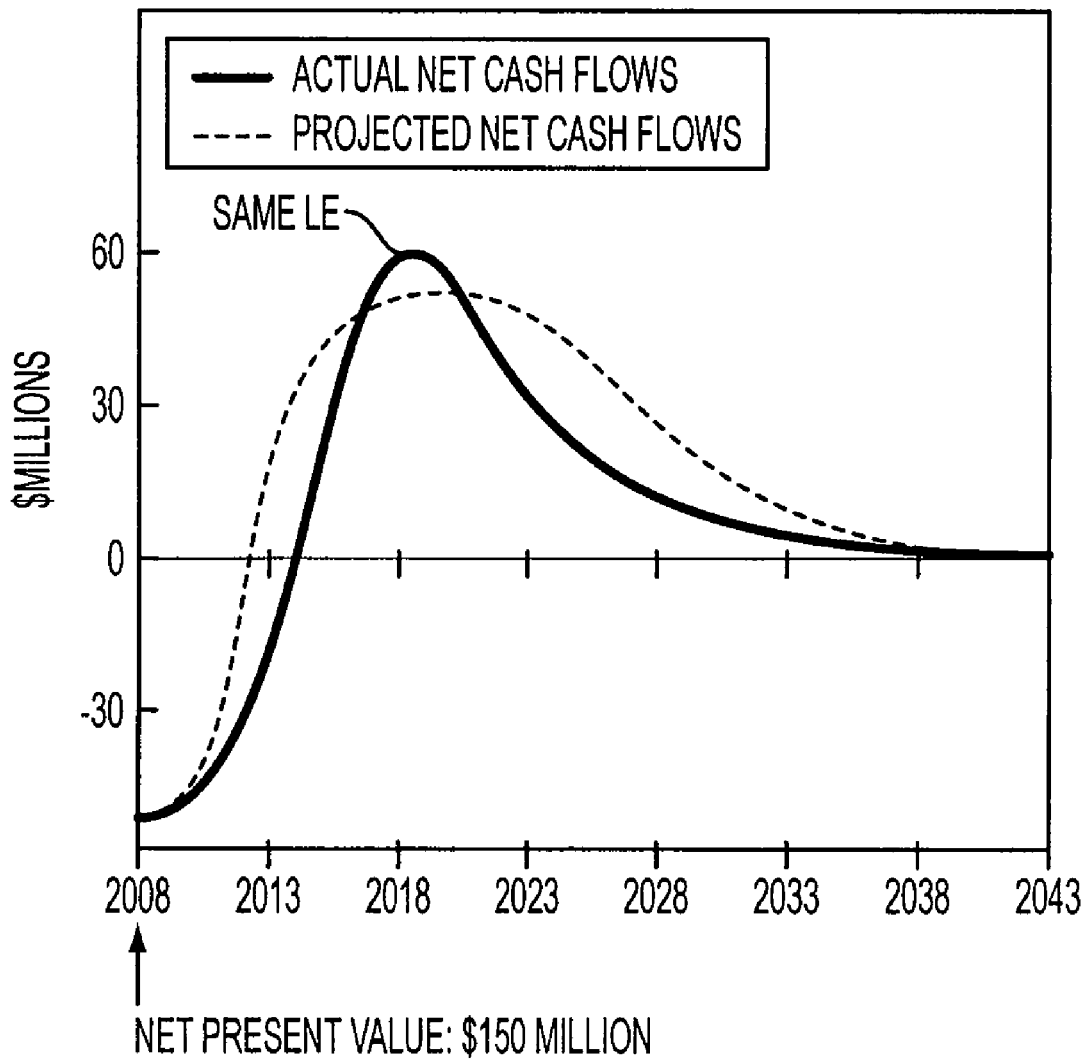
FIG. 4 is a graph of an example of a leptokurtic cash flow distribution.
Figure 5:
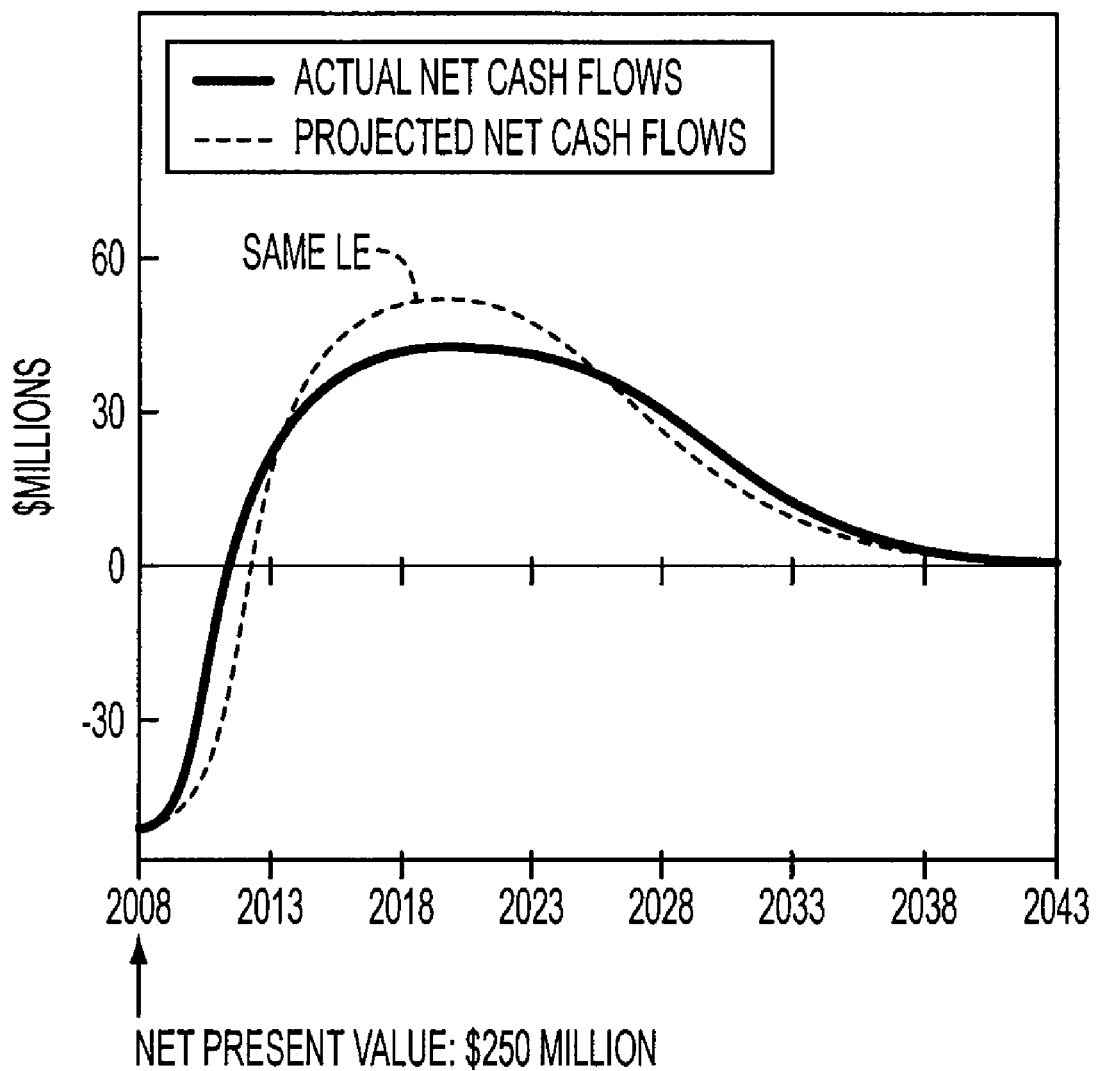
FIG. 5 is a graph of an example of a platykurtic cash flow distribution.
Figure 6:
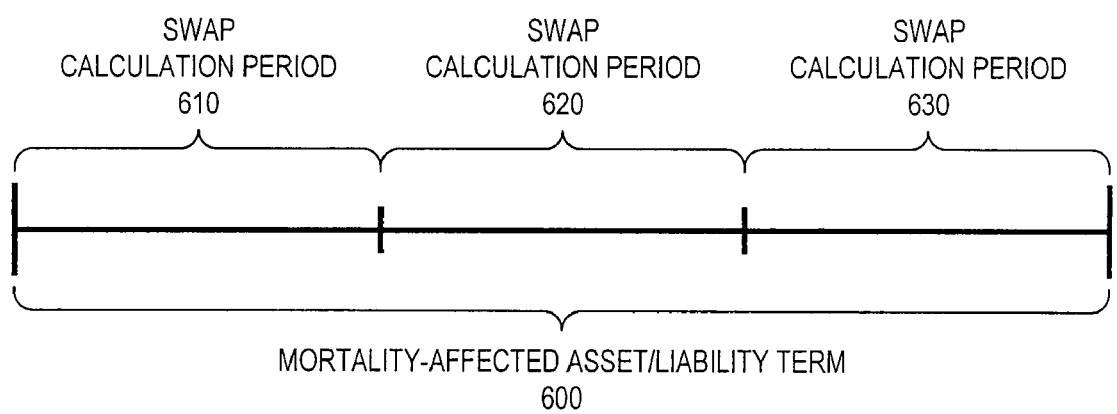
FIG. 6 is a diagram of an example of mortality-affected asset/liability term divided into swap calculation periods.

FIG. 6 depicts an example of successive swap calculation periods 610, 620, 630 that are divided among asset/liability term 600. The asset/liability may include any asset/liability affected by longevity risk including, for example, annuities, life insurance policies, life settlement contracts, long term health contracts, pension funds, and any equity, debt hybrid or derivative instrument whose value is linked to any of the foregoing. An embodiment described below includes a pool of life settlement contracts.

Figure 7:
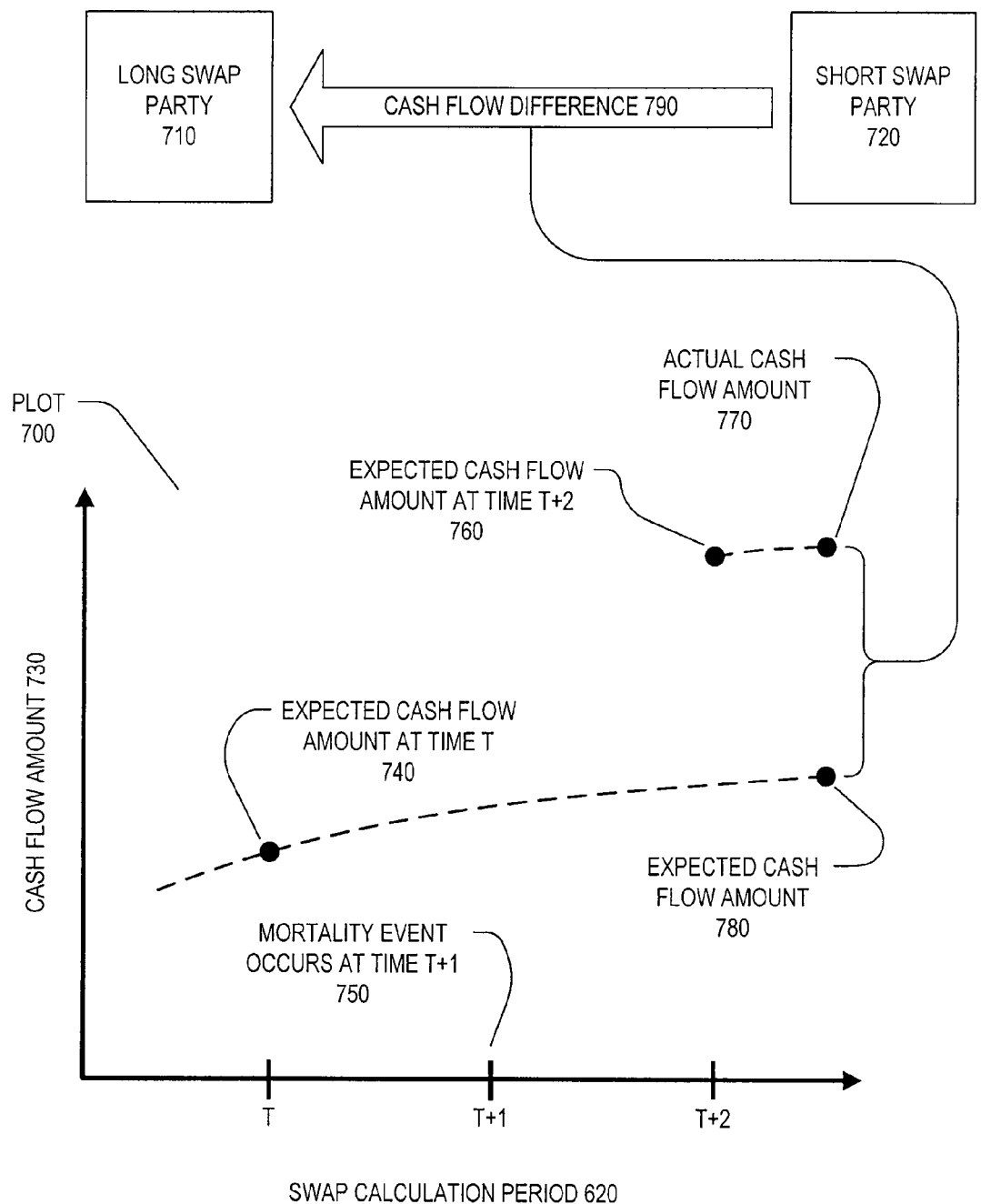
FIG. 7 is a diagram of an example of a cash flow swap favoring a long party to the swap.
Figure 8:
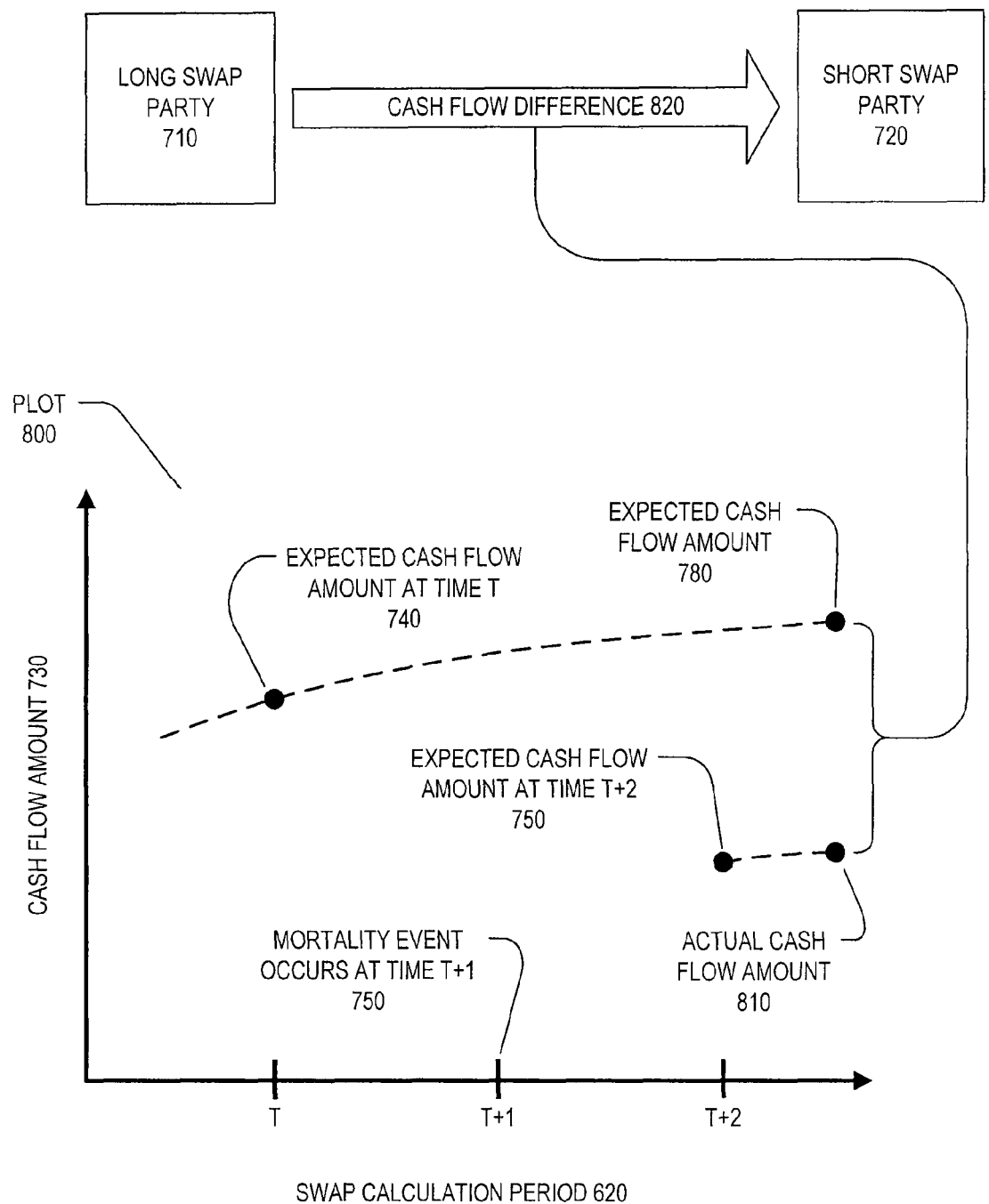
FIG. 8 is a diagram of an example of a cash flow swap favoring a short party to the swap.

FIGS. 7 and 8 illustrate examples of a cash flow swap favoring the long and short party, respectively, during swap calculation period 620. The "long" swaps party—the one who buys the swap—gains when more people die throughout a particular swap calculation period (e.g., six months) than expected. The "short" swaps party—the one who sells the swap—gains when more people live through a particular swap calculation period than expected. Settlement may occur at some time period, such as 45 or 60 days, after the calculation period ends, to account for the time it may take to ensure all relevant mortality information that happened during the calculation period has been received and processed by the system.

As shown in plot 700 of FIG. 7, if actual cash flow amount 770 is determined to be higher than expected cash flow amount 780, short swap party 720 becomes indebted to long swap party 710 for the amount of cash flow difference 790. Conversely, as shown in plot 800 of FIG. 8, if actual cash flow amount 810 is determined to be lower than expected cash flow amount 780, long swap party 710 becomes indebted to short swap party 720 for the amount of cash flow difference 820.

For the sake of simplicity, plots 700 and 800 depict simple situations to illustrate how a mortality event, occurring during swap calculation period 620, can affect the expected and actual cash flows. For example, at time T in plot 700 the original expected cash flow is shown by point 740. If everything went as expected throughout the remainder of calculation period 620 (i.e., no unexpected cash inflows or outflows), then the actual cash flow amount at the end of period 620 would be equal to expected cash flow amount 780, and no cash flow swap would have been incurred by either party.

However, if a cash inflow occurs due to a mortality event at time T+1 (point 750), the system would recalculate an adjusted expected cash flow stream that takes that cash inflow into account. At time T+2, the expected cash flow is at point 760 along the newly generated cash flow stream. Since no further event occur in period 620, that expected cash flow becomes the actual cash flow amount shown at point 770. FIG. 8 depicts the same situation, except that the mortality event causes a cash inflow instead.

Figure 9:
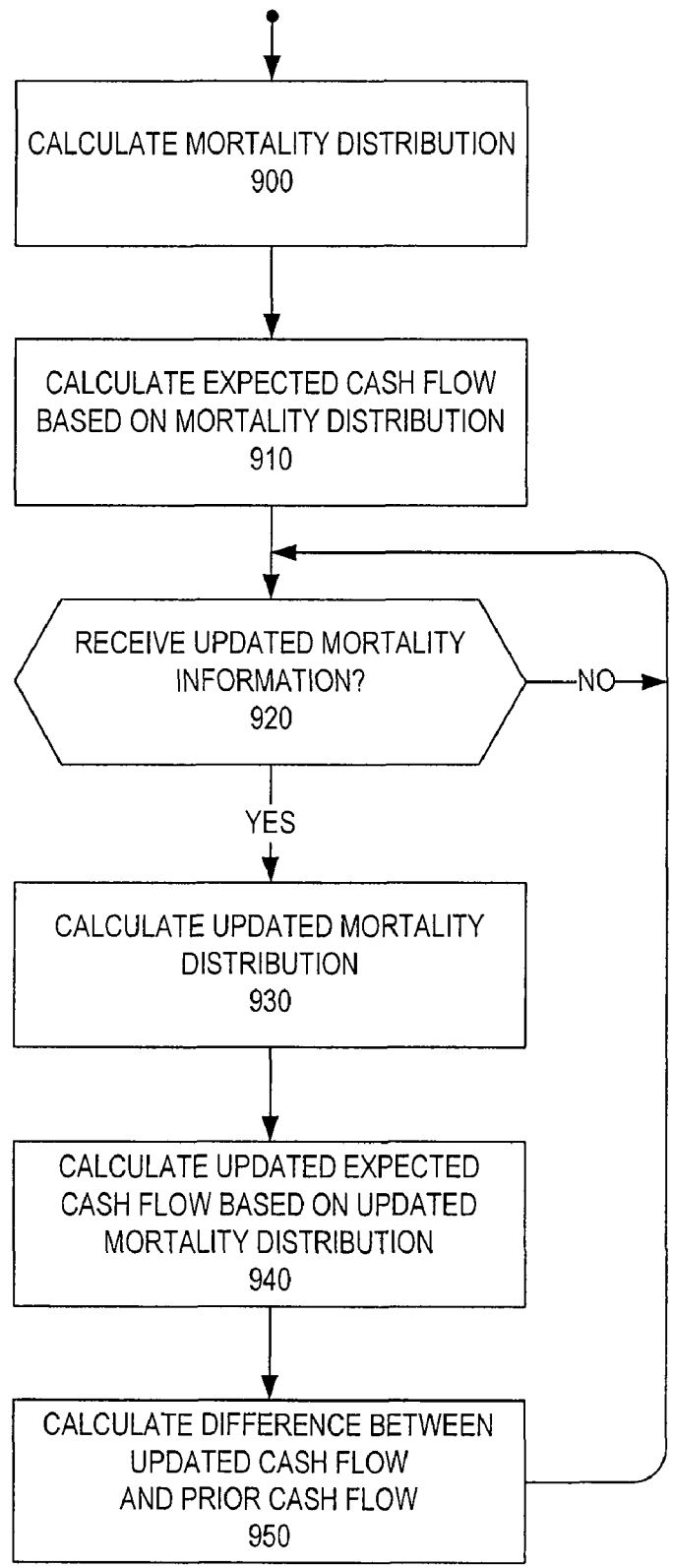
FIG. 9 is a flow chart of a process for calculating differences between expected and actual cash flows.

FIG. 9 illustrates how a trading system may calculate the differences between expected and actual cash flows. The system first calculates a mortality distribution (step 900) associated with the persons upon whom the longevity risk is based. This distribution is based upon the current mortality information available to the system at the time. Then the expected cash flow is calculated based on that distribution (step 910). Whenever the system receives updated mortality information (step 920), it then recalculates the mortality distribution taking the new information into account (step 930), and subsequently calculates an updated expected cash flow based upon the updated mortality distribution (step 940). At this point the system can calculate the difference between the updated cash flow and prior cash flow which reflects that amount to be transferred between parties of the swap (step 950).

This difference calculation can occur at anytime prior to the end of the swap calculation period or some date after that is sufficient to have gathered information necessary to determine whether mortalities took place. The system computes the net present value of the cash flow difference as it is projected to be at the end of the calculation period, discounted by a specified interest rate.

Figure 10:
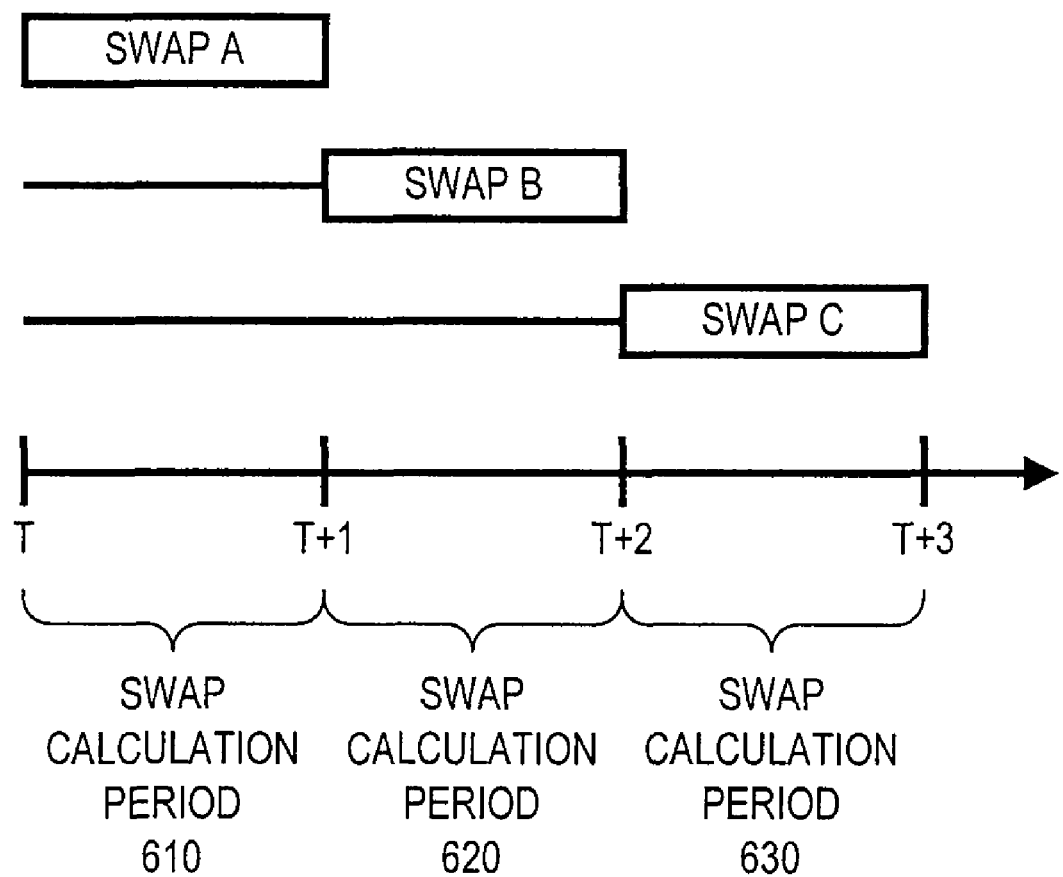
FIG. 10 is a diagram of several swaps.

FIG. 10 illustrates how counterparties to a future swap can have exposure to actual and expected cash flow changes that occur prior to the swap calculation period. For example, if a mortality event causes a cash inflow during calculation period 610, then the counterparties to swap will clearly be exposed to the cash flow difference due to that event. However, because that mortality event causes an adjustment to the mortality distribution that extends through the term of the underlying asset/liability, the expected cash flows associated with the counterparties to swaps B and C will be readjusted along with the mortality distribution adjustment. If the cash flow difference exceeds a predefined level, for example, some of the counterparties to swaps B and C may need to payout prior to entering their respective calculation periods.

Figure 11:
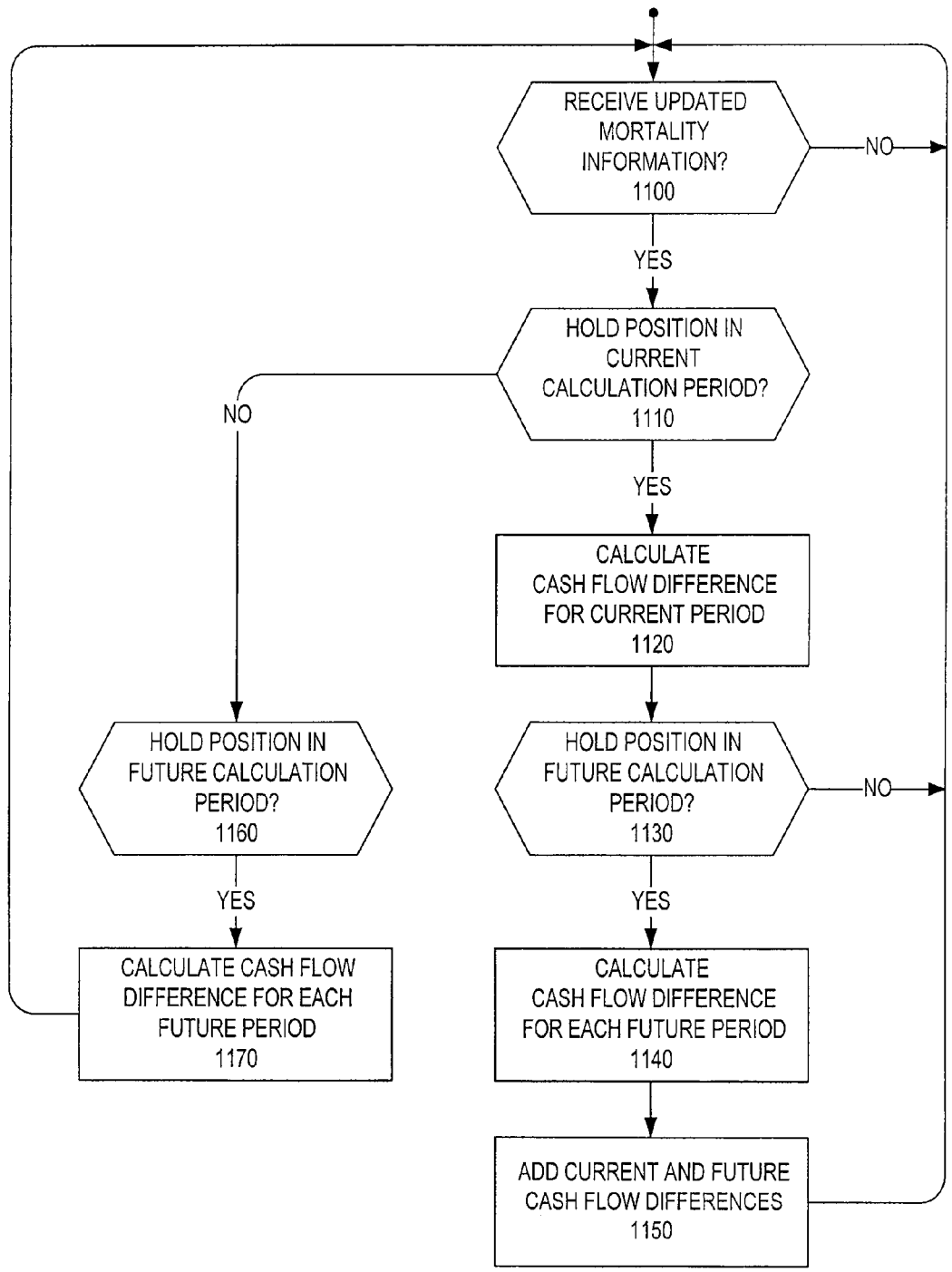
FIG. 11 is a flow chart of a process for calculating differences between expected and actual cash flows.

FIG. 11 depicts an example of this situation, in which the system calculates the cash flow differences for those who hold current and future swap positions. After mortality information is received (step 1100), if a counterparty holds a position in a current calculation period (1110), the system calculates the cash flow difference for the current period (step 1120). In addition, if the counterparty holds a position in a future calculation period (1130), the system calculates the cash flow difference for each future period (step 1140) and adds it to the cash flow difference for the current period (step 1150). And if the counterparty does not hold a position in a current calculation period but does hold a position in a future calculation period, then the system calculates the cash flow difference for each future period (1170).

The swaps may allow for additional assets or liabilities to be added to or removed from the mix during any calculation period. For example, assets or liabilities may be added in order to extend the term of the pool, whereas assets or liabilities may be removed to ensure that foul play is not rewarded. The system may, depending on the nature of the swap agreement with the counterparties, either include the new assets or liabilities to all subsequent future cash flow calculations, or treat all future cash flow calculations as if the newly added assets or liabilities were never added.

Mortality information may include either an occurrence of an event, such as a death of a person that affects the cash flow of the asset/liability for example, or the non-occurrence of an event, such a lack of such a death that may have been expected, for example. In plot 900, the discontinuity of expected cash flow streams 920 and 930 show that updated mortality information was determined to be different than expected, causing the system to readjust the expected cash flow streams for their subsequent calculation periods.

Figure 12:
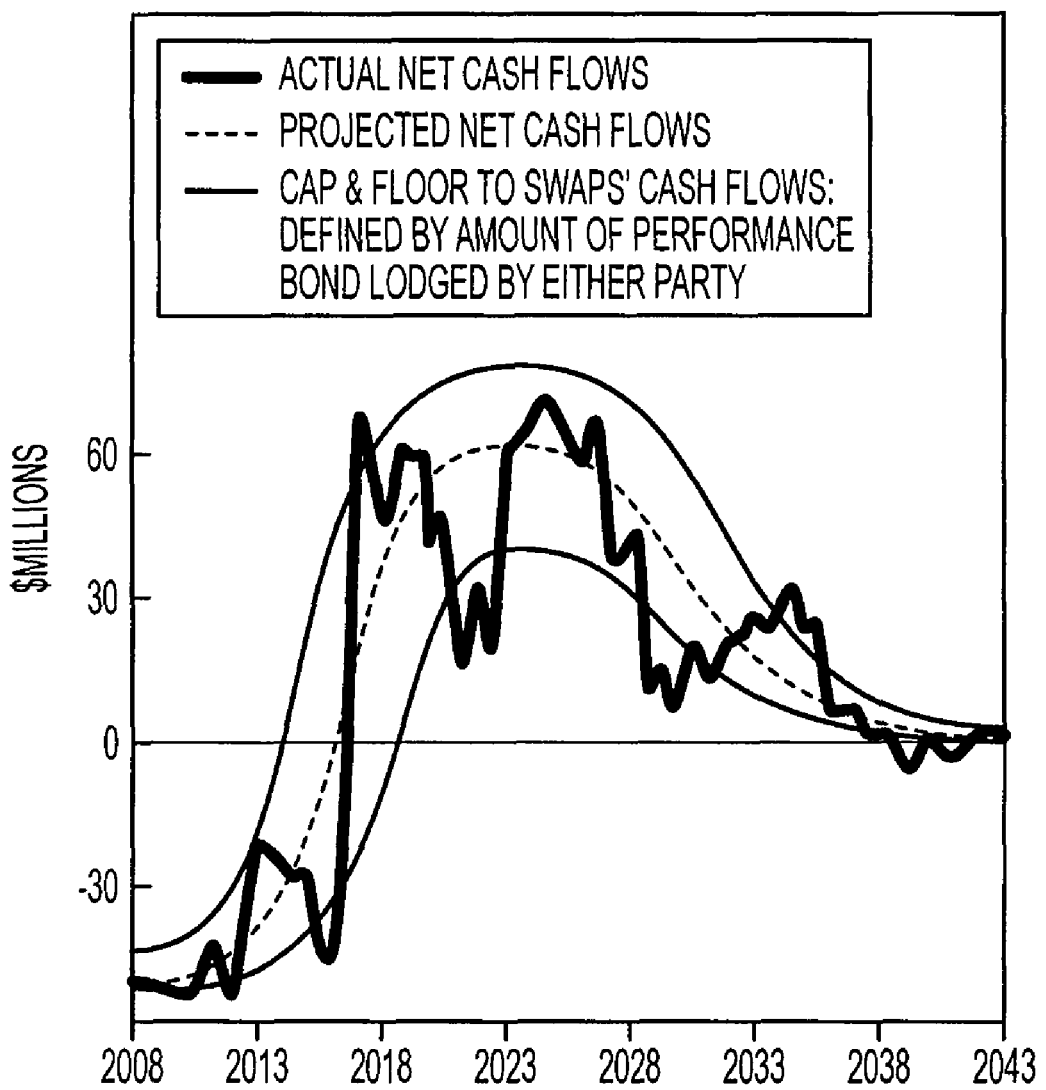
FIG. 12 is a graph of an example of projected and actual cash flows.
Figure 13:
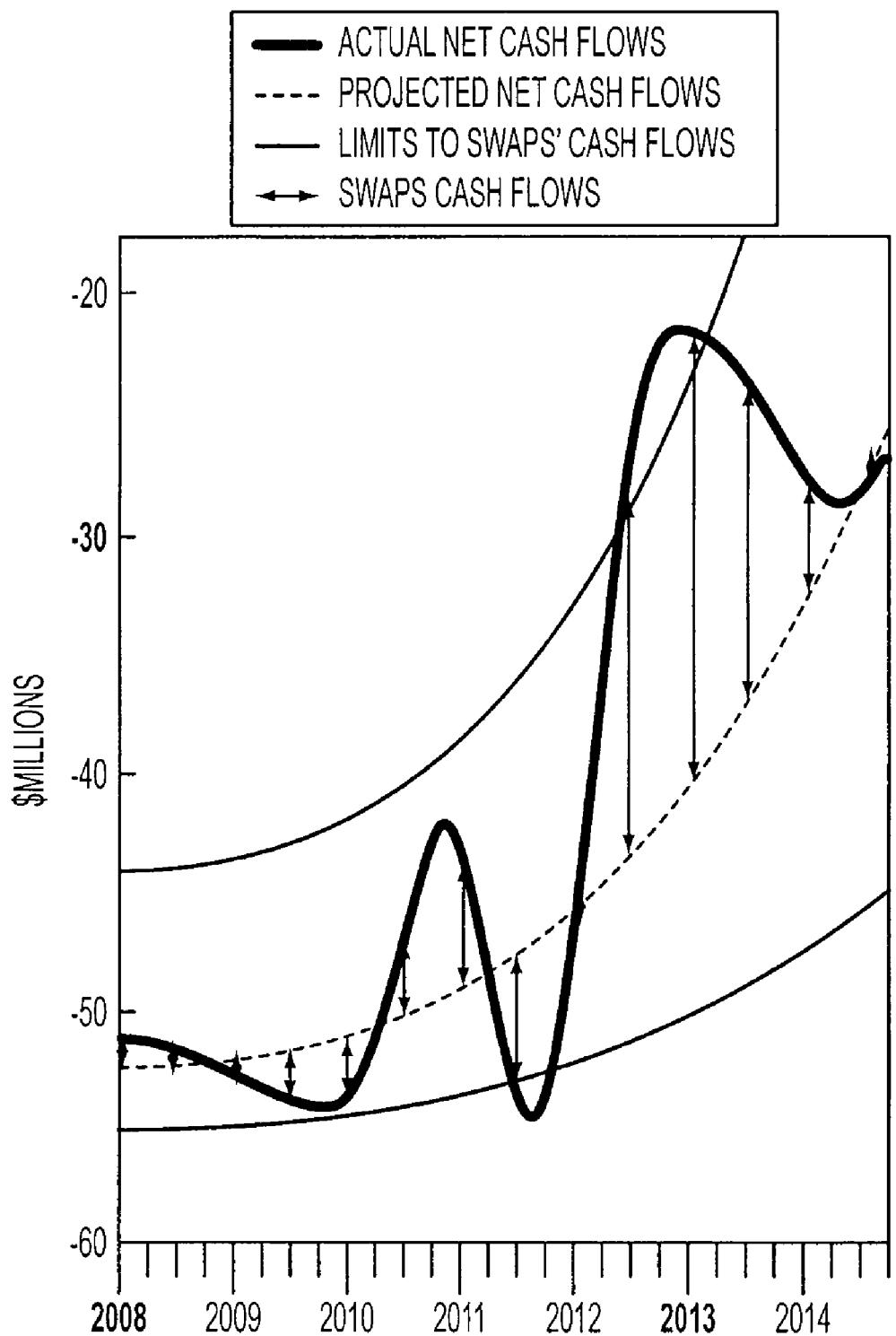
FIG. 13 is a graph of an example of projected and actual cash flows.
Figure 14:
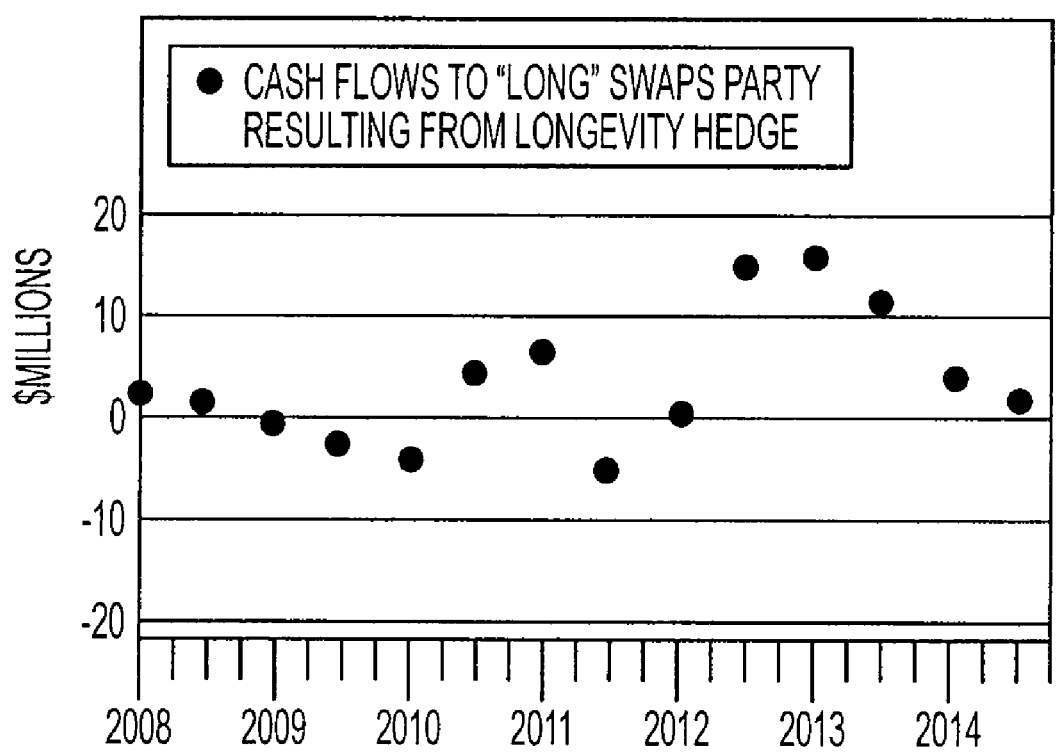
FIG. 14 is a graph of an example of actual cash flows.

In the example embodied by FIGS. 12-14, estimated net cash flows to a pool of life settlements, annuities, or other assets affected by alpha longevity risk are clustered into six-month (a period balancing useless volatility if too short and credit asymmetry if too long) partial sums, and the net present value of each sum becomes the reference value for a swap. For a pool expected to fully mature in 20 years, there would be 40 calculation periods, all issued day 1, yet corresponding swap terms could varying from 6 months to 20 years. As time goes by, differences between actual and projected cash flow cause predictable yet unequal changes to all reference values: the near term change more than the long term. Changes to reference values alter the market value of dependent swaps. When combined together, the swaps allow market participants to hedge calculations as short as 6 months and as long as the asset's duration, as well as enable yield-conversion strategies.

FIGS. 12 and 13 further illustrate how short-dated pool-specific longevity swaps work. Each swaps party's loss is limited by the dollar value of performance bond lodged by the other swaps party. FIG. 14 illustrates the actual cash flows to the long swaps party, for a 6.5 year swap (made up of 13 6-month swap calculation periods).

Thus, swaps implemented according to the present disclosure provide the following advantages: they are inexpensive compared to the costs associated with insurance; the only cash required up front is a performance bond (besides fees); credit-ratings of seller or buyer are reduced in importance (optional hybrid margining system); they solve intermediate cash short-fall problems for a pool owner; they do not hinder individual sales (except basis risk of pool owner may be affected), if pool owner lodges cash collateral instead of policies—only assets are tied up as performance bond for term of swap; they nearly eliminate credit risk asymmetry, as cash flow projections are summed for each calculation period (e.g., six months, quarterly, etc.), which means that neither selling nor buying party is disadvantaged; they are marked-to-market frequently and fungible; parties to the swap may never learn personally identifiable information (except if a party already knows that information); they take into account complex mortality distributions including skew, kurtosis, multiple modes, standard deviation, variance and other moments about the mean; and they anticipate creation of puts or calls whose value depends on this instrument.

Pools of life settlement contracts generate and consume cash flows differently than do other products typically underlying swaps, e.g., floating and variable interest rate products. A life settlement swap is not affected by changes in the market, and is only marginally affected by changes in interest rates. Other differences are more subtle yet significant enough to hamper others' efforts to engineer life settlement swaps.

The introduction of life settlement contract swaps meets a long-felt and readily understandable need to hedge risk. In addition to illiquidity and the reasons cited above, another reason that swaps were not previously introduced to the life settlement industry is that potential parties to a life settlement contract swap have wide differences of opinion about the current and future cash flows to be generated by a pool of life settlement contracts.

Figure 15:
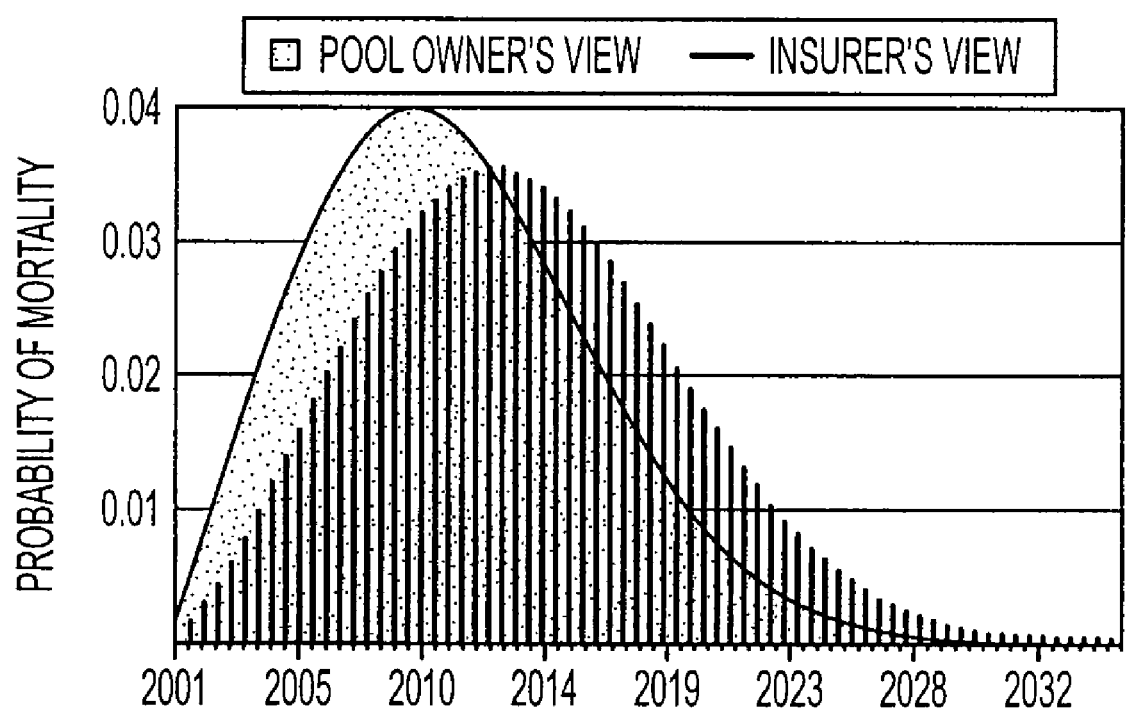
FIG. 15 is a graph of an example of competing views of mortality risk.

For example, FIG. 15 contrasts two points of view about expected mortality. One view is typical of that held by insurance companies that underwrite policies that later (or in some cases immediately) constitute pools of life settlement contracts. The other view is typical of an investor who purchases the pool. The source data for each probability density function is real, although it has been aggregated to remove any similarity to individuals or to a particular pool.

Unless a pool of life settlement contracts has thousands of individual lives, mortality risk is significantly higher than that implied by smooth mortality distributions prepared from tables. Pool owners today frequently have multiple life settlement contracts issued on the same insured individual.

Multiple life settlement contracts issued on the same insured increase mortality risk for the pool owner. Mortality risk refers to the volatility of expected mortality, or put another way, the degree by which an actual mortality distribution will differ from a projection or estimate.

Figure 16:
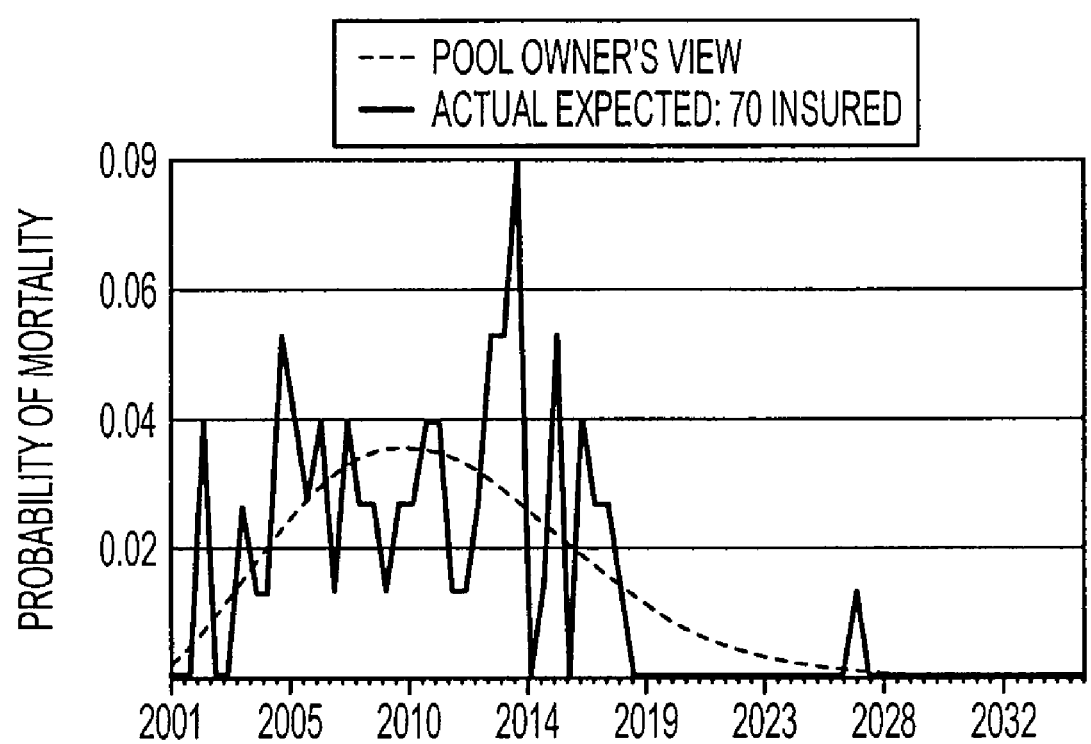
FIG. 16 is a graph of an example of volatility of mortality risk.

FIG. 16 illustrates the significantly high volatility of expected mortality for a pool of 70 insured. Note that high volatility of expected mortality has a different meaning than does high expected mortality.

Figure 17:
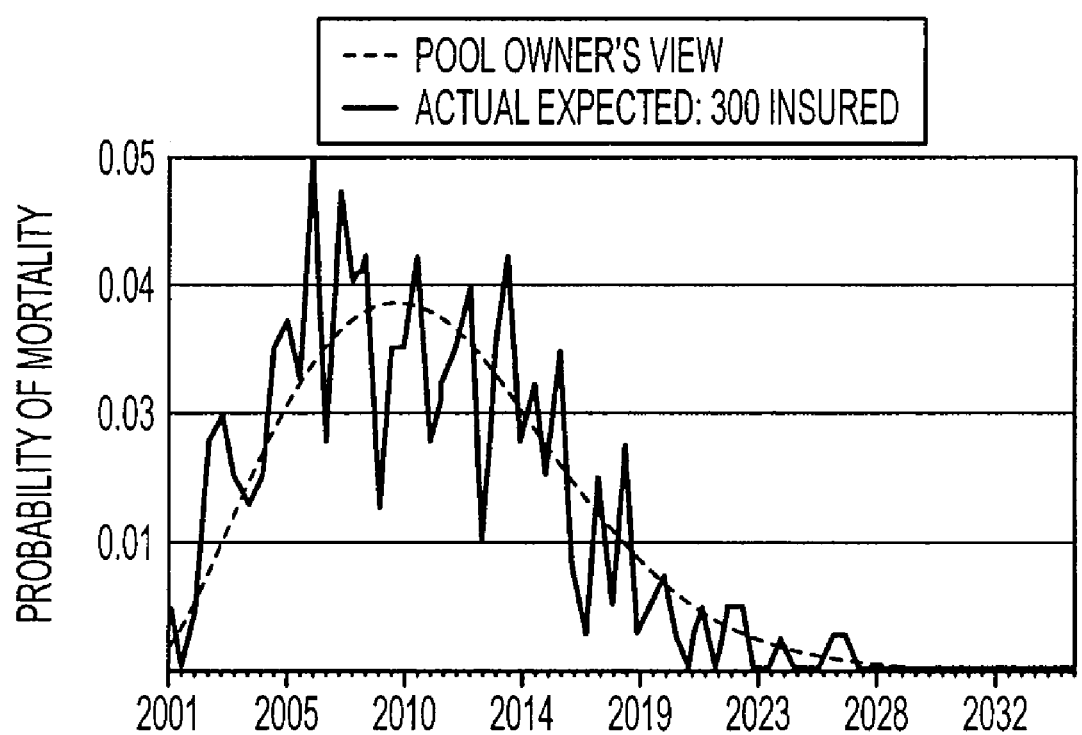
FIG. 17 is a graph of an example of volatility of mortality risk.
Figure 18:
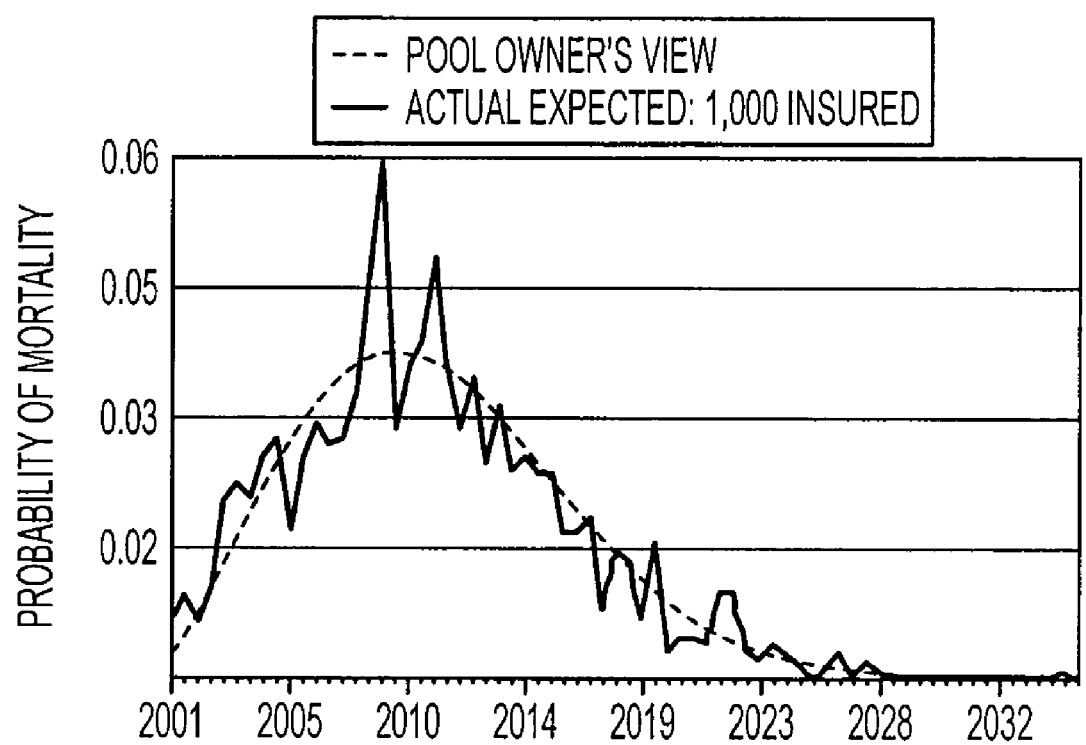
FIG. 18 is a graph of an example of volatility of mortality risk.

FIGS. 16-18 illustrate the important role played by the volatility of expected mortality. Volatility is an important characteristic because it directly affects the timing of future cash flows, and timing affects the net present value of the death benefit as well as the number and value of premiums to be paid.

Each of FIGS. 16-18 illustrates the result of a Monte Carlo simulation which is just one example of an infinite possibility of mortality distributions for the nominated pool size. When looking at the figures, consider only the degree of volatility of mortality distribution, not the actual path of mortality distribution. The volatility illustrated by each simulation matches that observed through experience.

Pools of 70 insured or fewer are unsuitable candidates for swaps contracts because of the high volatility of expected mortality—a risk that can be lowered by increasing pool size. Compared to a pool of 70 insured, a pool containing 300 insured has approximately one third the volatility of expected mortality, as shown in FIG. 17.

The designer of a life settlement contract swap balances the potential benefits and costs to parties to a swap: for example, the efficacy of the swap to hedge mortality risk versus the practical reality of finding a large enough pool of insureds.

FIG. 18 illustrates the volatility of expected mortality for a pool of 1,000 insured. Although the volatility is lower than for a pool of 300, the reduction is less pronounced than shifting from a pool size of 70 to 300.

Accordingly, wide differences in opinion generate strong demand for swaps, yet also provide the potential for conflict over which particular mortality distribution should be used to generate the reference distribution, or Calculation Agent Expected Net Cash Flow Distribution (Calculation Agent Distribution). The Calculation Agent Distribution describes the distribution of cash flows most likely to occur, as agreed by both parties to a swap. The Calculation Agent Distribution, much like a stock index, will change through time depending on the frequency and timing of unexpected events. The absence of an event is also considered an "event". Differences in value between actual cash flows received and the Calculation Agent Distribution may determine the timing and value of each swaps-generated cash flow.

A swap was engineered to work well as a hedging tool, incorporate the complexities of the underlying asset, and be transparently and fairly priced from the perspective of both parties, at all times throughout the swap's life. The swaps allow both counterparties to the swap to know, before entering into the swap agreement, precisely how the Calculation Agent Distribution will change given any permutation of timing and frequency of events throughout the swap's life.

The following describes an analysis performed by the system of the present disclosure of a sample of 102 life settlement contracts (94 unique insured) from a portfolio of an unknown number of life settlement contracts and unknown number of unique insured. Two types of swap were analyzed: a Total Return Swap and a Pool Index Swap.

The Total Return Swap effectively transfers the total risk induced by ownership of a pool of life settlement contracts. (Other risks may be induced by ownership of a pool of life settlement contracts including: interest rate risk and the risk that an underwriter may default, however, all other risks combined are still minor in comparison to mortality and face value risk.) The total risk of pool ownership can be divided into two risks: mortality risk and face-value risk. Face-value risk exists whenever the total face value linked to each insured is not the same for all insured. The Total Return Swap may be the swap of choice for a pool owner or investor who plans to buy a specific pool.

The Pool Index Swap effectively transfers the mortality risk induced by ownership of a pool of life settlement contracts where the total face value linked to each insured is the same for all insured. The Pool Index Swap may be the swap of choice for an investor or speculator who wishes to gain a general exposure to a collection of life settlement contracts.

The length of time for each type of swap agreement can vary, in this analysis, from six months to several years, depending on the wishes of both parties.

The sample portfolio was used to illustrate, step-by-step, the construction of the two types of life settlement contract swap.

Practical applications of swaps include, for example:

1. an owner of a pool of life settlement contracts sells a total return swap to effectively hedge the pool's mortality risk and face-value variance risk;

2. a speculator buys a pool index swap to gain a two-year exposure to a pool of life settlement contracts. If the cash flows to the pool exceed expectations, the speculator will earn a profit without ever having needed to buy the pool;

3. a pool owner speculates that a competitor's pool will mature slower than expected, and sells a pool index swap issued on the competitor's pool to attempt to earn a profit;

4. an insurer who has underwritten 25,000 life insurance contracts learns that 1,000 of the contracts now constitute a pool of life settlement contracts. The fact that the policies have been purchased by a sophisticated investor implies that these 1,000 policies may now have a negative net present value to the insurer. The insurer buys a total return swap so that losses from early payouts will be offset by profits from the swap; and 5. a pool owner speculates that the pool will receive higher net cash flows than the pool's aggregate life estimates indicate. The pool owner "doubles-up" and buys a pool index swap to leverage any windfall gains. Note that this party has the opposite view of the party in scenario 3 above.

The analysis concludes with two practical examples of the swaps' use as a tool to manage risk.

As described above, FIG. 15 illustrates two contrasting opinions of the portfolio's expected mortality distribution. One opinion is that the VBT 2001 tables, together with a mortality multiplier, are appropriate to model mortality. The other opinion is that certain experience tables (from medical underwriters), together with a mortality multiplier, are appropriate to model mortality. We include these contrasting distributions first, because mortality risk is the single largest determinant of a pool's value.

Although the owner of this portfolio must believe that the portfolio has a positive net present value, it seems at least possible that the insurers (collectively) believe that the portfolio has positive net present value to the insurers. The steps of our analysis follow:

Portfolio Overview and Statistics
Overview
Owner: —Example table swaps Market
(Longbank) ID: GZ0723
Unique insured: 94
Number of life settlement contracts: 102
Face value: $316,234,320
Probabilistically determined net present value: —$96,236,000 as of Jan. 5, 2006, using life estimates as provided by owner, and discounting all future cash flows by 4%, continuously compounded. Disclaimer: actual NPV is unknown Policy Variance
Largest combined face value for one insured: $25,000,000
Smallest face value: $50,000
Average face value (combined for each insured): $3,360,000
Standard deviation (population): $5,138,629

Insured
Youngest insured (nearest birthday to Jan. 5, 2006): 71.6 years
Oldest insured (nearest birthday to Jan. 5, 2006): 85.7 years
Average age insured (as of Jan. 5, 2006): 77.8 years
Standard deviation (population) of age insured: 3.2 years
Male/female: 74/20

Life Estimates
Primary life estimate provider(s): AVS and 21st
Secondary life estimate provider(s): none listed
Shortest LE: 48 months
Longest LE: 197 months
Average LE: 105 months
Standard deviation of LE (population): 32 months
Highest mortality multiplier (interpolated): 323%
Lowest mortality multiplier (interpolated): 86%
Average mortality multiplier (interpolated): 171%
Standard deviation of mortality multiplier (interpolated): 69%

Policy Types and Underwriters
Type(s) of policy: 22×five-year term; 10×ten-year term; 2×twenty-year term; 1×thirty-year term; 6×flexible term (valued as universal life); 2×term universal life (valued as universal life); 2×interest-sensitive whole life (valued as universal life); 3×last-survivor (valued as if the unlisted spouse was three-years older if male, three years younger if female, with the same LE and multiplier); 54×universal life Largest three insurers (as a percentage of total face value): Jefferson Pilot 29.0%; Transamerica 28.5%; Pacific Life 12.0%

Geographical dispersion of insured: assumed US; unknown states

Average premium as percentage of face (premium schedules are volatile, however, third year premium used as proxy): 3.6%

Assumptions & Adjustments
With only the one summary Excel file, several assumptions are made. As more information is received from the pool owner, some or all these assumptions may be removed to improve the accuracy of our analysis.

Last-Survivor: Other Spouse not Listed
For each of the three last-survivor policies, no information was provided for the spouse. If the insured listed was a male, we assumed the unlisted spouse was a female, three years younger, with the same life estimate and multiplier as the male. If the insured listed was a female, we assumed the unlisted spouse was a male, three years older, with the same life estimate and multiplier as the female.

Annual or Semi-Annual Premium Schedule
Premiums listed in the Excel worksheet appear to be annual. Most portfolios we have seen contain a mix of life settlement contracts with annual and semi-annual premium schedules, however, we will assume annual premium payments for all contracts.

Calculation Date(s) and Time "Zero"
Jan. 5, 2006 is assumed as the time "zero" and used as the date when the first premium payment is (was) made and is also used as the date on which all net present values are calculated.

Lapse Rate

Typically insurers assume that, on average, a certain percentage of policies written will lapse. Entities that purchase life settlement contracts do not usually match the profile of an average policy holder, and therefore lapse rates used by insurers may overstate the actual lapse rate.

We assumed that the entity that owns this portfolio will not allow policies with a positive net present value to lapse.

Quality assurance: error-checking

Quality assurance is an important process for any portfolio management program, however, if the portfolio metrics will be relied on by others, as is the case when a swap is engineered on the portfolio, quality assurance becomes essential.

The quality assurance steps are routinely more comprehensive than indicated below, however, we include those steps which we could perform on the data provided. As part of the engineering of the swap, any QA flags are brought to the attention of the pool owner to resolve. Nearly all flags turn out to be clerical errors or misinterpretation of data, and can be resolved quickly.

Stated LE Versus Interpolated LE (a Measurement Above 95%=OK)

Although the medical records for each insured may not be available, the multiplier is used, then work may be performed backwards from the multiplier using tables the other information provided about the insured, and an approximate life estimate may be interpolated.

The interpolated results will always have some margin of error which translates to several months plus or minus the number computed by the provider. The error stems from the fact that the life estimator had more information than we do to compute the life estimate. Note: this quality assurance step does not replace the life estimator's job of calculating a life estimate, it merely flags errors or the likelihood of error.

For this portfolio sample, LE could not be checked due to unavailability of the multipliers.

QA result: UNKNOWN (multipliers not provided)

Number of Matured (Expired Term) Policies (a Measurement of Zero=OK)

Matured policies are assumed to generate no death benefits.

QA result: FLAG Four policies with a combined face value of $850,000 appear to have matured (expired term) as of Jan. 5, 2006

Number of Policies with Issue Dates Beyond Analysis Date (a Measurement of Zero=OK)

It is possible, although improbable, for policies to exist that have issue dates beyond the analysis date.

QA result: OK zero policies have issue dates beyond the analysis date

Unknown Policy Maturation Dates, not Including Term Policies (a Measurement of Zero=OK)

In the absence of a maturity extension rider, if an insured outlives the policy maturity date, the policy will mature (expire) and the insurer will pay no death benefit. For each of these life settlement contracts, the pool owner will have lost the acquisition price and all premiums paid to maintain the policies.

For illustration purposes, the forecast cash flows assume that each policy matures (expires) when the insured attain age 100 and that there are no maturity extension riders.

QA result: FLAG several insured are likely to live past 100

Percentage Insured with LEs Beyond Premium Schedule (a Measurement of Zero=OK)

Most policies require premium payments up until the time the policy matures. If the life estimate for an insured is beyond the premium schedule, this raises a flag that either the policy is likely to mature before the insured reaches the LE (and therefore has a negative net present value), or one or more parts of the premium schedule are missing.

QA result: OK 0% of policies with LEs beyond premium schedule

Policies which Appear to have a Negative Net Present Value on Purchase Date (None=OK)

When measured from the perspective of a pool owner, the net present value of a life settlement contract can and does change with time. If both insurer and pool owner are valuing life settlement contracts in the same way, the identical life settlement contract should be regarded as having a "positive" net present value to a pool owner and an equal and opposite "negative" net present value to the insurer. It is also possible for a life settlement contract to move from a positive net present value to negative net present value (negative from the pool owner's perspective, and positive from the insurer's perspective). Under normal circumstances, however, a pool owner is unlikely to purchase a life settlement contract that has negative net present value (taking into account the purchase price), and the existence of any in the portfolio is a flag.

We assume the portfolio owner paid an average of 11% of face value for each contract (although many portfolio owners will probably have paid more than 11% of face value), then we compute each contract's net present value.

QA result: FLAG some contracts appear to have a negative net present value.

Number of Unique Insured Differs to Number of Unique Case Ids (a Measurement of 0=OK)

The number of unique insured significantly affects the projected volatility of cash flows, particularly for per-period swaps (swaps expire each six months). The number of unique insured should equal exactly the number of unique case IDs provided by the sponsor or pool owner. With the ANON portfolio, there are only policy IDs, and no individual IDs, so we used date-of-birth, gender and LE to infer unique insured.

QA result: FLAG number of unique insured appears to be 93 if date-of-birth and gender are used, but appears to be 94 when date-of-birth, gender and LE are used. We assumed 94 unique insured.

Expected Volatility Analysis

The sources of volatility of the pool's expected mortality may include (in order of magnitude):

random chance;

differences between mortality distributions of individuals within the pool;

degree by which medical records may not accurately portray health status of an individual. This is not the risk that medical records may be falsified, which is unlikely, but that medical records may have limited value. For example, doctors may indicate a condition may exist even when the doctor is not too sure. Conservative diagnoses are in line with most doctors' motivation to care for patients and avoid a negligence suit later for not alerting a patient to the possibility of a condition;

unsystematic production error on the part of the life estimate provider;

systematic unintentional error on the part of life estimate provider. Life estimate providers use adjusted experience tables and mortality multipliers, however, there is a risk that these tables and multipliers consistently over- or underestimate true values; and systematic intentional errors on the part of the life estimate provider.

Figure 19:
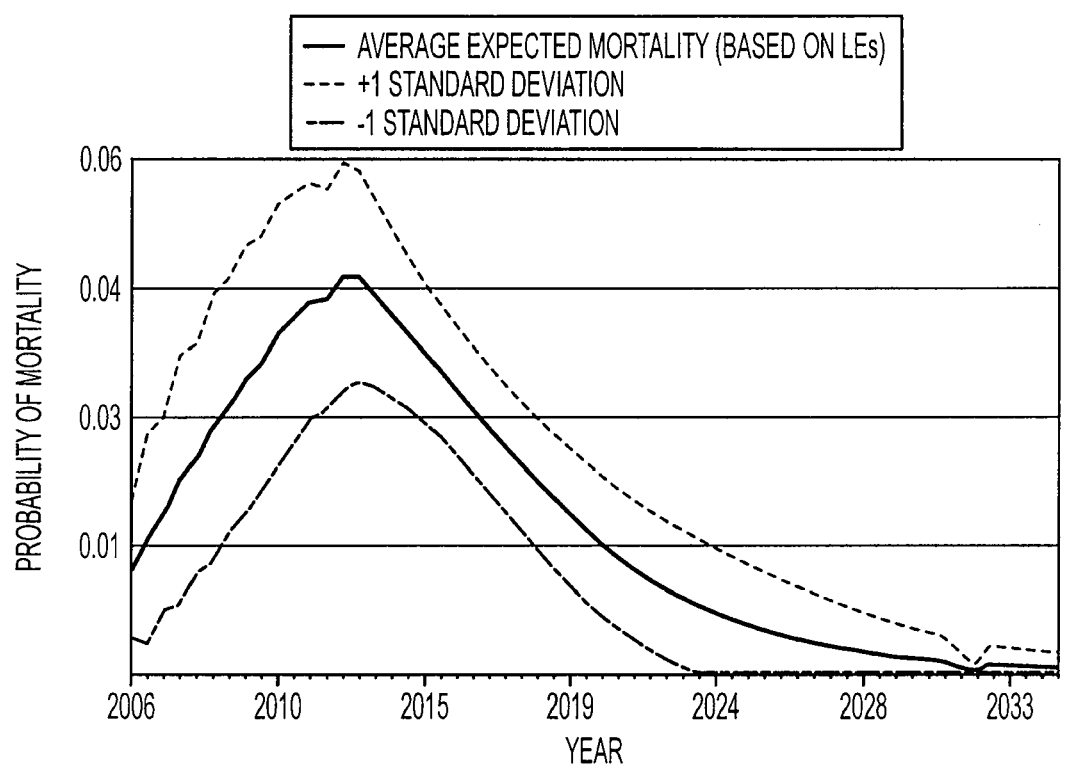
FIG. 19 is a graph of an example of expected mortality.

Volatility of expected mortality can be visualized by overlaying error bands to the "expected" or mean mortality distribution of the pool. The bands define a range of +1 to −1 standard deviations from the mean. Approximately two-thirds of all cash flows will occur in the range shown in FIG. 19.

The volatility of expected mortality as well as the mean of the expected mortality are the two of the three key metrics used to compute margin requirements.

Mortality Simulations

A pool's value is dependent on the realized mortality distribution and the face value amounts realized. The pool's realized mortality distribution is unlikely to follow precisely the probabilistic mortality distribution, no matter how relevant the tables used to prepare the probabilistic estimate. Realized mortality distributions will display "volatility" reflecting unavoidable uncertainty.

Figure 20:
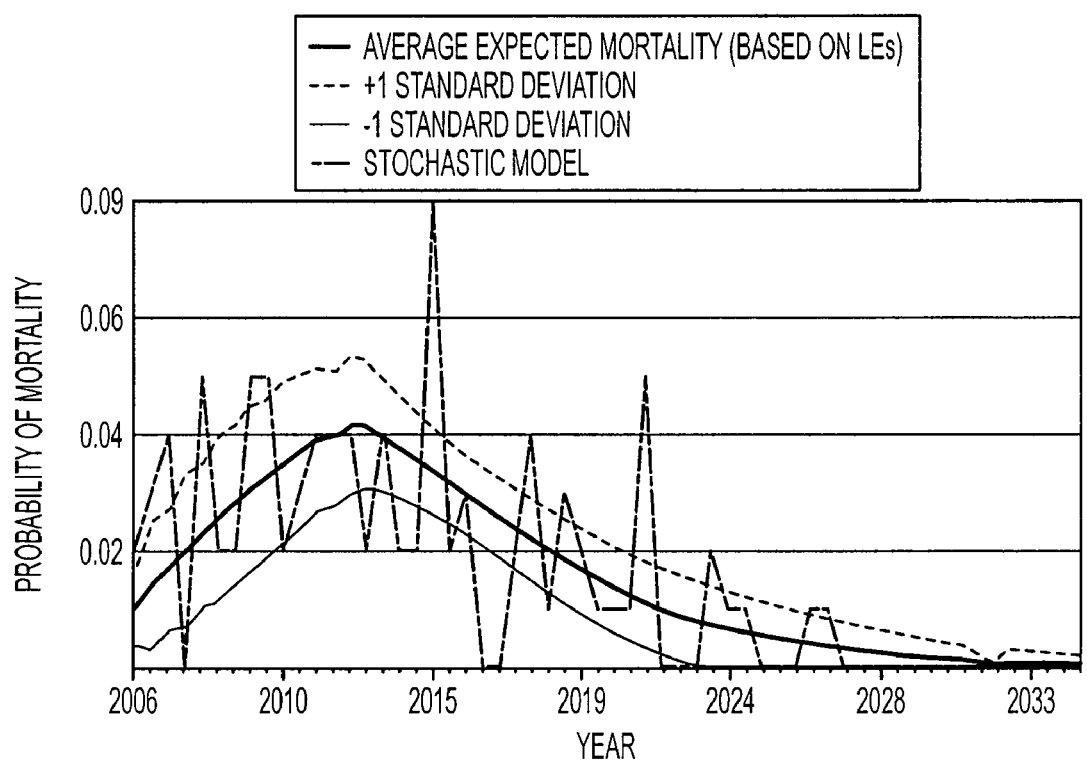
FIG. 20 is a graph of an example of expected mortality with stochastic modeling.

Before analyzing the dollar effect of expected volatility, Monte Carlo simulations (a type of stochastic modeling designed to illustrate real mortality distributions) are run, which shed light on the magnitude of mortality variability we can expect over the pool's life. The following are just two from many possible mortality distributions:

Stochastic modeling example #1 is shown in FIG. 20: mortality distribution (no cash flows)

Mortality simulations (cont.)

Figure 21:
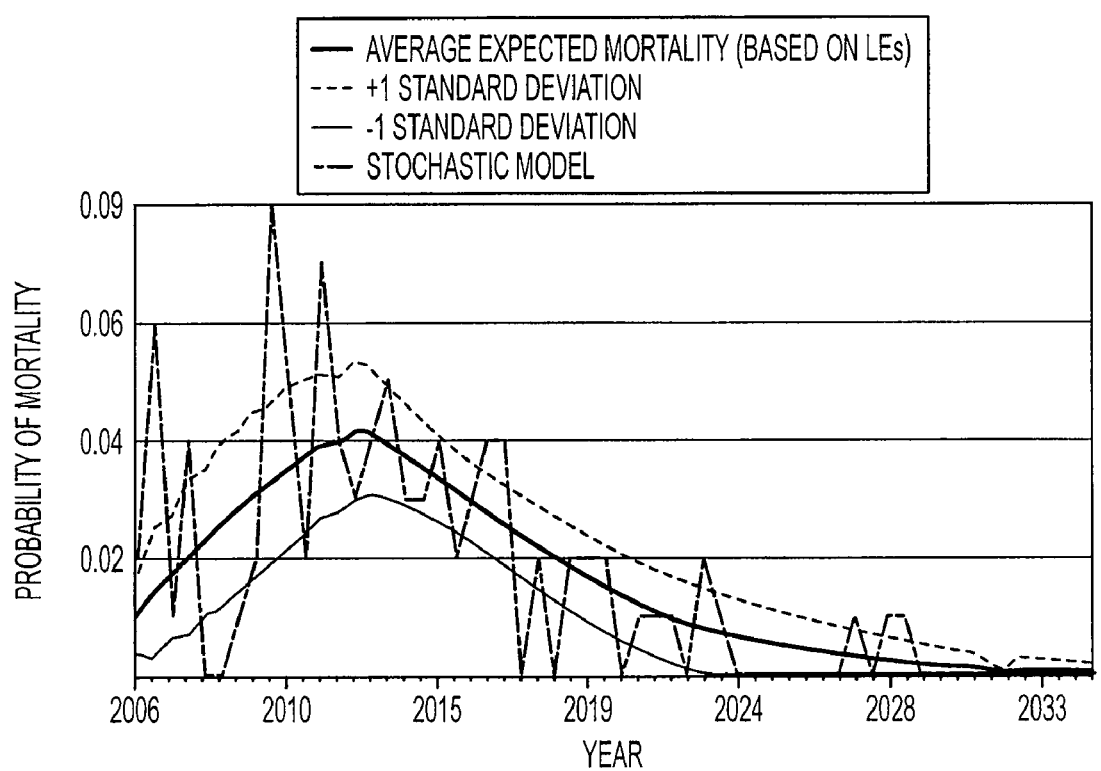
FIG. 21 is a graph of an example of expected mortality with stochastic modeling.

Stochastic modeling example #2: is shown in FIG. 21: mortality distribution (no cash flows)

Pool sizes with at least 300 unique insured are recommended to minimize the unavoidable mortality variance and to balance hedging effectiveness with the practical difficulty of building a sizable pool.

This pool has 94 unique insured: a number that generates considerable avoidable mortality variance. A pool with fewer insured would have the +1 and −1 standard deviation bands spread even further from the mean, and would describe a wider range.

Calculation Agent Mortality Distributions

Stochastic modeling does a much better job illustrating the volatility of expected mortality than the probabilistic mortality distribution, however, each stochastic model is just one of many possible distributions. To fairly compute each swap's value at any future time, we compare actual mortality to one reference distribution. We use an adjusted probabilistic mortality distribution for this reference.

For both the total return swap and the pool index swap, we take into account the fractional number of insured who will likely live beyond the expiry date of the policy, because insurers will not pay after policies expire.

The summary data did not contain policy end dates for each universal or whole life policy (not including term policies). For illustration purposes, an arbitrary policy end date is chosen corresponding to an insured's age of 100 years (not including term policies).

For this pool, it is estimated that as many as thirty (30) insured may outlive either the term expiry date or a general expiration date. The portfolio owner would already have taken account of those insured who are likely to live beyond a term policy expiry date, but may not have taken account of those insured who are likely to live beyond 100, so the probabilistic mortality distribution is recomputed so that it includes only the insured expected to have in-force policies.

Figure 22:
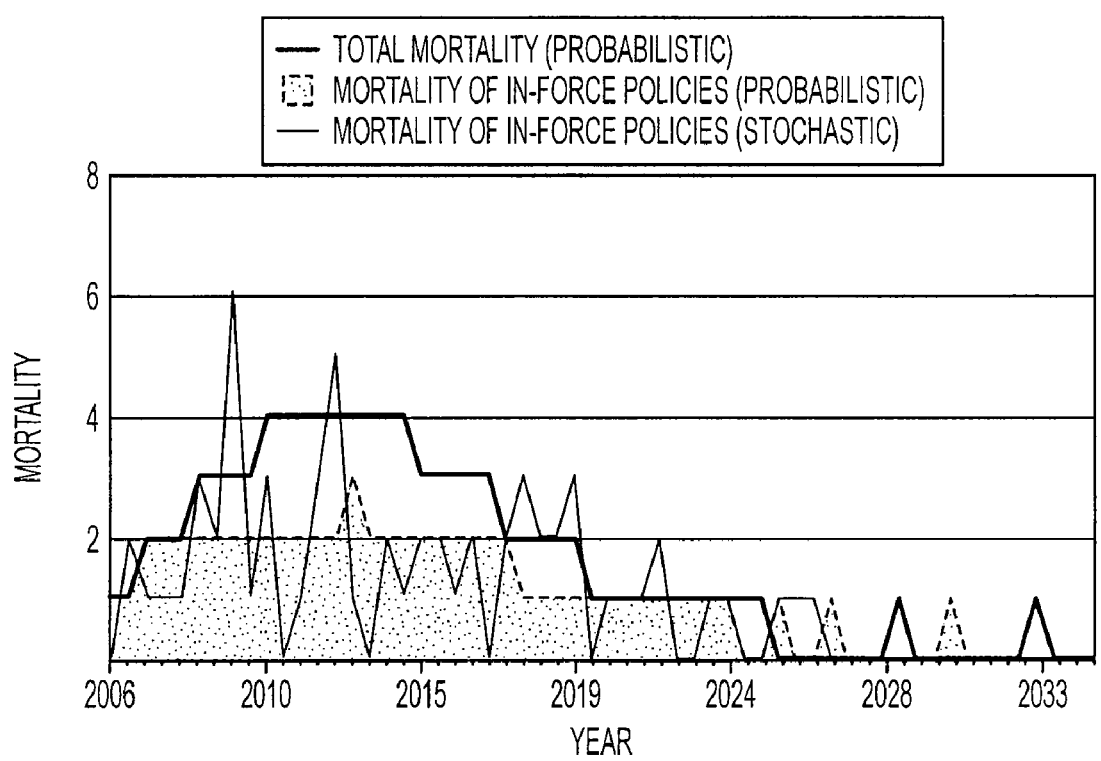
FIG. 22 is a graph of an example comparison between stochastic and probabilistic mortality.

When stochastic modeling is run on the portfolio mortality, the number of insured expected to have in-force policies can vary. FIG. 22 compares probabilistic mortality with one stochastic mortality example.

Total Return Swap

If the swap being engineered is a total return swap, we use the fractional version of the mortality distribution. The adjusted distribution becomes the Calculation Agent Mortality Distribution applicable to the total return swap.

Like a stock index, the Calculation Agent Mortality Distribution will change through time if there are unexpectedly fewer deaths during any given period or unexpectedly more deaths during any given period. The Calculation Agent Mortality Distribution will remain the same only when the actual number of deaths is exactly equal to the forecasted number of deaths during any given period.

Figure 23:
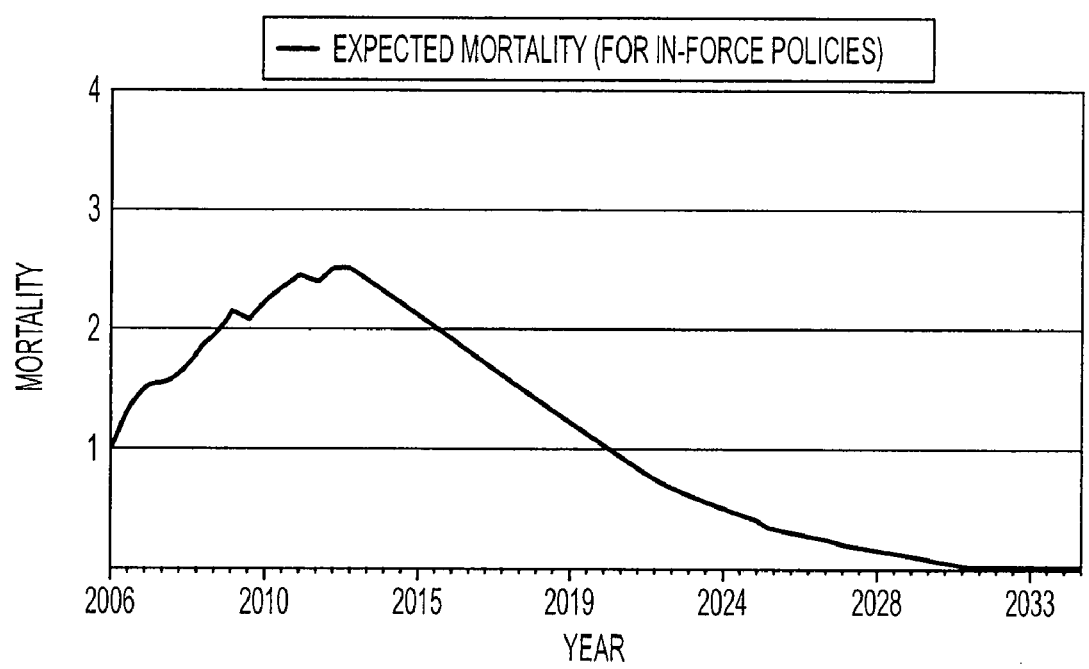
FIG. 23 is a graph of an example of an expected mortality fractional distribution.

FIG. 23 illustrates the Calculation Agent Mortality Distribution applicable to the total return swap as forecasted on Jan. 5, 2006.

Pool Index Swap

If the swap being engineered is a pool index swap, parties wish to specifically avoid any face-value volatility risk, therefore we use the discrete or whole-integer mortality distribution in place of the fractional mortality distribution. The discrete distribution moves by steps of whole integers corresponding to individual lives, sub-totaled for each six-month interval. The discrete version of the mortality distribution becomes the Calculation Agent Mortality Distribution applicable to the pool index swap.

Just as the Calculation Agent Mortality Distribution for the total return swap will change through time, the Calculation Agent Mortality Distribution for the pool index swap also will change through time whenever there are unexpectedly fewer deaths during any given period, or unexpectedly more deaths during any given period. The Calculation Agent Mortality Distribution will remain the same only when the actual number of deaths is exactly equal to the forecast number of deaths during any given period.

Figure 24:
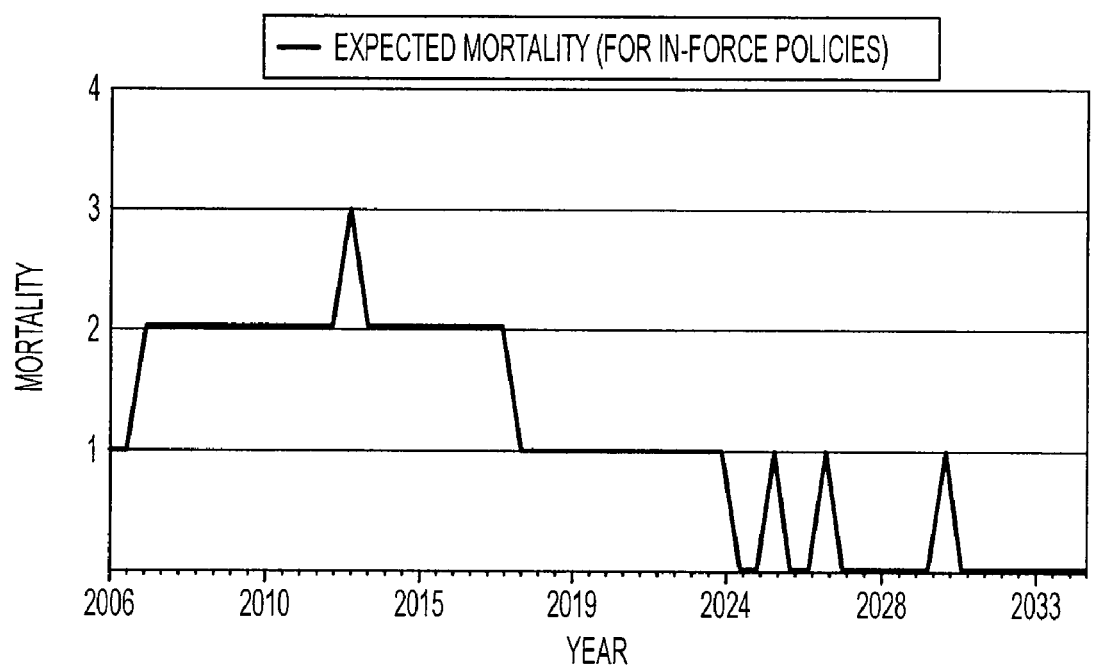
FIG. 24 is a graph of an example of an expected mortality whole-integer distribution.

FIG. 24 illustrates the Calculation Agent Mortality Distribution applicable to the pool index swap as forecast on Jan. 5, 2006.

In the following sections, the expected mortality distributions are translated into net cash flow distributions that will be used as the reference distributions for calculating swaps values.

For the total return swap, the volatility of cash flows will actually be higher than the volatility implied by stochastic modeling of expected mortality distributions because the face value linked to each insured varies. For the pool index swap, the volatility of cash flows will be in proportion to the volatility implied by stochastic modeling, because the face value for each insured is assumed constant.

Modeling Portfolio Cash Inflows

For this specific pool, each insured's life may have more than one life settlement contract linked to it, and the combined face value to be received upon the death of an insured varies from $50,000 to $25,000,000. The wide variance of per-insured payout serves to amplify the volatility already inherent in the expected mortality distribution.

The total return swap takes into account both the mortality risk and the cash flow risk from the variance of per-insured payouts. Depending on which insured dies, the combined payout will vary.

Swaps parties who want to match the exposure, both in mortality and in face value, will prefer to use a total return swap.

The pool index swap takes into account only the mortality risk by assuming an average face value for each of the 94 unique insured. Regardless of which insured dies, the face value payout will be deemed to be the average. Parties to a pool index swap know in advance the exact dollar amount associated with each death and the average payout has the effect to reduce the volatility of potential swaps payments.

Swaps parties who wish to avoid the cash flow risk from the variance in face value attributed to each insured will prefer to use a pool index swap.

In general, pool owners will want to use total return swaps and speculators who want a general exposure will prefer to use pool index swaps.

Total Return Swap

For the purposes of valuing a total return swap, both cash inflows and cash outflows are taken into account. In determining cash inflows, not all $316 million of face value will be received by the pool owner. As mentioned in previous sections, probabilistically, a small percentage of the insured will outlive the policy end date (separate from term policy end-dates) and the expected cash inflows have to be reduced by these expected "lost inflows".

Figure 25:
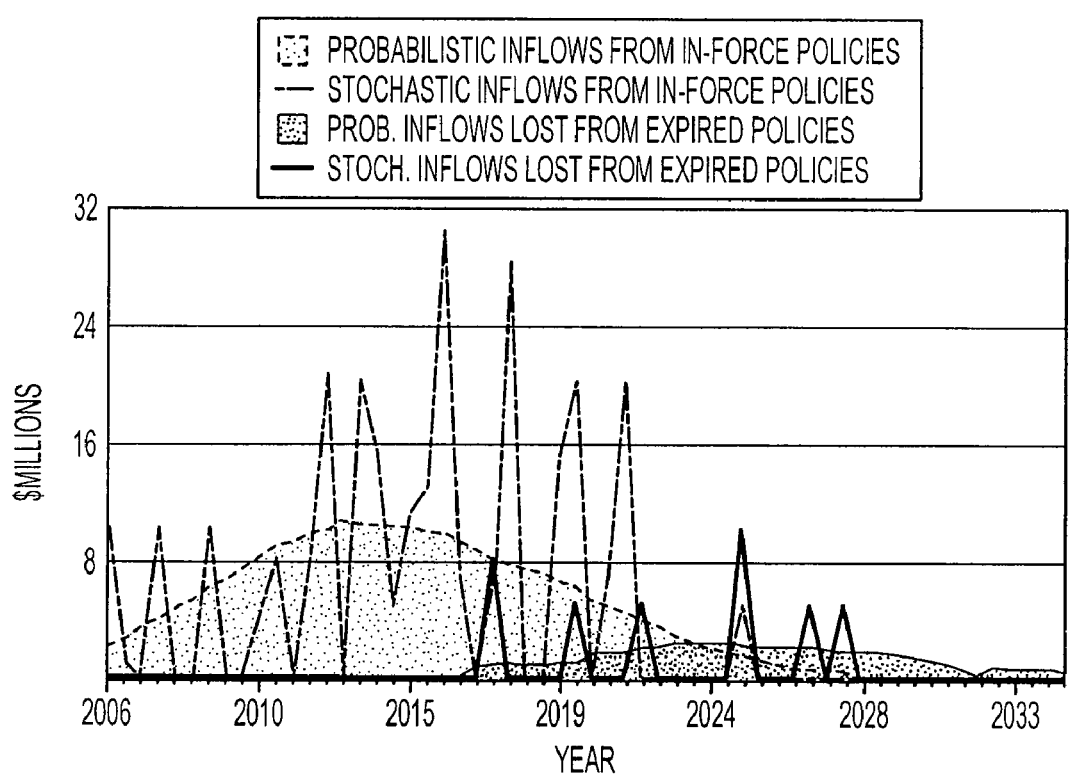
FIG. 25 is a graph of an example of stochastic and probabilistic cash inflows corresponding to a total return swap.

As preformed for the mortality distribution, portfolio cash inflows are also modeled using both probabilistic and stochastic methods. FIG. 25 has four categories of data: probabilistic cash inflows from in-force policies, stochastic cash inflows from in-force policies, probabilistic cash lost from insured outliving policy end dates, and stochastic cash inflows lost from insured outliving policy end dates.

FIG. 25 (stochastic modeling example: cash inflow distributions relevant to a total return swap) highlights the increased expected volatility when asymmetrical face values are taken into account, as well as the magnitude of cash inflows lost due to some insured outliving policy end date that never payout.

For illustration purposes, a default policy expiration age of 95 years is modeled.

Note that the stochastic cash inflows presented one scenario from any number of possible scenarios:

Pool Index Swap

For purposes of calculating the values of a pool index swap, we take into account only cash inflows.

Flexibility of Pool

Index Swap to be Used as a Life-Settlement Market Index

Parties to a pool index swap wish to gain exposure only to mortality risk, therefore any value can be ascribed to the per-insured payout, not only the average face-value payout. For example, parties may wish to ascribe a fraction of the face-value average to be the deemed payout, or a fixed-dollar sum which is not related to the face-value average, but can be of any value pre-agreed by the swaps parties.

The flexibility of the engineered pool index swap allows market participants to use it as a general life-settlement market index (Note: 94 unique insured may be an insufficient number to use for a swap that hedges the mortality risk of life settlement contracts in general. Different life estimate providers will produce different life estimates for the same insured: even if large numbers of insured are used, the hedging effectiveness will be imperfect) where, for example, each payout event can be deemed to be worth $10,000 or $1,000 multiplied by the mortality events in any given period. This index computation is designed to be an analogue of that used by some derivatives of the S&P 500 stock market index, where the value of one contract is deemed to be $250 multiplied by the index's value at any given time.

The larger the number of unique insured in the pool, the better a surrogate the pool index swap will be to the overall performance of pools of life settlement contracts.

The cash inflow chart for the pool index swap is similar to that of the total return swap, except that the probabilistic cash flows are converted from fractional to discrete units where each unit represents the average face value per insured.

Figure 26:
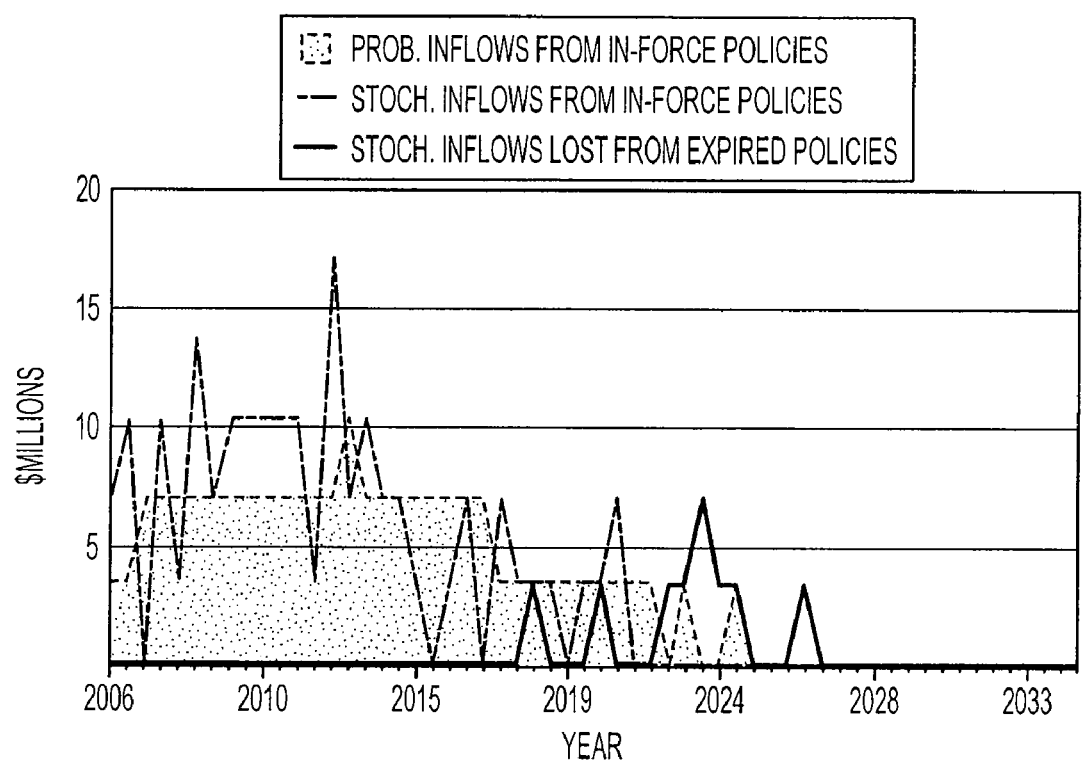
FIG. 26 is a graph of an example of stochastic and probabilistic cash inflows corresponding to a pool index swap.
Figure 27:
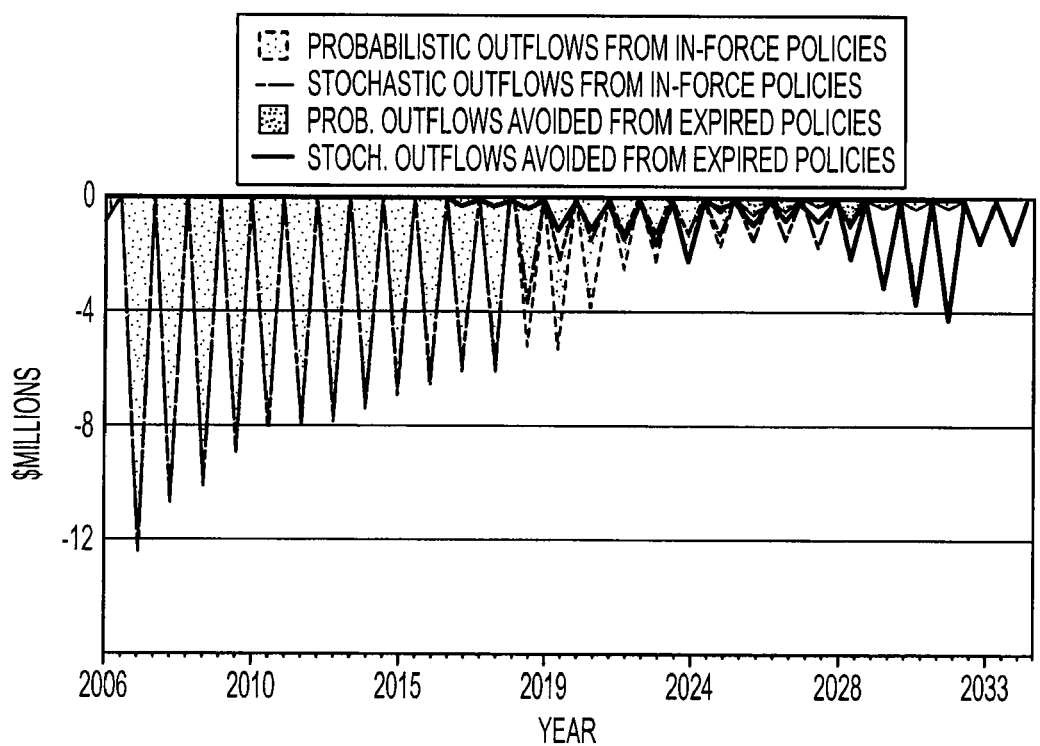
FIG. 27 is a graph of an example of stochastic and probabilistic cash outflows corresponding to a total return swap.

FIG. 26 (stochastic modeling example: cash inflow distributions relevant to a pool index swap) represents three categories of data, all converted from fractional to discrete data: probabilistic cash inflows from in-force policies, stochastic cash inflows from in-force policies, and stochastic cash inflows lost from insured outliving policy end date (not including term policies).

For illustration purposes, a default policy expiration age of 95 years is modeled.

Note that the stochastic cash inflows presented one scenario from any number of possible scenarios.

Modeling Portfolio Cash Outflows (Premiums)

For the purposes of valuing a total return swap, both cash inflows and cash outflows are taken into account.

In determining which cash outflows have to be modeled, not all forecast premium payments will have to paid by the pool owner. As mentioned above, probabilistically, a small percentage of the insured will outlive the policy end date (separate from term policy end-dates) and the expected premium payments are reduced by these expected "avoided premium payments".

Figure 28:
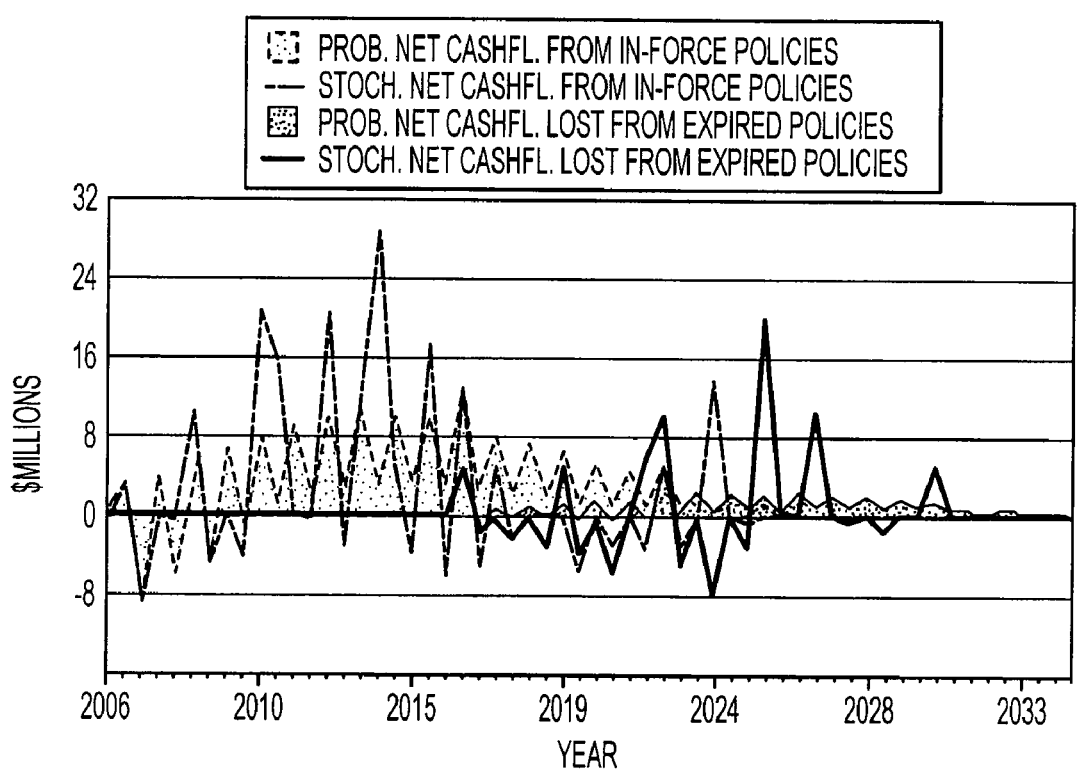
FIG. 28 is a graph of an example of net cash flow distributions corresponding to a total return swap.

In the same manner in which the portfolio cash inflows were modeled, portfolio cash outflows are also modeled using both probabilistic and stochastic methods. FIG. 28 (stochastic modeling example: cash outflow (premium payment) distribution) has four categories of data: probabilistic cash outflows from in-force policies, stochastic cash outflows from in-force policies, probabilistic cash outflows avoided by insured outliving policy end dates, and stochastic cash outflows avoided by insured outliving policy end dates.

For illustration purposes, a default policy expiration age of 95 years is modeled.

Note that the stochastic cash outflows presented one scenario from any number of possible scenarios.

Modeling Net Cash Flows

To compute changes in value of a total return swap, it is necessary to subtract the expected cash outflows from the expected cash inflows to generate a distribution of net cash flows.

To compute changes in value of the pool index swap, this step is not necessary, as parties to a pool index swap seek to hedge only mortality risk and assign a deemed or average face value to each insured. The subtraction of an averaged value for premium payments (cash outflows) would neither increase or decrease the effectiveness of the pool index swap.

FIG. 28 (stochastic modeling example: net cash flow distribution used for total return swap) has four categories of data: probabilistic net cash flows from in-force policies, stochastic net cash flows from in-force policies, probabilistic net cash flows lost from insured outliving policy end dates, and stochastic net cash flows lost from insured outliving policy end dates.

FIG. 28 illustrates the net effect of deducting all expected cash outflows from all expected cash inflows to produce net cash flow distributions. The result is an indication or forecast of the expected net performance of the portfolio over the life of the pool.

Calculation Agent Cash Flow Distributions

For each type of swap, all the previous data and analysis (calculated LEs, adjusted mortality tables, expected volatility of mortality, and expected volatility of cash flows) is summarized into a single cash flow distribution (undiscounted) spanning 29 years, divided into six-month increments.

Total Return Swap

Figure 29:
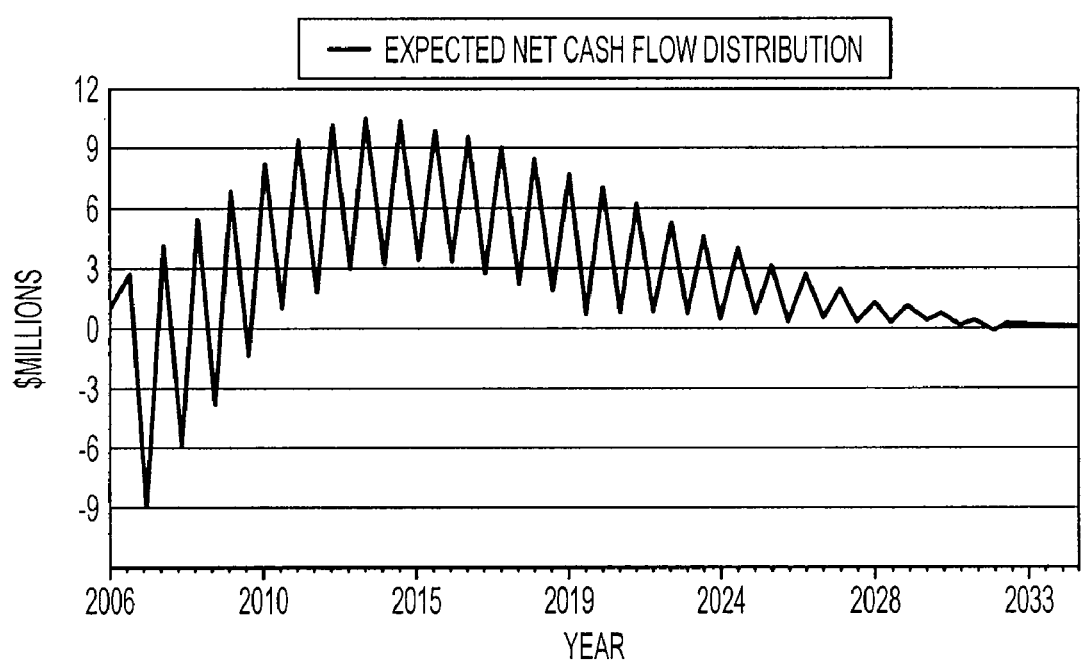
FIG. 29 is a graph of an example of expected cash flow distributions corresponding to a total return swap.

For the total return swap, the cash flow distribution represents the net expected cash inflows throughout the life of the pool as shown in FIG. 29 (total return swap calculation agent expected net cash flow distribution).

The values in FIG. 29 can also be used to compute the net present value of the portfolio. Each net cash flow is discounted by the risk-free rate applicable to the period of the expected cash flow (the yield curve is used to extract the appropriate rates). As an approximation, each cash flow can be discounted (continuously) using the rate of 4% (in actuality, the yield curve interest rates relevant to each period are used). Using this interest rate approximation together with the life estimates provided by the portfolio owner, the net present value (as of Jan. 5, 2006) of this sample of the portfolio is calculated to be $96,236,000.

Pool Index Swap

Figure 30:
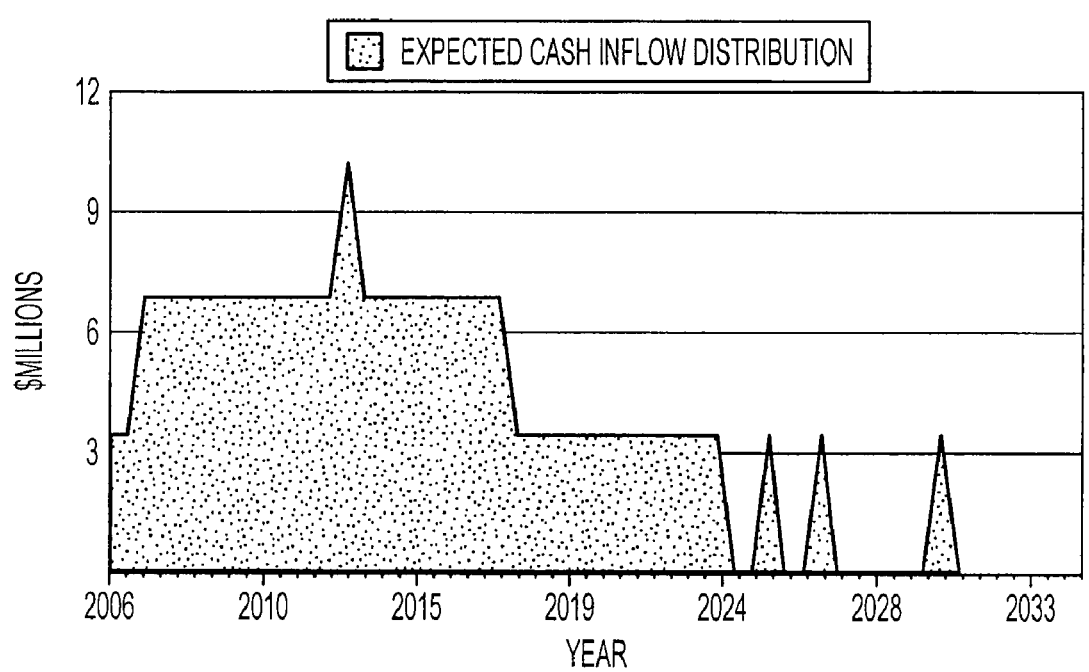
FIG. 30 is a graph of an example of expected cash inflow distribution corresponding to a pool index swap.

For the pool index swap, the cash flow distribution represents the gross cash inflows expected if each insured were linked to one policy that paid out the average of the total face value. For this sample of the pool, the average face value, per insured, is $3,360,000 as shown in FIG. 30 (total return swap calculation agent expected cash inflow distribution).

Swaps Calculations and Examples

As the portfolio ages, the portfolio owner will pay premiums, insured will die and insurers will pay the pool owner net death benefits.

For the total return swap, the swap's value will change by the difference between the actual net cash flows received by the pool owner over each six-month interval, and the net cash flows forecast by the calculation agent net cash flow distribution for the same six-month interval.

For the pool index swap, the swap's value will change by the difference between the product of average face value and actual mortality over each six-month interval, and the calculation agent expected cash inflow distribution.

Only by running stochastic models of the portfolio can we model expected cash flows likely to be generated by exposure to each type of swap.

Figure 31:
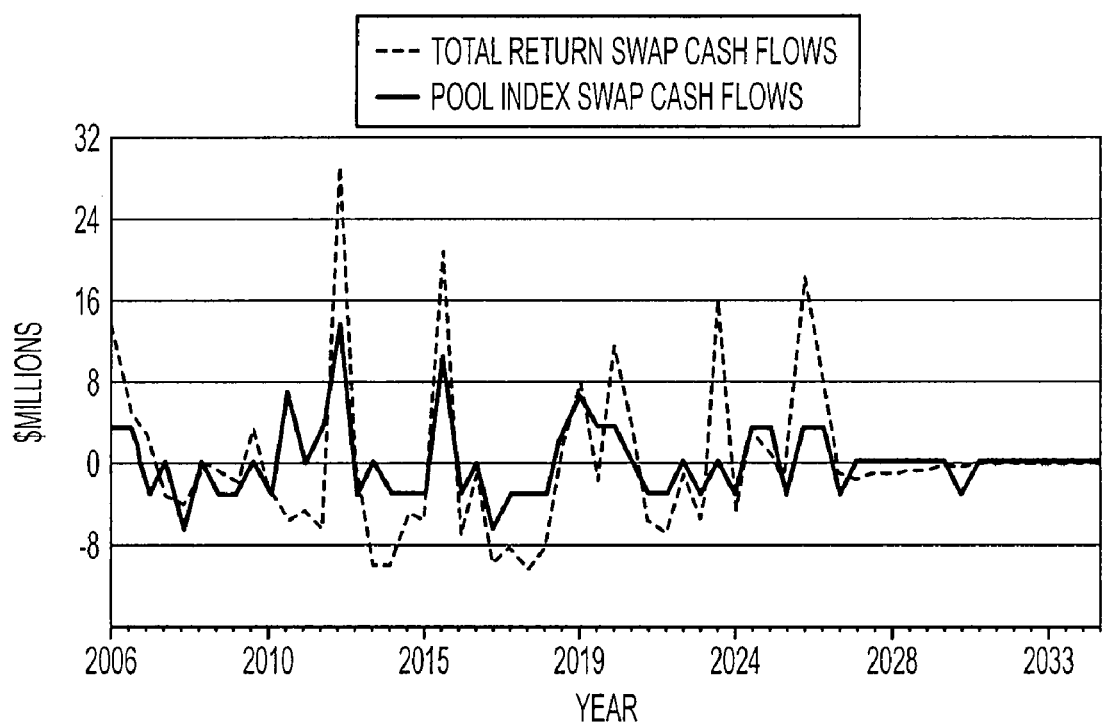
FIG. 31 is a graph of an example of cash flows generated by a total return swap and a pool index swap.

FIG. 31 illustrates one such modeling and shows the difference in cash flows generated by each type of swap.

FIG. 31 also illustrates that, in general, the magnitude of each cash flow generated by the pool index swap is lower than the magnitude of each cash flow generated by the total return swap. It turns out that this relationship is not specific to this stochastic model: no matter how many times the model is run, the relative difference in volatility holds.

The predictable volatility feature of each type of swap allows each to be used to solve different risk-management objectives.

The last section of the analysis illustrates two examples of swaps used to solve typical risk-management problems encountered by participants in the life settlement industry.

All examples illustrate hedging without adjustment for fees. Note that whenever one of the two parties to a swap earns positive cash flows from changes in the swap's value, then by definition, the other party will lose from the same changes in the swap's value. In all cases, both parties pay fees.

A Pool Owner Hedges Mortality Risk

Example

As owner of this pool of 102 life settlement contracts, the pool owner may wish to manage the risk that actual cash flows might be lower than forecast cash flows from January 2009 through June 2012.

Swaps Solution

The owner sells an engineered total return swap to a counterparty to effectively hedge the pool's mortality and cash flow risks for the defined period of time. The opinion of the buying counterparty is that actual cash flows received by the pool will exceed those forecast. The two parties agree that the value of the swap will change according to differences measured between actual net cash flows and the Calculation Agent Expected Net Cash Flow Distribution for the defined period of time.

Both entities lodge appropriate performance bond (cash or in-kind securities) to guarantee their promises. The two parties appoint a Calculation Agent, which agrees to gather information relevant to pricing the total return swap and calculating changes to the performance bond, and with the consent of both parties, publishes this information continuously, for example, on swapsMarket.com for the parties and any other interested market participant to see. The tracking firm and each insurer agrees, irrevocably, to distribute to the Calculation Agent and, for example, swaps Market.com information relating to each insured and each policy constituting the pool.

Results

As time goes by, the pool owner receives the net cash flows generated by the pool. In this example, the pool generates cash flows for the defined period which have a total (undiscounted) value of $5,037,492. However, the pool owner expected cash flows with a total (undiscounted) value of $20,695,358.

With the hedge in place, under the terms of the swap agreement, the long party pays to the to the pool owner payments with a total (undiscounted) value of $15,657,866. Discounting the cash flows by 4.0%, continuously compounded, the net present value (as of Jan. 5, 2006) of the swaps payments equals $13,244,014. The swaps payments offset the loss the pool owner made from the physical asset.

The result is that the pool owner preserves the originally intended cash flows (before deduction of fees).

Summary

In the above example, the total return swap benefited the pool owner who avoided a loss of approximately $13 million.

Figure 32:
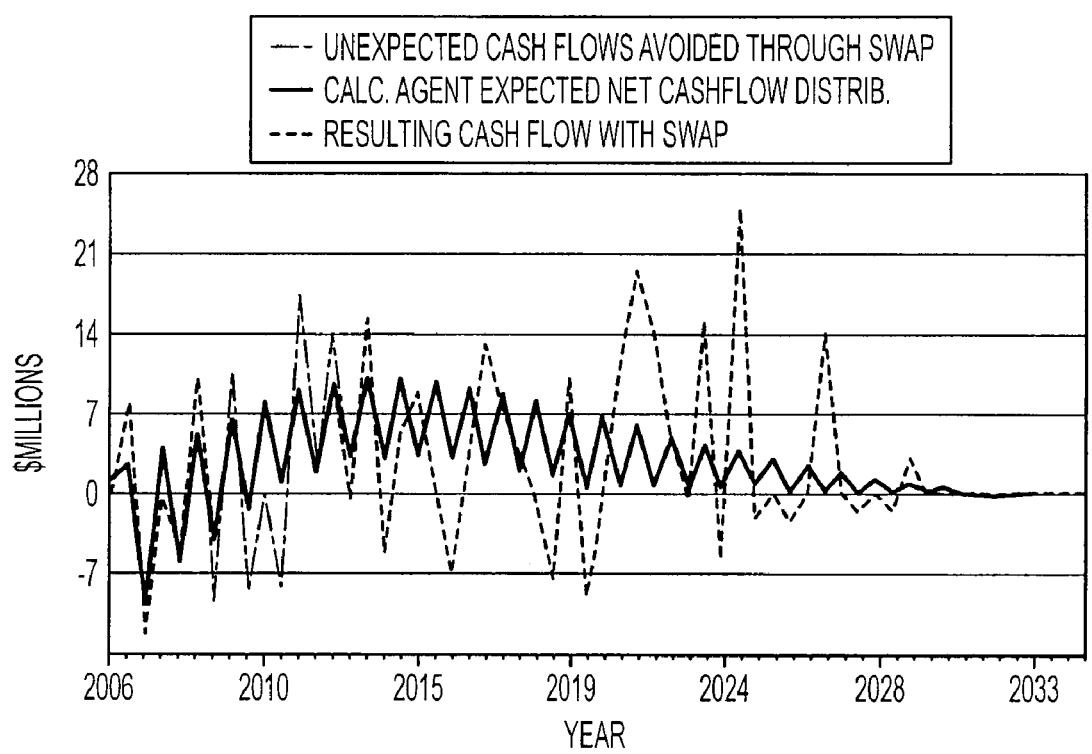
FIG. 32 is a graph of an example of unexpected cash flows avoided by a pool owner.

The light-shaded line in FIG. 32 represents the unexpected cash flows avoided by the pool owner using this hedging strategy.

The following table lists, for illustration purposes, swaps cash flows are summarized for each six-month period. In practice, there may be intermediate cash flows, perhaps as frequently as every two weeks, depending on the counterparty creditworthiness and the amount of performance bond lodged by either party. The cash flows generated by the total return swap as well as the net present value (computed as of Jan. 5, 2006) of those cash flows. Cash flows are presented from the point of view of the selling or "short" party; in this example, the long party is the counterparty to the pool owner:

| Date | Expected mortality | Expected netcash flows (not discounted) | Actual mortality | Actual net cash flows (not discounted) | Cash flows from Total Return Swap (not discounted) | Net present value of cash flows from Total Return Swap |
|---|---|---|---|---|---|---|
| January 2009 | 1.9 | −4,053,464 | 1 | −9,383,113 | 5,329,649 | 4,633,374 |
| July 2009 | 2.1 | 6,625,519 | 2 | 10,500,000 | −3,874,481 | −3,301,615 |
| January 2010 | 2 | −1,527,895 | 1 | −8,375,272 | 6,847,377 | 5,719,410 |
| July 2010 | 2.2 | 7,983,636 | 1 | 50,000 | 7,933,636 | 6,495,511 |
| January 2011 | 2.3 | 855,441 | 2 | −7,753,091 | 8,608,532 | 6,908,509 |
| July 2011 | 2.4 | 9,155,335 | 4 | 17,350,000 | −8,194,665 | −6,446,152 |
| January 2012 | 2.4 | 1,656,786 | 6 | 2,648,968 | −992,181 | −765,023 |
| Total | 15 | 20,695,358 | 17 | 5,037,492 | 15,657,866 | 13,244,014 |

**NPV is computed as of Jan. 5, 2006.

A Speculator Gains Exposure to a Pool

Example

A market participant buys a pool index swap to gain a two-year exposure tied only to the mortality risk of a pool of life settlement contracts, without having to buy and then resell the pool. The term of the exposure is to be from July 2010 through June 2012.

The market participant wants a general exposure to the asset class where cash flows will be proportionate to mortality risk. Specifically, the market participant wants to avoid exposure to the risk that one face value payout might be very different to another.

Swaps Solution

The market participant buys an engineered pool index swap for the defined period of time. The buying party thinks that actual mortality will be greater than forecast during this period. The opinion of the selling counterparty is that the mortality of the pool will be lower than forecast during the same period.

The two parties agree that the value of the swap will change according to differences measured between:
  the product of actual mortality multiplied by the average face value, and
  the product of forecast mortality multiplied by the average face value.
  The product of the forecast mortality multiplied by the average face value becomes the Calculation Agent Expected Cash Flow Distribution. Both entities lodge appropriate performance bond (cash or in-kind securities) to guarantee their promises. The two parties appoint a Calculation Agent which agrees to gather information relevant to pricing the pool index swap as well as calculating changes to the performance bond, and publishes this information continuously on the system for the parties and any other interested market participant to see.

Results

As time goes by, the mortality of the pool unfolds, and in this example, there are fewer mortalities than expected during the period of the agreement (5 mortalities versus the 8 forecasted). In accordance with the terms of the swaps agreement, the buying party makes payments to the selling party with a total (undiscounted) value of $10,092,585. Discounting the cash flows by 4.0%, continuously compounded, the net present value (as of Jan. 5, 2006) of the swaps payments equals $7,726,305. The result is that the buying party loses money, and the selling party makes money (before deduction of fees).

Summary

In the above example, the pool index swap benefited the selling counterparty, who profited by approximately $7.7 million (before deduction for fees); the buying counterparty lost approximately $7.7 million (before deduction for fees).

Figure 33:
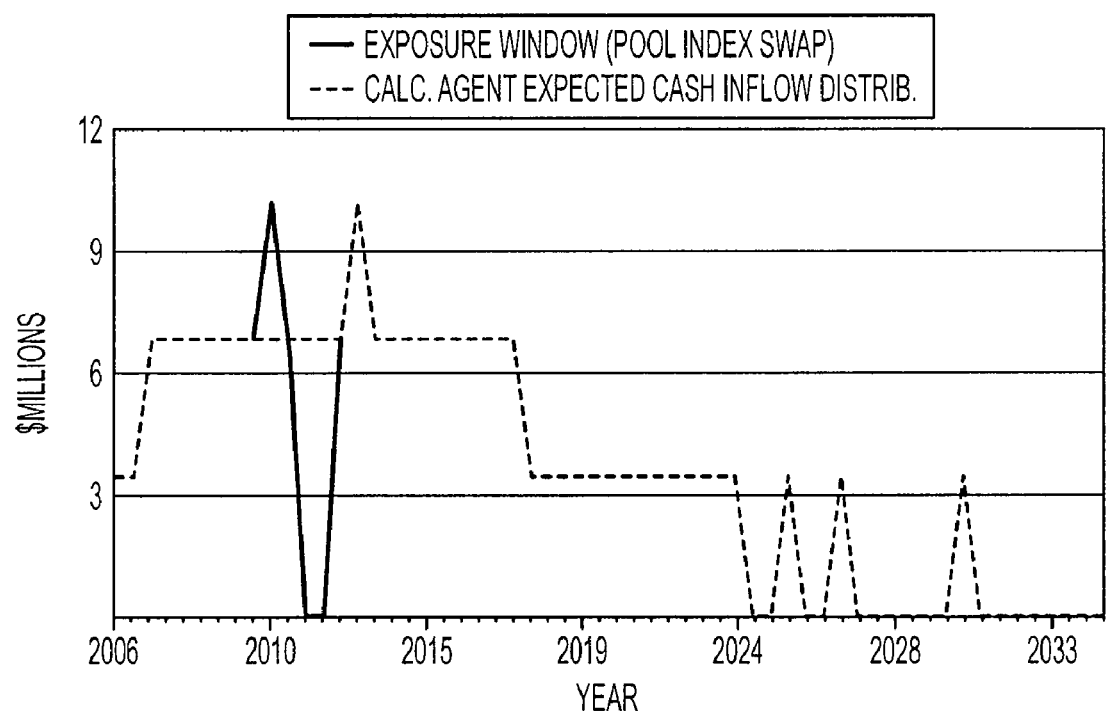
FIG. 33 is a graph of an example of actual and expected cash flows.

The light-shaded line in FIG. 33 represents the Calculation Agent Expected Cash Inflow Distribution, used to determine the value of the pool index swap at any time. For this example, the dark-shaded line indicates the actual cash flows determined as the product of the actual mortality multiplied by the average face value.

The following table lists (for illustration purposes, swaps cash flows are summarized for each six-month period. In practice, there may be intermediate cash flows, perhaps as frequently as every two weeks, depending on the counterparty creditworthiness and the amount of performance bond lodged by either party) the cash flows generated by the pool index swap as well as the net present value (computed as of Jan. 5, 2006) of those cash flows (cash flows are presented from the point of view of the buying or "long" party):

| Date | Expected mortality | Expected cash in-flows (not discounted) | Actual mortality | Actual cash in-flows (not discounted) | Cash flows from Pool Index Swap (not discounted) | Net present value of cash flows from Pool Index Swap |
|---|---|---|---|---|---|---|
| July 2010 | 2 | 6,728,390 | 3 | 10,092,585 | 3,364,195 | 2,754,370 |
| January 2011 | 2 | 6,728,390 | 2 | 6,728,390 | 0 | 0 |
| July 2011 | 2 | 6,728,390 | 0 | 0 | −6,728,390 | −5,292,739 |
| January 2012 | 2 | 6,728,390 | 0 | 0 | −6,728,390 | −5,187,936 |
| Total | 8 | 26,913,559 | 5 | 16,820,974 | −10,092,585 | −7,726,305 |

**NPV is computed as of Jan. 5, 2006

The following is an example of a preparation for cash flow longevity swaps on pools of longevity-affected assets or liabilities (necessary for each pool). The example given is for a pool of life settlements, although any asset or liability affected by longevity (e.g. annuities, xxx, axxx, life insurers, reinsurers, pension funds, health care providers) is intended to be covered:

1. Contact beneficial owner of pools, as the owners are most likely to be motivated to create a swap allowing the owner to hedge longevity and cash-flow variance exposure;

2. Obtain, for each unique insured: name, SSN, address, policy(ies) including illustrations, signed HIPAA release, date of birth, complete medical records, medical underwriting reports (life estimates), attending physician's report, and any other information possessed by the pool owner about the insured relevant to project mortality (for example, lifestyle risks).

3. Obtain pool owner's irrevocable consent for swaps engineer/calc. agent to contact:
  a. medical underwriters to verify accuracy of LE1s and that LE1s presented are the most current on file at the medical underwriter;
  b. insured, as representative of the pool owner;
  c. carrier to confirm in-force status of policy and other policy details including insured's name, SSN and address, premium projections, dividend rate, COI schedule, account balance, beneficiary, and owner (if different from beneficiary);
  d. attending physician and any other medical institute to verify records and authorship;
  e. pool owner's tracking agency together with authority for tracking agency to send all tracking information simultaneously to both ICAP and pool owner.

4. Gather local crime index for home address of insured and convert to mortality scaling factor (multiplier); convert any lifestyle risks into one or several age-specific mortality scaling factors;

5. Redact personally identifiable information from data including, on an as-needed basis, the names and addresses of the attending physician or medical institute. Replace insured's address with nearest contiguous tri-state region and the local crime index. Alter date of birth as described in next step.

6. Document-on-demand (server-side created) document (e.g., a .pdf), contains entire redacted data. When prospective swaps counterparty (prospect) wants to look at redacted data, then prospect must login with an account (redacted data is password protected behind an account), and system knows who is accessing that data (IP address of computer as well as account name is stored). When a new account first requests pool data (delivered via a .pdf, e.g.), the system server randomly assigns a birth date from within a range of six months, ±3 months each side of the actual birth date, for each unique insured. Then this document is saved on file as corresponding to a particular user. In this way, each user has a unique and identifiable document. If later there circulates unauthorized copies of the document (assuming the document is not substantially altered), then the system will know immediately from which account the document was distributed. The document generated may have additional encryption and tracking functionality (cryptlok intellectual property protection device or similar) so that each download is more certain to be unique and can be identified later. Prepare summary for each unique insured that will be accessible by any potential swaps party. Summary info to include: age within half-year, gender, smoker/non-smoker, underwriting company(ies) together with corresponding LEs and their preparation date, carrier, crime and lifestyle multiplier if relevant, reference mortality distribution, policy type, term, agreed projected premium schedule, tracking costs, death benefit, expected interest and dividends, extrapolated probabilistic cash in flows and out flows;

7. The name and address are arguably pertinent (lifestyle or celebrity risks). The pool owner knows this information, while no swaps counterparties will know this information. Dealers and swaps counterparties are made aware of this information asymmetry risk.

The following is an example of a negotiation of first swap (open interest=1):

1. Locate two counterparties with differing views on a pool's value and who wish to trade;

2. to initiate swap, the Calculation Agent guides (through use of interactive software) each party to agree on: a) logical reference distribution for the pool; but with b) as few restrictions as possible to increase fungibility of the swap which will facilitate hypothecation as well as the potential to increase open interest in the swap;

3. Calculation Agent suggests a reference mortality distributions based on one LEI the other or a blend of LEs, including "check the box" compound multipliers for lifestyle risks like crime index and other lifestyle risks. Note: the Calculation Agent's job is not to erode disagreement over projected mortality distributions (otherwise no trade) but is to help negotiate a reference distribution which will probably be some midpoint between the two distributions;

4. Once the parties agree on a reference distribution for each unique insured, for each policy issued on the insured, the Calculation Agent helps each party agree on a fixed projection of premium payments, tracking costs, dividends, interest and benefits (either the amounts are agreed to be fixed, or some formula with interest or other variables is agreed fixed);

5. For each unique insured, the Calculation Agent uses the agreed reference distribution and multiplies each agreed in flow and out flow by its duration-matched probability, then computes cumulative probability-weighted cash in flows and out flows for each six month period for the life of the pool;

6. For ease of reference, the Calculation Agent combines all cumulative probability-weighted net cash flows (probabilistic in flows less probabilistic out flows) for the whole pool, as this information can be presented in one chart;

7. Each probability-weighted net cash flow is discounted to its present value using the LIBOR zero rate matching the swap's expiry;

8. the swap is an agreement to exchange cash flows that differ from the probability-weighted projected cash flow (no notional needs to be exchanged, although it can be to enhance the utility of the swap);

9. expected payoff for each swap is nothing, so an investment in the swap should, in theory, cost nothing (except margin);

10. Calculation Agent uses stochastic modeling to show each party the expected volatility of cash flows (the greater the number of unique insured, the lower the expected volatility of cash flows; the greater the face value variance, the greater the volatility of cash flows);

11. depending on tolerance of parties to counterparty credit risk, the Calculation Agent computes a 2, 3 or some other number of sigmas to create volatility bands above and below the expected cash flow distribution, and this is used in the margin computation;

12. cash margin is deposited in an interest-bearing account; in-kind securities (which could include the pool assets at some multiple of loan-to-value) are held in escrow;

13. given current market opinion, swap parties likely agree on some spread above LIBOR for desired yield. The LIBOR discounted net present value of the swap's reference value (initial reference value) is adjusted down accordingly (aggressor controls);

14. negotiated price becomes initial market price: midpoint between bid/ask is net present value of swap, and 15. as time goes by, market price changes due to: a) actual vs. projected deaths, and b) perception of projected vs. actual deaths before swap's expiry;

16. changes in projected vs. actual deaths for one period affects projected cash flows (and their market prices) of all future periods;

17. market price and projected cash flow together allow prospects to comment: "XYZ pool is trading at a yield of 9%, but is returning 5%", or "XY exposure window of pool XYZ is trading at a yield of 10%, but returning—(negative) 22%".

Examples of trading strategies include combine one or more swaps to obtain short term, long term or window exposures to the pool's cash flow variations from expected;

combine an investment in the pool with a combination of all swaps to yield LIBOR;

trade notional or some percentage of notional to create products which have complex deltas or which are synthetic asset purchases or sales;

trade the swap speculatively, if the speculator believes that the speculator's level of understanding of actuarial science relevant to that particular pool of individuals is better than the level of understanding displayed by the market in general.

Figure 34:
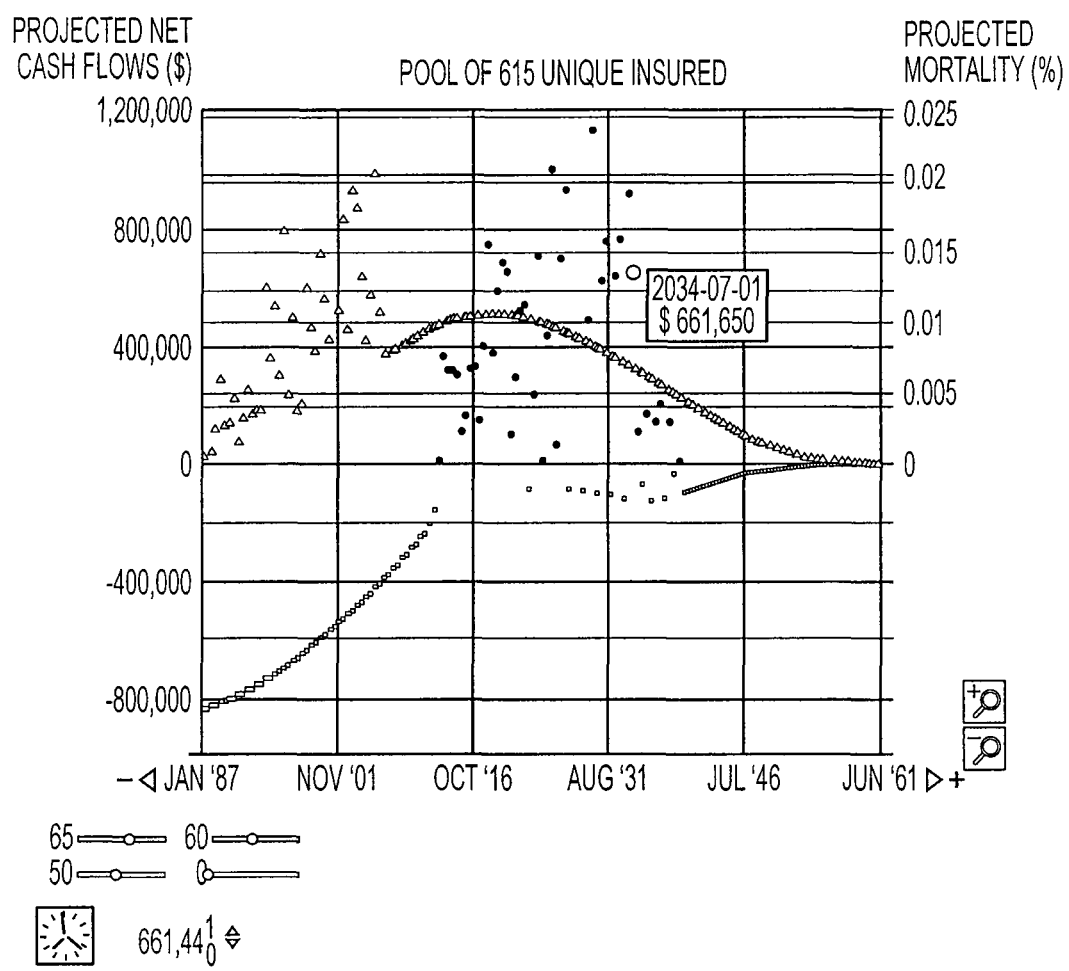
FIG. 34 is a depiction of an example of a user interface for viewing projected net cash flows and mortality.
Figure 35:
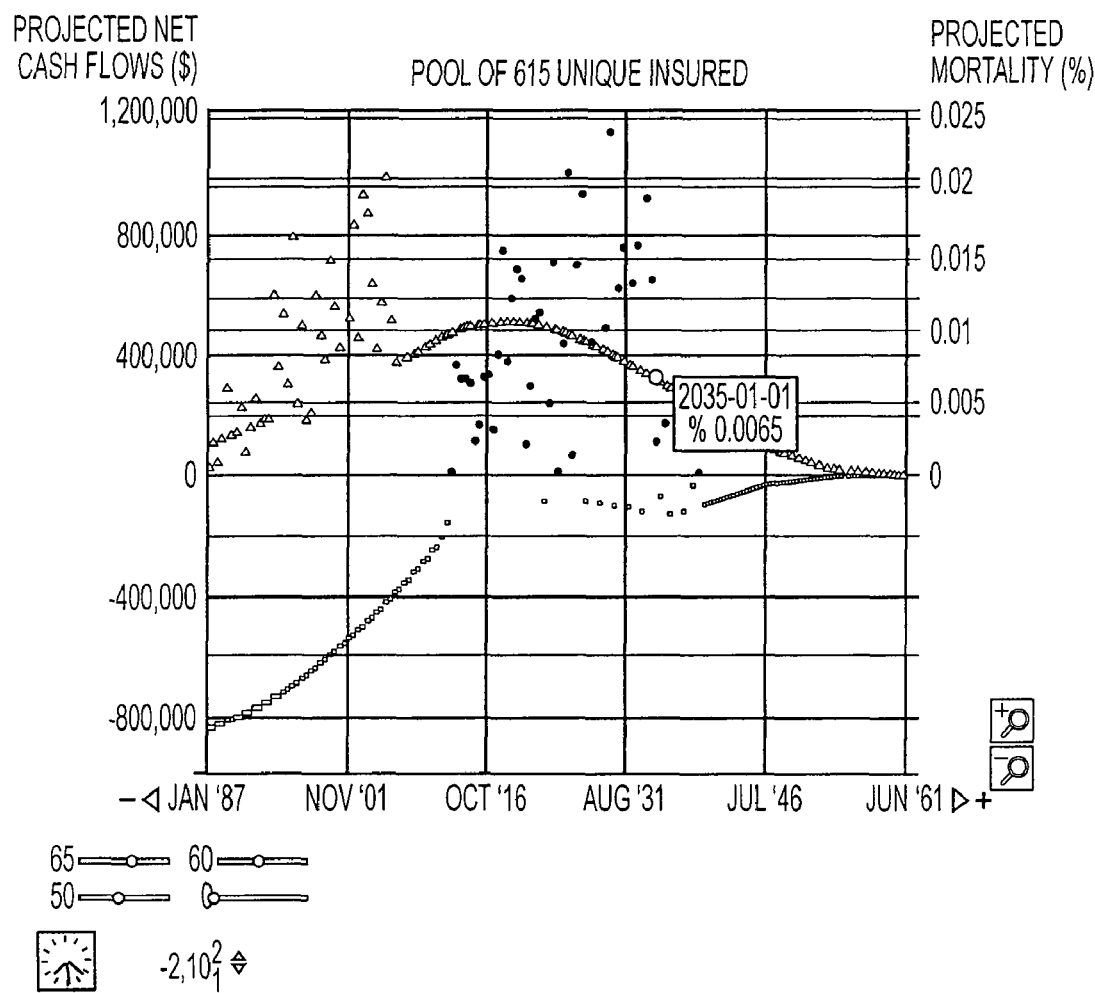
FIG. 35 is a depiction of an example of a user interface for viewing projected net cash flows and mortality.

FIG. 34 depicts an example of a user interface for viewing projected net cash flows and mortality of pool of life settlements (615 unique insured). When the user interface senses a mouse rolling over a particular data point, it provides the relevant information for that data point. For example, the user interface in FIG. 34 displays projected new cash flow data in response to a mouse roll-over of a data point, while FIG. 36 displays projected mortality data in response to a mouse roll-over of a data point.

Figure 36:
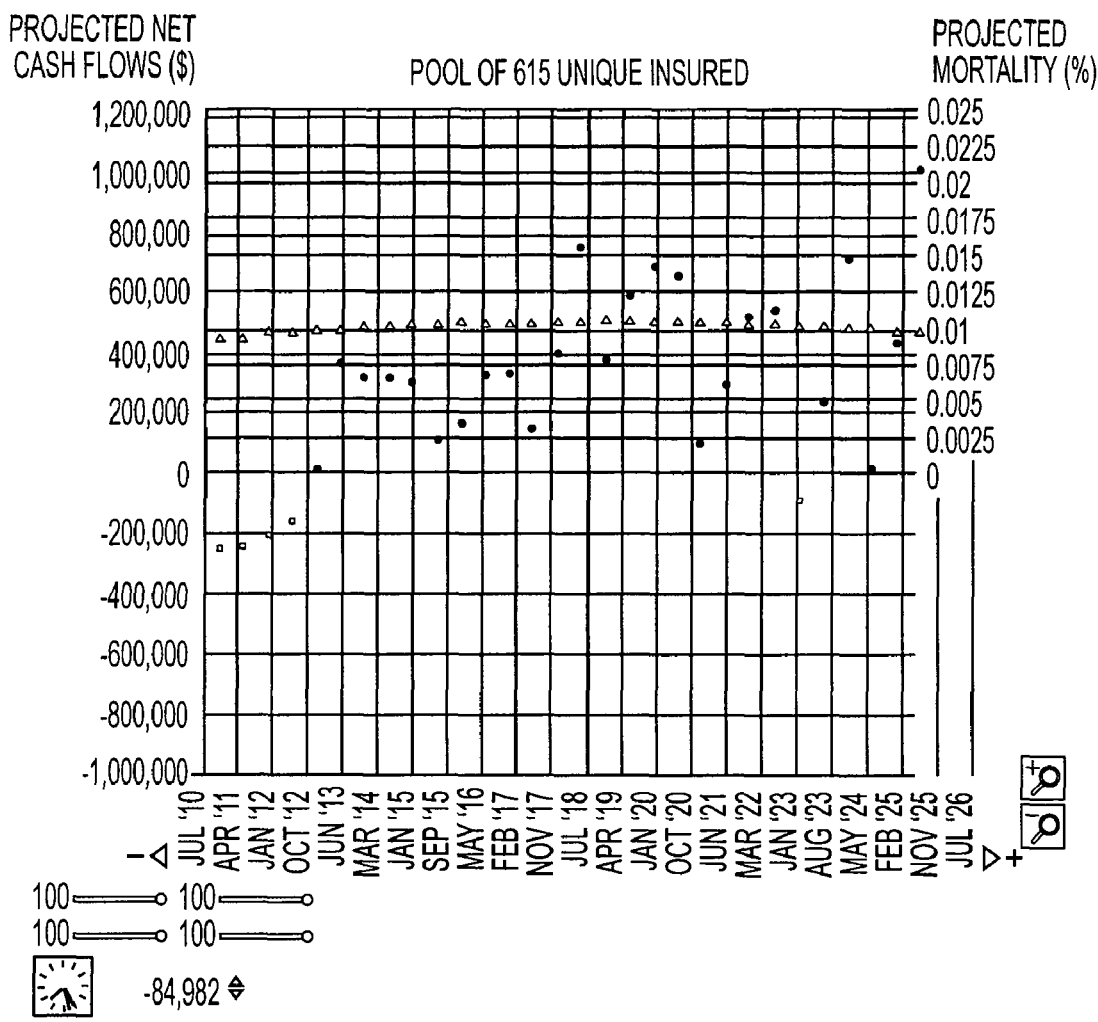
FIG. 36 is a depiction of an example of a user interface for viewing projected net cash flows and mortality.

FIG. 36 depicts an example of navigation functionality of the user interface, such that a user can zoom in on a portion of the graph in the main display window using the sliders in the lower left-hand corner, while the user can maintain a zoomed-out view of the graph in the smaller display window below the main display window. The smaller display window has a shaded portion that represents the zoom-in portion currently being viewed in the main display window.

Besides displaying projected net cash flows and mortality data, the trading system may also allow trades to be entered via the user interface. The user interface may include the following functionality:

a) enable user to view a visual display (charts) of a plurality of mortality distributions relating to a pool of individuals. The x-axis is time, and the limit of the distribution is the year when the oldest insured would have lived to 110 years. The y-axis is either percentage probability or actual mortalities. Each value of a distribution is a partial sum of mortalities over [e.g., six-month] periods. A complete distribution describes progressive six-month partial sums, that together add to the total number of individuals in the pool. At least one distribution describes historical (actual) mortalities, if any. At least one other distribution describes projected mortalities. Because no one knows which actuarial assumptions best match an individual or a pool of individuals, many projected mortality distributions can be individually or simultaneously displayed depending on various actuarial assumptions used to compute the values;

b) enable user to zoom into and out of the chart, and pan forward and backward in time, in real time, to help the user comprehend the data which spans many years (many more years than are usually looked by market participants);

c) enable user to interact by altering variables relating to mortality distributions and recalculate mortality distribution and cause the distributions to be re-plotted so that the user can see the effects of altering variables;

d) enable user to view graphical representation of the variance of projected mortalities based on random variance due to small population sample as well as variance in actuarial assumptions;

e) enable user to view historical (if any) and projected cash in flows, cash outflows and net cash flows related to the historical and projected mortality distributions. The cash flows are also summed by [six-month] period;

f) enable user to interact by altering variables relating to the cash in flows, cash out flows and net cash flows so the user can model different scenarios of event risk (face value payout variance and premium payout variance), and observe how these risks compound mortality risk;

g) enable user to view existing, and interact to create new, monte carlo simulations which show simulations of mortality distributions and cash flow distributions;

h) enable user to select a value on any distribution to display the summary statistics, precise x and y values, underlying assumptions and algorithm used to calculate the value;

i) enable user to view a projection of LIBOR or other zero-curve rates throughout the expected life of the pool;

j) enable user to select a value [six-month partial sum] from a distribution of historical and projected net cash flows to see:

a. the net present value of the partial sum, discounted by the LIBOR or zero-rate corresponding to the time the change over time of this value depending on variations observed between actual and projected mortality and face value variance;

b. current and historic bids and offers, volume and open interest if one or a plurality of contracts exist (swaps or other types of instrument) whose values are related to one or a plurality of six-month partial sums of cash flows;

c. information about the user's as well as other trader's history of bids, offers and closed trades, margin available, profit and loss, balance, credit rating and other information useful for making trading decisions.

k) enable user to implement or attempt to trade: enter one or a plurality of bids or offers, contingent or otherwise, or enter any other type of order, or execute a trade by entering a bid equaling the price of the highest offer, or entering an offer equaling the lowest asked price, assuming one or a plurality of contracts exists.

Figure 37:
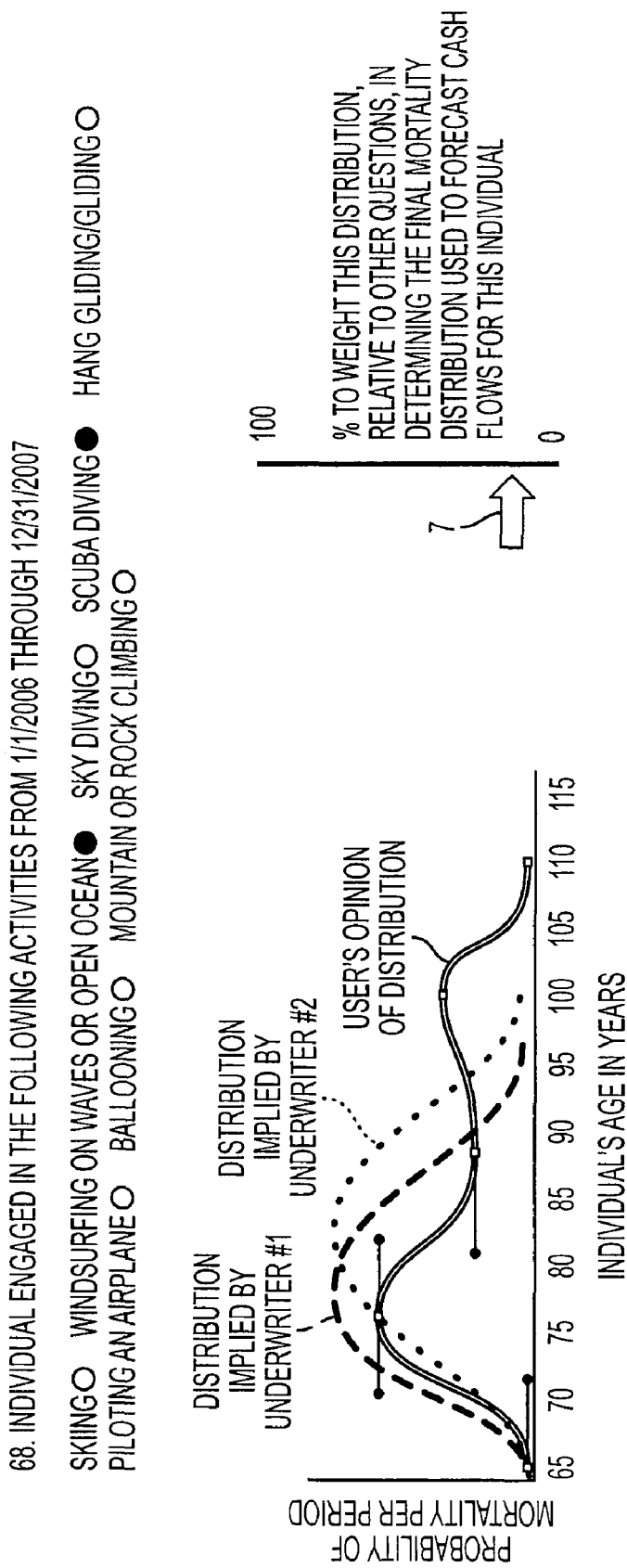
FIG. 37 is a depiction of an example of a user interface for analyzing a mortality distribution.

FIG. 37 depicts an example of a user interface that enables a user to analyze a mortality distribution. The user interface may display information (responses to questions, for example) about insured individuals upon whom the mortality distribution is based, so that a user can determine an opinion about longevity associated with that person. The user interface may also provide interactive display controls to allow the user to subsequently adjust a mortality distribution for the insured based on the user's perception of the information, as well as weight the adjusted-distribution as a percentage of the distributions adjusted for other parts of the information (other responses, e.g.). The manipulation of the mortality distribution may take into account complex mortality distributions including skew, kurtosis, multiple modes, standard deviation, variance and other moments about the mean.

Figure 38:
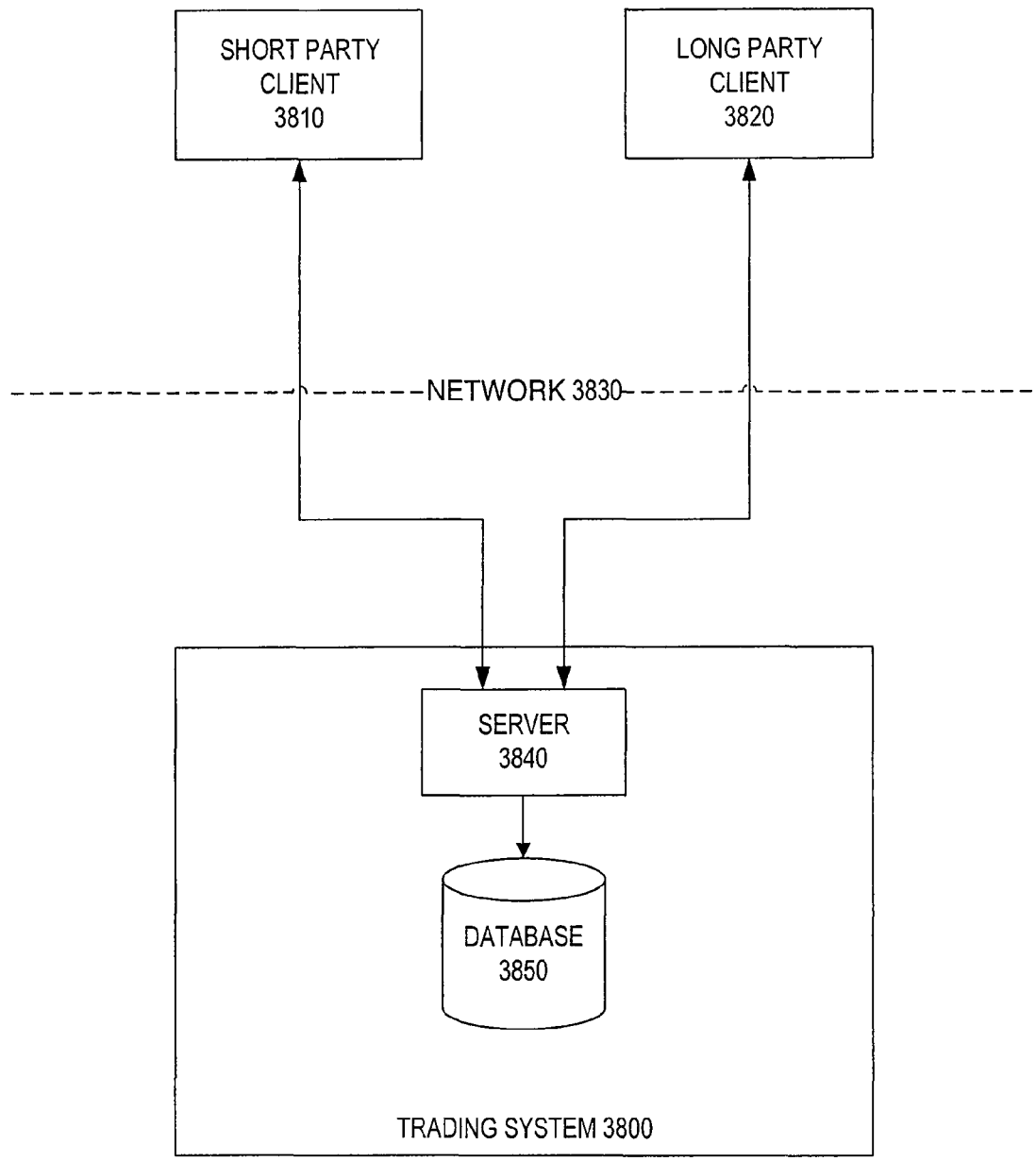
FIG. 38 is a block diagram of an example of a network trading system.

FIG. 38 is a block diagram of an example of a network trading system that may implement swaps in accordance with the present disclosure. Trading system 3800, which may include server 3840 and database 3850, provides and receives trade information to short party client 3810 and long party client 3820 over network 3830.

Figure 39:
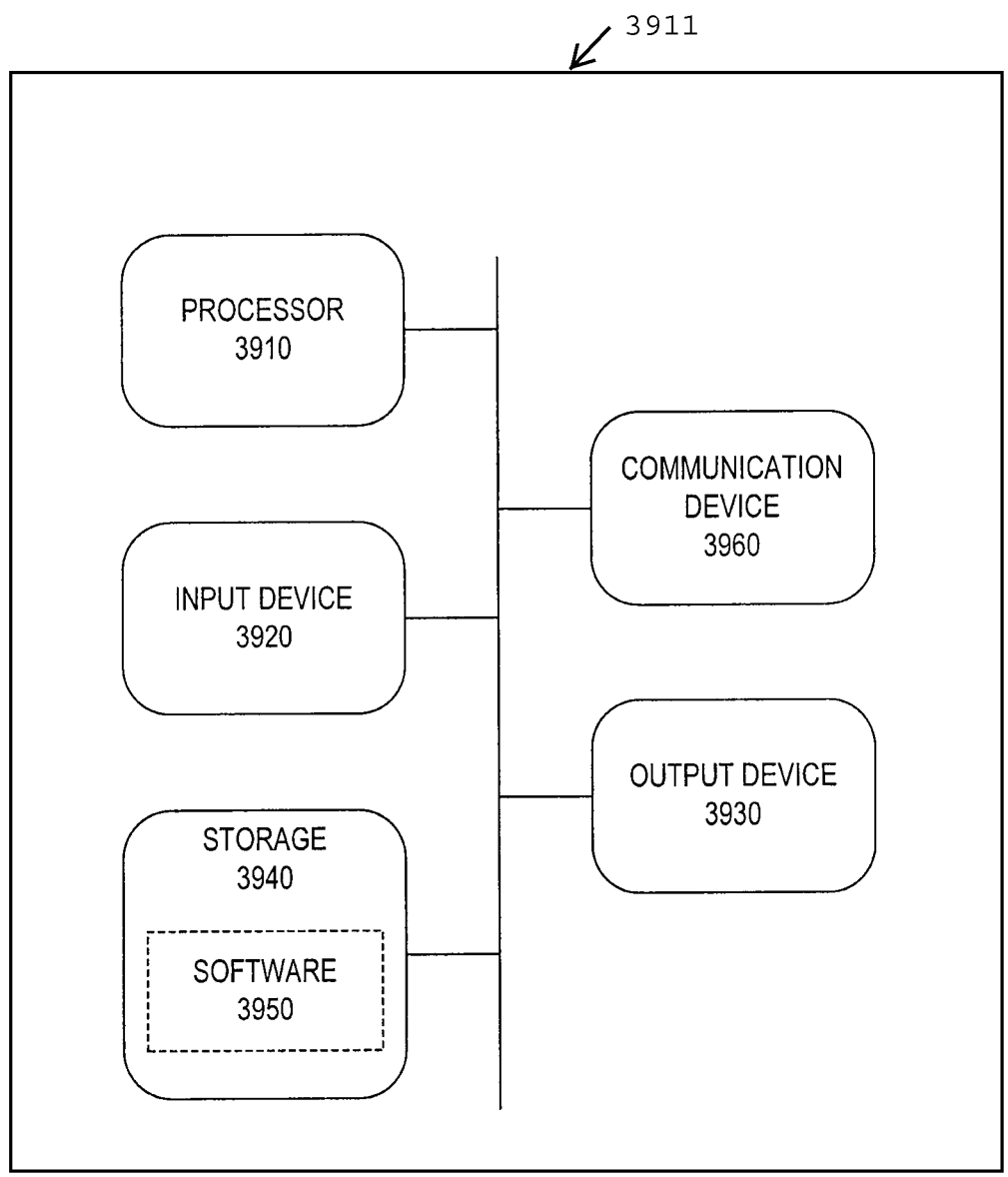
FIG. 39 is a block diagram of an example of a basic computing device.

FIG. 39 is a block diagram of an example of a basic computing device, which may include short party client 3810, long party client 3820 and trading server 3840. The computing device may be a personal computer, workstation, server, handheld computing device, or any other type of microprocessor-based device. The computing device may include, for example, one or more of processor 3910, input device 3920, output device 3930, storage 3940, and communication device 3960.

Input device 3920 may include, for example, a keyboard, mouse, pen-operated touch screen or monitor, voice-recognition device, or any other device that provides input. Output device 3930 may include, for example, a monitor, printer, disk drive, speakers, or any other device that provides output.

Storage 3940 may include, for example, volatile and non-volatile data storage, including one or more electrical, magnetic or optical memories such as a RAM, cache, hard drive, CD-ROM drive, tape drive or removable storage disk. Communication device 3960 may include, for example, network interface card, modem or any other device capable of transmitting and receiving signals over a network. The components of the computing device may be connected, for example, via a physical bus or wirelessly.

Software 3950, which may be stored in storage 3940 and executed by processor 3910, may include, for example, the application programming that embodies the functionality of the present disclosure (e.g., as embodied in trading system 3800). Software 3950 may include, for example, a combination of servers such as application servers and database servers.

Network 3830 may include any type of interconnected communication system, which may implement any communications protocol, which may be secured by any security protocol. The corresponding network links may include, for example, telephone lines, DSL, cable networks, T1 or T3 lines, wireless network connections, or any other arrangement that implements the transmission and reception of network signals.

The computing device may implement any operating system, such as Windows or UNIX. Software 3950 may be written in any programming language, such as C, C++, Java or Visual Basic. In various embodiments, application software embodying the functionality of the present disclosure may be deployed on a standalone machine, in a client/server arrangement or through a Web browser as a Web-based application or Web service, for example. In an embodiment of the present disclosure, trading system 3800 may implement the processing of trade data in a spreadsheet program, such as Microsoft Excel, and provide the processed data to a web server for presentation to short party client 3810 and long party client 3820, for example.

Note that the computing device (3911) may be a single computer or a networked group of computers, servers or microprocessors. According to one aspect of the present invention, a non-transitory computer readable medium tangibly embodying a software program or a plurality of software programs is provided, comprising: receiving an order through a computing device (3911) to trade a financial instrument in which counterparties agree to exchange an cash flow stream difference associated with, but not perfectly correlated to at least one asset or liability affected by longevity risk characterized by underlying difficult to ascertain mortality distributions (difficult to ascertain mortality distributions may be, individually or taken as a whole: a) generally misunderstood or unknown; b) cannot be assumed normally distributed even at large numbers, yet are generally assumed so; c) subject to information asymmetry); calculating by the computing device (3911), for each individual, whose lifespan affects the cash flows of the asset or liability, a morbidity description expressed as at least one mortality scaling factor for at least one age of each individual, a survivorship distribution that varies with time and a mortality distribution that varies with time, a net cash flow projection distribution that varies with time, where each distribution value in the net cash flow projection distribution is computed as the probability-adjusted cash in-flow expected over a period, less the probability-adjusted cash out-flow expected over the same period; calculating by the computing device, for each individual, for each view, using the net cash flow projection distribution, a net present and net forward value distribution that varies with time; accepting through a computer device, the starting and ending dates over which the counterparties wish to exchange the cash flow stream difference to be exchanged for each of the counterparties to provide at least one exposure period; accepting through a computing device, an input (may be a function) for computing a performance bond amount to be levied on the counterparties, where the performance bond amount is insufficient to collateralize cash flow differences anticipated over the exposure period, and where the input uses data from either the net cash flow projection distribution or from the net present and net forward value distribution depending on the risk transfer preferences of the counterparties; receiving through a computing device, over time, updated mortality information and morbidity information underlying the longevity risk; and recalculating by a computer-readable medium storing instructions executable by a processor, distributions affected by the updated mortality and morbidity information to provide recalculated distributions; calculating, using the recalculated distributions, the difference to be exchanged for each of the counterparties wherein the difference to be exchanged cannot be greater than the performance bond for each of the counterparties.

The present invention may comprise the step of accepting through a computing device, for each individual whose lifespan affects the cash flows of the asset or liability, three views of morbidity (for example, 4000, 4002 and 4004) wherein each view is expressed as at least one mortality scaling factor for at least one age of each individual, where a first view is determined by generally accepted actuarial process to be the most likely match to the actual morbidity now and in the future, a second view is comparatively more-impaired than the most likely match, and where a third view is comparatively less-impaired than the most likely match.

Each exposure period may includes at least one calculation period, each calculation period being no longer than the exposure period, and the exposure period being no longer than the expected maturity of the at least one asset or liability. The counterparties may include a seller and a buyer, and the present invention may further comprising the steps of:

incorporating the updated mortality and morbidity information, and after each calculation period, computing the inputs and distributions, wherein if the cash flow stream as measured historically over the calculation period and projected over the remainder of the exposure period is determined to be lower than that which was computed at the beginning of the calculation period, the buyer becomes indebted to the seller for a calculated difference, and if the cash flow stream as measured historically over the calculation period and projected over the remainder of the exposure period is determined to be higher than that which was computed at the beginning of the calculation period, the seller becomes indebted to the buyer for a calculated difference. The at least one exposure periods may be at least two successive periods. The mortality information may include whether fewer than or more than the expected number of mortality events occurred over the calculation period, and wherein the morbidity information includes any new information, or the lack of expected information, received over the calculation period.

Each asset or liability is may be, for example, any asset or liability affected by longevity risk, life settlement contracts, life insurance policies, annuities, reverse mortgages, long term health contracts, post employment benefits, and pensions.

The method according to the present invention, may be further comprising: providing, via a user interface, a graphical representation, at any point in time, of the expected mortality distribution, net cash flow projection distribution, net present and net forward value distribution, and performance bond values for each calculation period of exposure and for the total exposure period, for both the buyer and seller.

The user interface may simultaneously provides a first view for displaying a zoomed-in portion of the graphical representation and a second view for displaying a zoomed out portion of the graphical representation. The method may further comprise the steps of:

providing, via a user interface, information disclosed by a person upon whom the longevity risk is, at least in part, based; and providing, via the user interface, interactive display controls to allow a user to adjust any of the mortality scaling factors or the survivorship distributions, including the distributions' mean, median, mode, or polymodality, and moments about the mean including variance, skewness and kurtosis. There may also be the step of accepting through a computing device, at least one related cash flow projection function the result of which is a cash flow projection distribution description that will vary with time.

The step of computing a performance bond for each of the counterparties may be according to at least one of the updated mortality information, morbidity information, survivorship, mortality, cash flow projection, net present value distribution and forward value distributions. The input may be selected from the group consisting of function, a life table and distribution. The risk transfer preferences may be selected from the group consisting of generally accepted actuarial processes to be the most likely match to the actual morbidity now and in the future, comparatively more-impaired than the most likely match, and comparatively less-impaired than the most likely match. There may also be the step of computing a Monte Carlo simulation using mortality distributions drawn from a first view, a second view and a third view. There may be the step of accepting through a computing device, for each individual longevity risk that affects the asset or liability, three survivorship and mortality inputs the result of which is three mortality distribution descriptions that will vary with time, a first mortality distribution description being a more impaired view, a second mortality distribution being an impaired view and a third mortality distribution being a less impaired view.

Consider, as an example, a number of life insurance policies issued to 210 people who each sold their policies to a single investor. The investor now owns a pool of life insurance policies and must pay yearly premiums on each policy linked to a person that lives, and will receive a payout for each policy linked to a person who dies. For each of the 210 individuals, estimate three perspectives (views) of each person's health using as a reference a normal person of the same age and gender of each of the 210 individuals. For argument's sake, let's call one of the views a relatively "more-impaired" view, another of the views a "less-impaired" view, and the third a view somewhere in between or most likely match to the actual morbidity now and in the future. These views may also be looked at as different "morbidity" views, where morbidity is the relative incidence of a particular disease or degree of unwellness.

Figure 40:
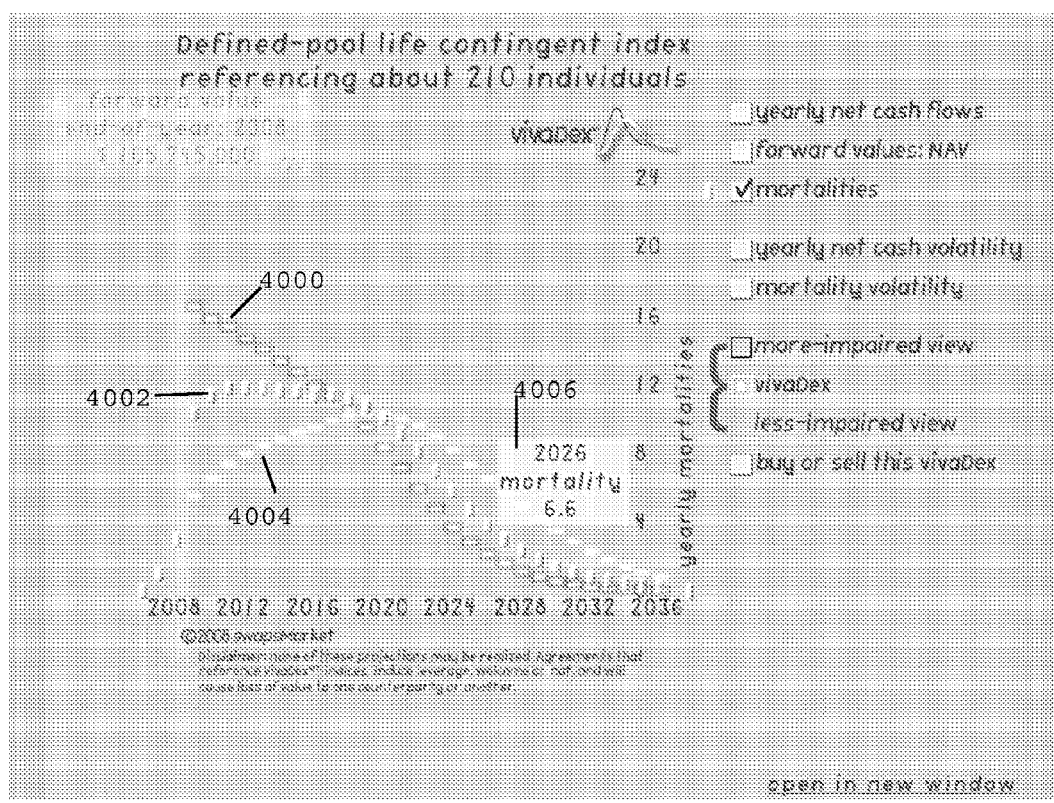
FIG. 40 is a screenshot according to the present invention.

For each view and for each individual, using actuarial tables combined with some opinion of relative health-impairment now and through the individual's life, compute a mortality distribution and related survivorship distribution. For each view, plot a chart showing the mortality distribution for the combination of 210 mortality distributions. FIG. 40 illustrates three such mortality distributions corresponding to three contrasting views of relative health-impairment. Each distribution (4000, 4002, 40004) is the sum of 210 mortality distributions (distributions for each individual are not shown graphically in this screenshot).

The top view in year 2012 is a "more-impaired" view (4000). Holders of this view see the group of 210 individuals generally dying off more quickly than do holders of the other views. The bottom view in year 2012 view is a "less-impaired" view (4004). Holders of this view see the group of 210 individuals generally dying off more slowly than do holders of the other views. The middle view in year 2012 is a middle ground view (4002), in this example it is labeled "vivaDex" and will be the one view agreed by holders of all views to be the "reference" view. A translucent information box (4006) on the main chart shows, for illustration purposes, where this user's mouse cursor hovered over the green chart dot of the year 2026. The "less-impaired" view for 2026 is that 6.6 individuals will die during that year.

Interestingly, at 2019 or thereabouts, regardless of view, the expected number of mortalities for that year is approximately the same across views, and informs users of the invention that the risks of holding differing views, at least for that year, are not as great as for other years. When we really want to hedge is approximately the time 2008-2018 and 2020-2032. 2019 and the closer you get to 2036 (the cross over points) there is less need to hedge, as all three estimations come to the same conclusion, so there is little uncertainty. The hedging cost you may be willing to pay would be less around 2019 and 2032 and up. Note that for each of the chart values (series of dots), the sum of all values will equal exactly 210, the number of individuals whose lifespan affects this portfolio.

Figure 41:
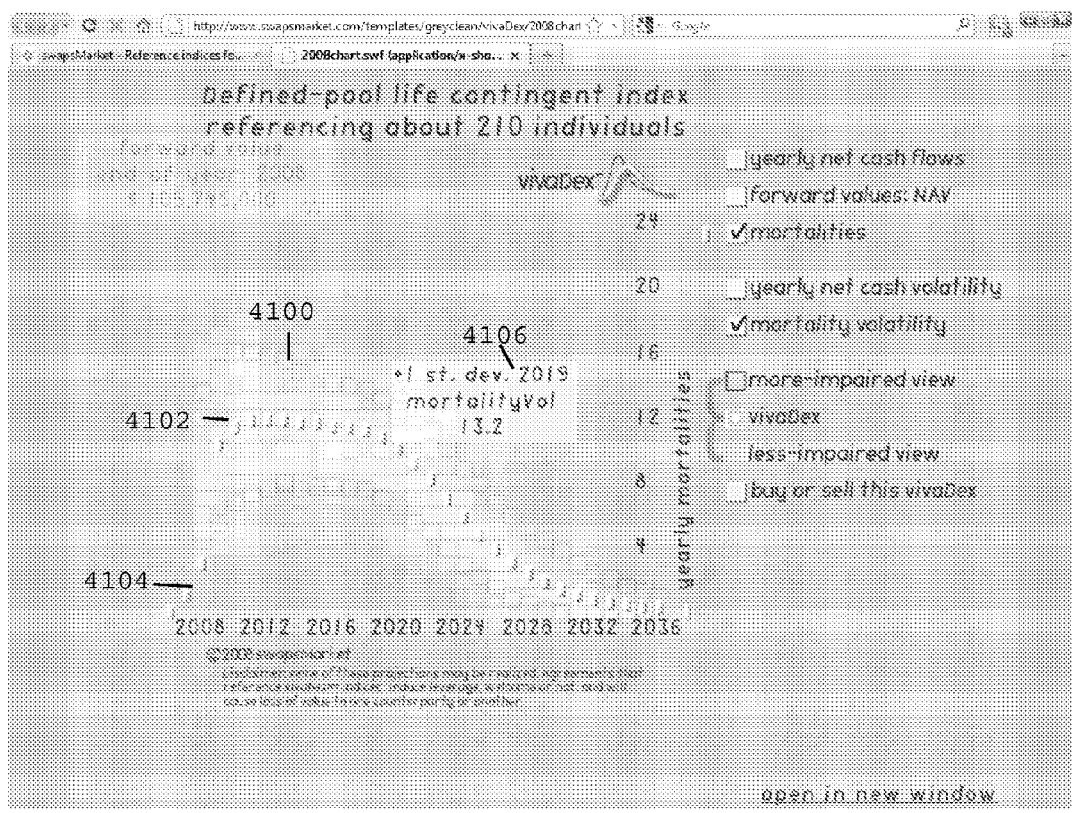
FIG. 41 is a screenshot according to the present invention.

We may compute a Monte Carlo simulation using hundreds, or thousands, of portfolio mortality distributions drawn from each of the three views as shown in FIG. 41 (for example a first view (4102), a second view (4100) and a third view (4104)). The purpose of this step is to illustrate the vertical (on the chart) spread and likely frequency (higher the frequency, more opaque the marker) of opacity) of mortality outcomes, each year and throughout all years, where the height of vertical spread is due not only to the three views, but also to unavoidable randomness inherent with a sample size of 210 individuals. The volatility from randomness due to sample size would decrease with a larger number of individual mortality distributions. Random noise due to the small sample size of this portfolio shows a user of the invention that the apparent convergence of views at 2026 illustrated by the previous screenshot is largely overshadowed by random noise variations from the small sample size. The contrast between source of risk can help a user of the invention determine if a hedging product is designed to hedge longevity risk arising from holding the wrong view, or simply from natural randomness due to sample size being too small.

Figure 42:
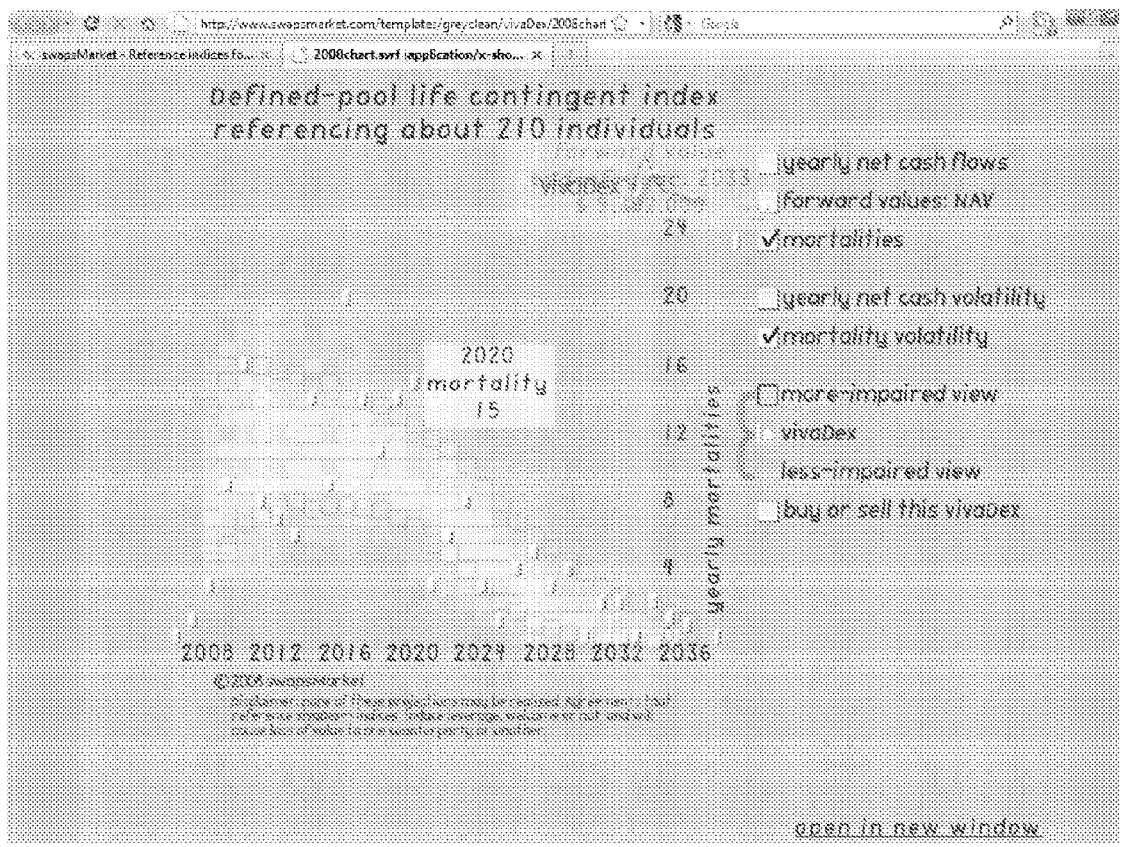
FIG. 42 is a screenshot according to the present invention.

A translucent information box (4106) on the main chart shows, for illustration purposes, where this user's mouse cursor hovered over a gray-outlined square marker corresponding to plus one standard deviations above a mean outcome from the Monte Carlo simulation for the year 2019. Taking just one mortality distribution scenario for this portfolio, as depicted in FIG. 42, we can see through the following screenshot just how variable each year's mortalities might be, and how different an actual mortality distribution may appear from any of the three views:

The screenshot in FIG. 42 is taken as if we are forward in time, at the year 2033, looking back on how the mortalities each year panned out for this portfolio. Approximately two-thirds of the time, the mortalities each year were between the range of plus one to minus one standard deviations predicted by the Monte Carlo simulation, as we would expect. However, practically speaking, that means users of the invention can see that it would not be unexpected, due to the small sample size of lives, for there to be 15 mortalities in 2020 (shown by the information box in the chart) and then to have 3 mortalities the following year.

Figure 43:
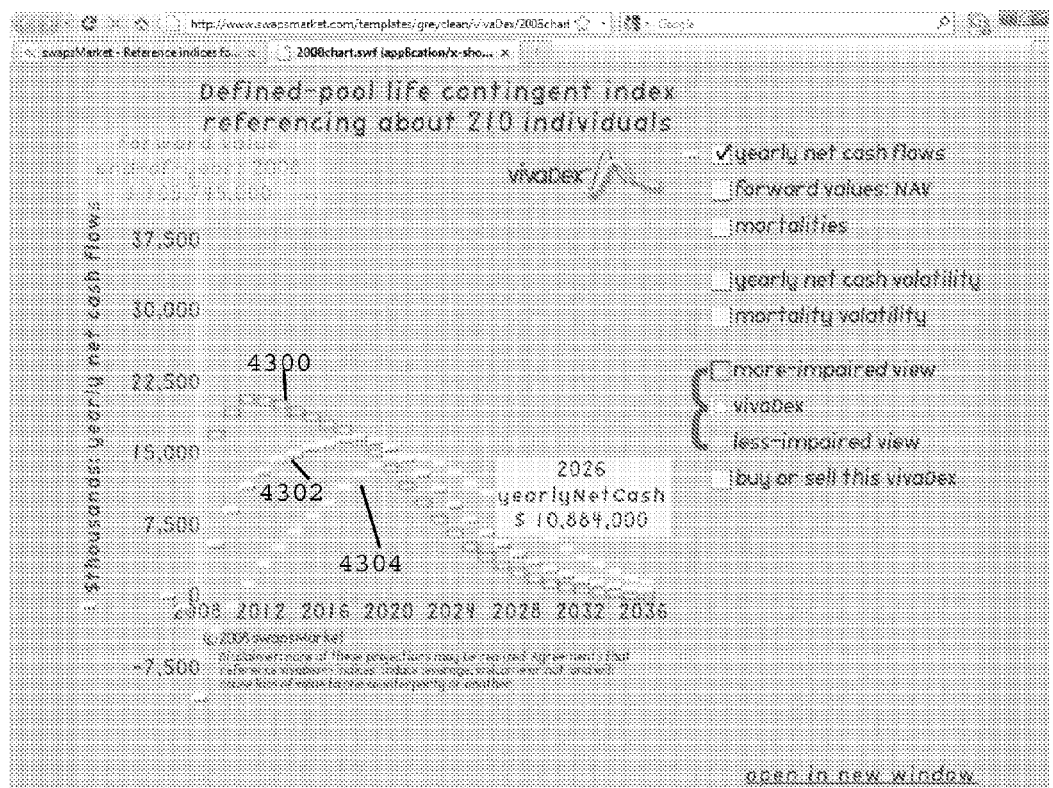
FIG. 43 is a screenshot according to the present invention.

For each view and for each life insurance policy linked to each of the 210 individuals, we may compute the yearly outflows (yearly premium payments) using the survivorship distribution, and compute yearly inflows (mortality payout amount) using the mortality distribution. Combine the flows for each year to give, for each view, net yearly cash flows, as shown in FIG. 43.

Note that, in the early years, the "less-impaired" view (4304) projects that yearly cash flows to the investor will be negative. Also note that, due to premiums and payouts varying among life insurance policies, cash flow variance is an introduced risk and compounds the ever present longevity risk. As a result, the yearly cash flows appear to more highly variable than if we simply looked at the mortality variability alone.

Figure 44:
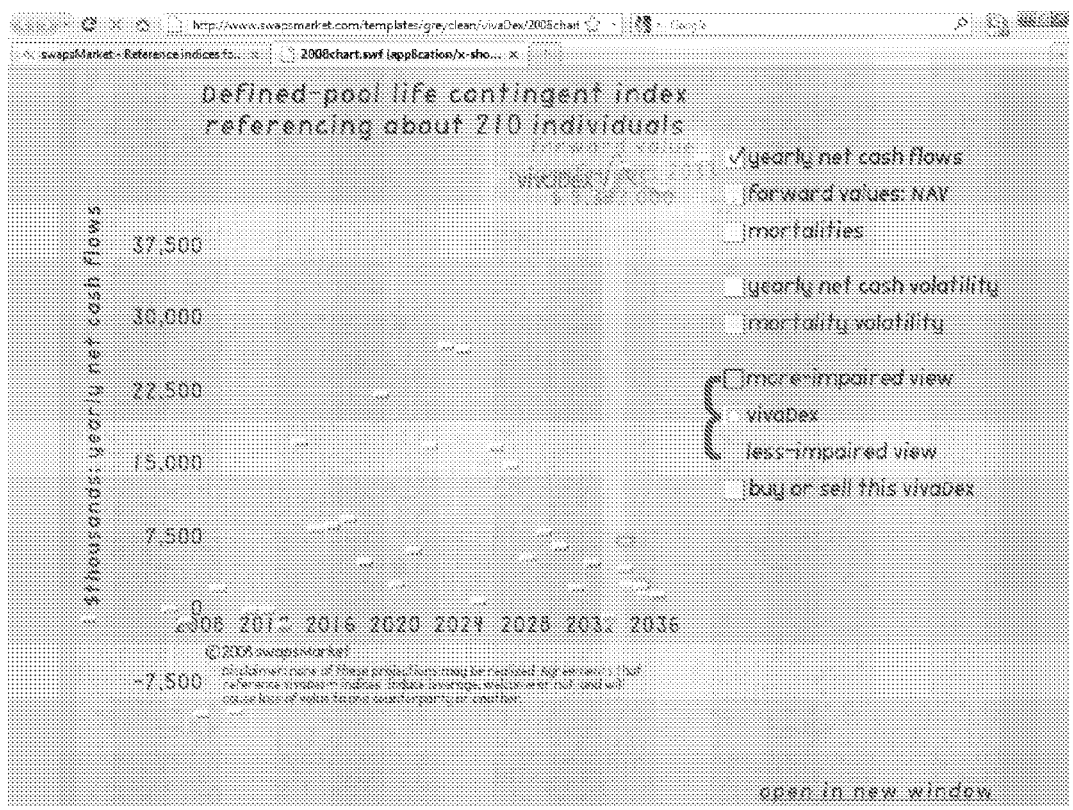
FIG. 44 is a screenshot according to the present invention.

We can compute the yearly net cash flows that would correspond to the same mortality distribution scenario we used for our look back in FIG. 41, and we can see how the cash flow uncertainty appears greater than that implied by only the mortalities. In FIG. 44, we can see that it would not be unexpected to have a $25 million difference in net cash flow from one year to the next (year 2024 to year 2025).

Figure 45:
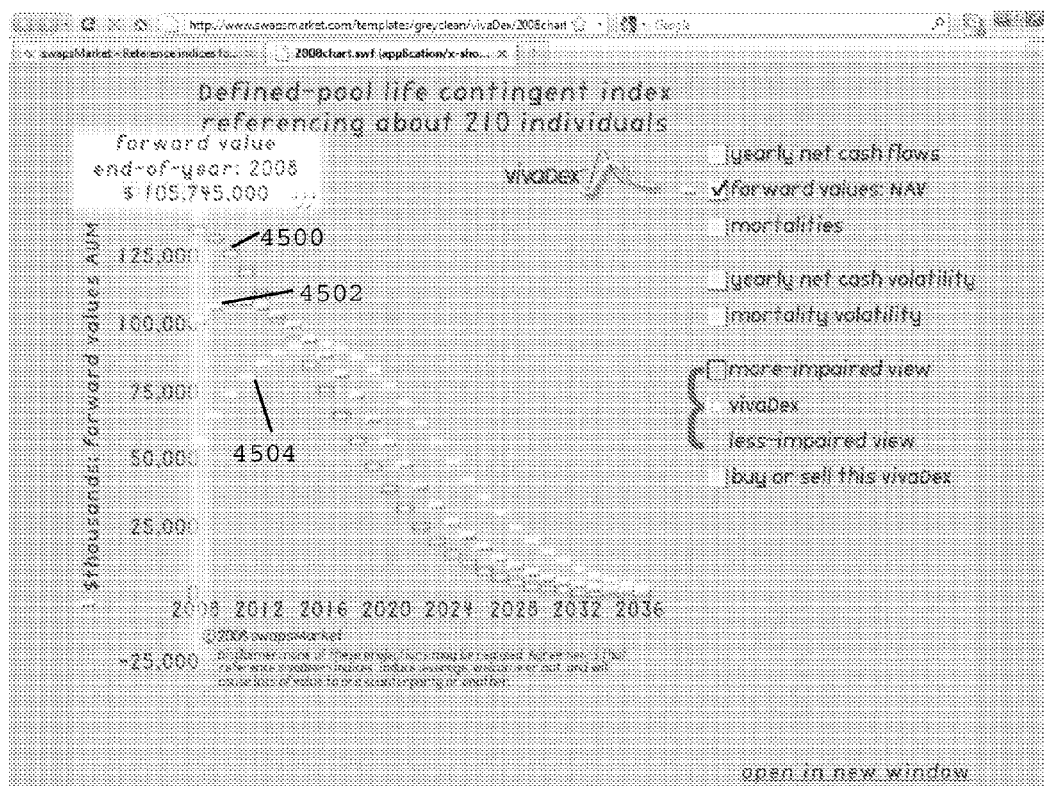
FIG. 45 is a screenshot according to the present invention.

For each view and for each life insurance policy linked to each of the 210 individuals, we may compute the yearly net present and future values of the portfolio by using the yearly net cash flows illustrated earlier, and discounting them. It makes most sense to use the risk-free discount rate, as we have taken into account already the other risks. Using a discount rate in excess of the risk-free rate may have its uses, but would be double-counting. Note: this view and method step may be controversial, as most market participants are used to using a discount rate in excess of the risk free rate. Combine the net present and future values for each policy, and for each view, compute the net present and future value of the portfolio with reference to FIG. 45.

The screenshot above illustrates the net present value and future values at each subsequent year of this portfolio, under the three view's (4500, 4502, 4504). Note that the portfolio is exhausting in value as years pass, as we would expect, and that its value is highest if one holds the "more-impaired" view (4500). That is because if people die sooner, we pay fewer years of premiums, and receive payouts more quickly than if the portfolio exhausts according to the "less-impaired" view (4504).

Note that this portfolio has a range of net present values depending on which view a user believes in: at the low end, the "less-impaired" view (4502) indicates the portfolio is worth a little more than $50 million as of 2008, and will increase in value before it decreases in value as years pass. The "more-impaired" view (4500) indicates the portfolio is worth more than $125 million as of 2008 and will steadily decline in value as years pass.

Figure 46:
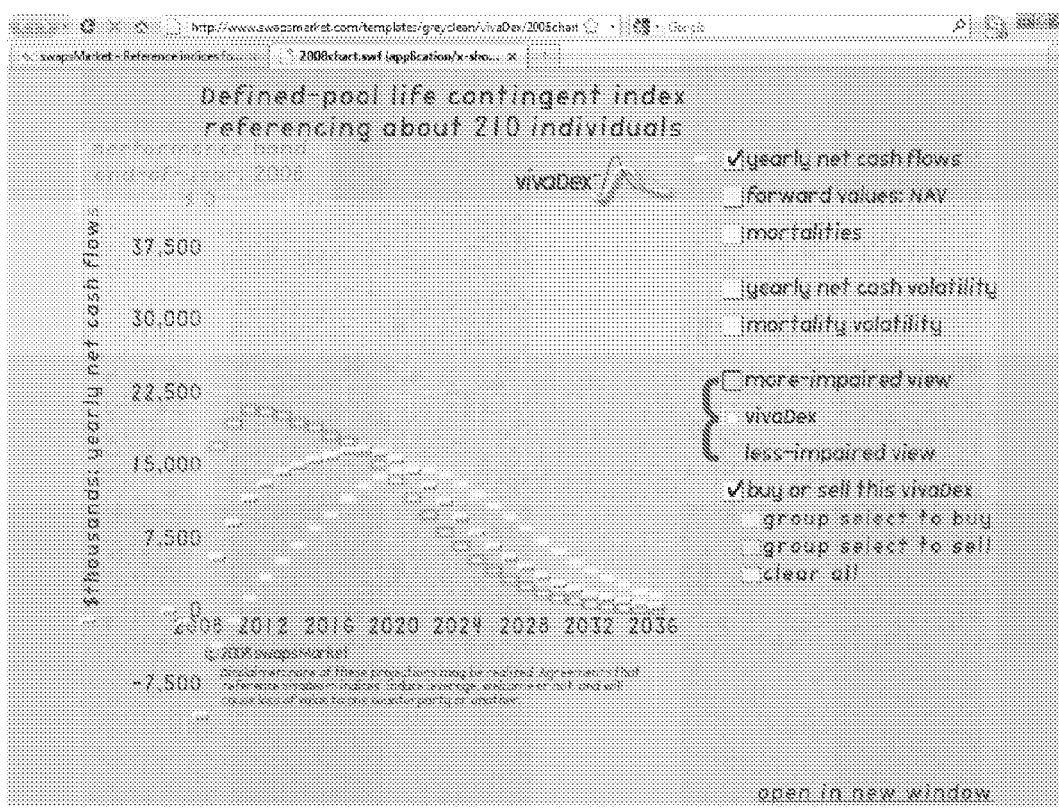
FIG. 46 is a screenshot according to the present invention.

Leaving to one side the uncertainty due to small sample size (not shown), this figure allows users of the invention to determine which years might be ideal to hold or to hedge this portfolio. With the context of rolling net present value (present and future values) in mind, the next step is to return to the Net Yearly Cash flow chart, as shown in FIG. 46.

And now we determine an exposure period over which a risk transfer is sought (let's say 6 years from beginning of 2010 through 2015) and elect calculation periods of one year, so that the performance bond is computed at the beginning of each year, with cash flows to change hands each year (with or without a lag to allow some time to collect mortality and morbidity information).

Figure 47:
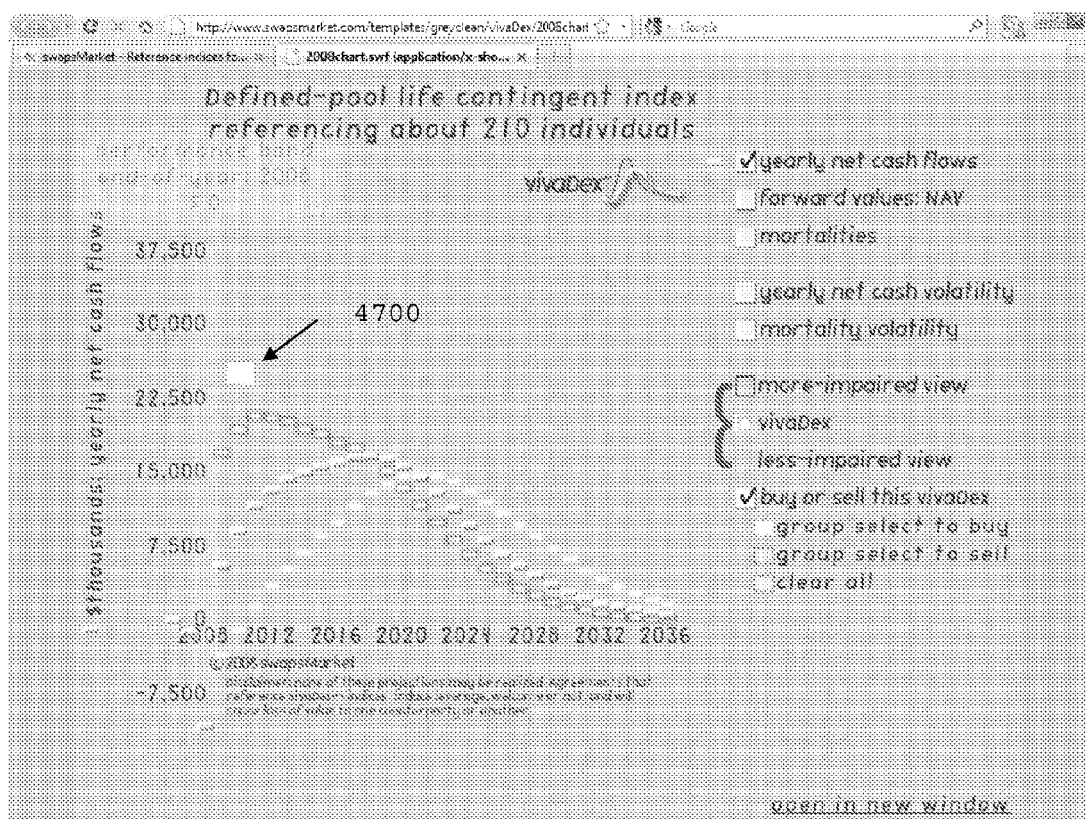
FIG. 47 is a screenshot according to the present invention.
Figure 48:
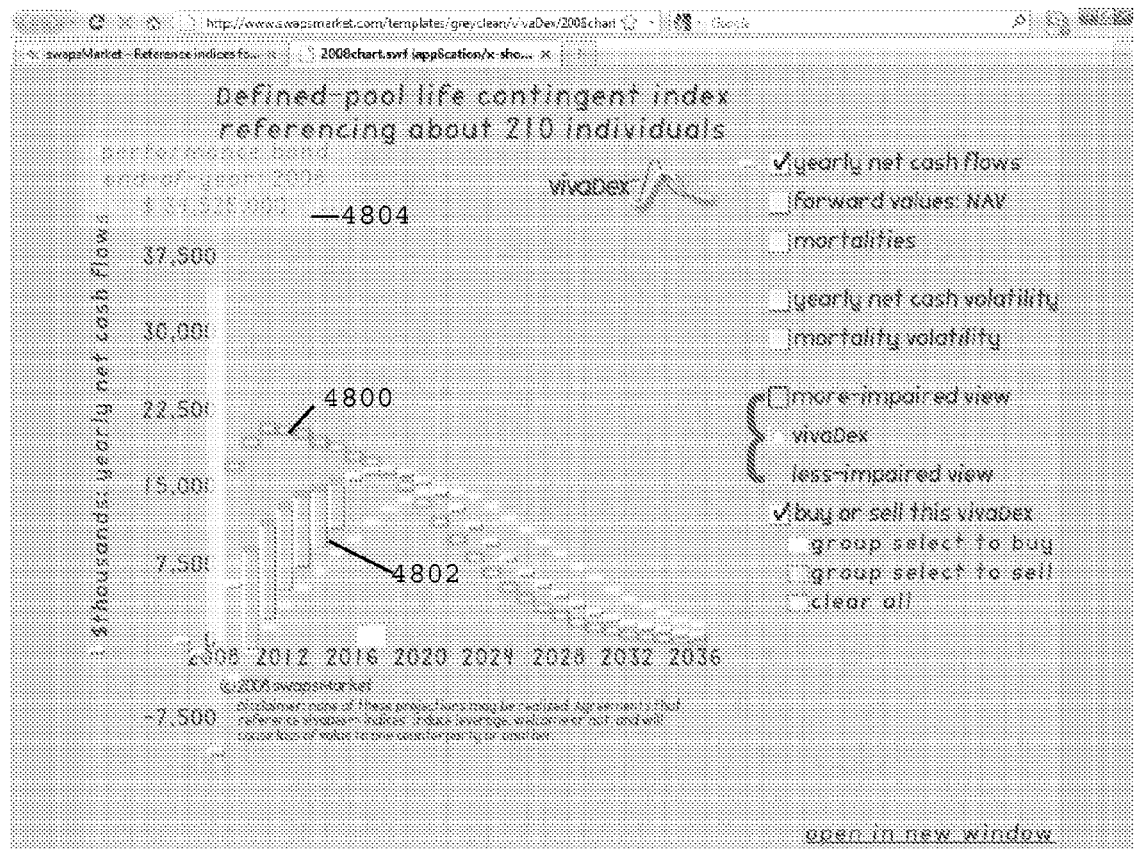
FIG. 48 is a screenshot according to the present invention.

FIG. 47 shows the user has selected a "group select to buy" tool (4700) and is about to drag a rectangle over the exposure period part of the chart. FIG. 48 shows the user selecting the exposure period (4800). The next part of the process is to compute the net present value of the performance bond, which in use is done automatically and simultaneously as the user drags over the years that will form the exposure period. In this example, the net present value of the performance bond to be lodged by the buyer is $34,525,000. That is the amount in cash or cash-equivalent that the buyer must lodge with a $3^{rd}$ party, and is the maximum amount the buyer can lose. This example shows what amounts to a forward contract, as the contract is entered into in 2008, but it references cash flows that will occur in the years 2010, 2011, 2012, 2013, 2014 and 2015.

Figure 49:
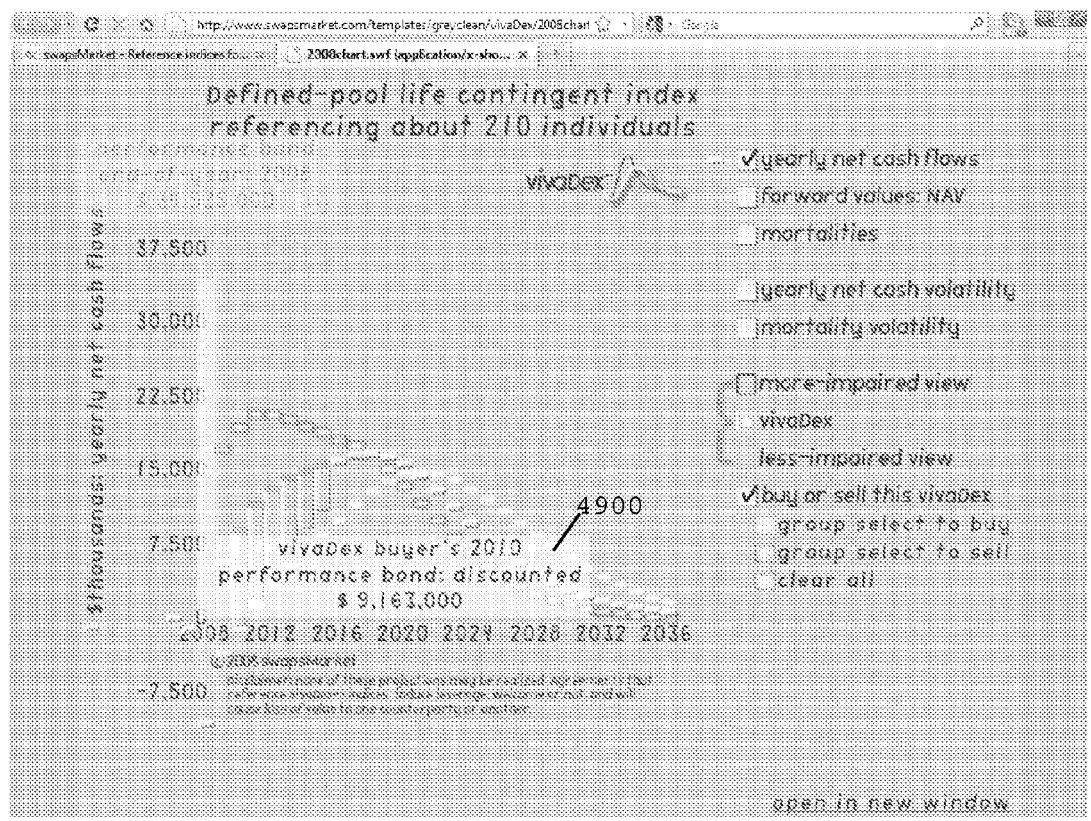
FIG. 49 is a screenshot according to the present invention.

The performance bond in total is a function (in this example, it is the sum) of performance bonds for each of the individual years. The performance bonds are stacked up visually in a tall white bar (4804) over the 2008 marker. As FIG. 49 shows, the base of the bar mouse rollover shows the performance bond just for 2010 as $9,163,000 (4900).

Figure 50:
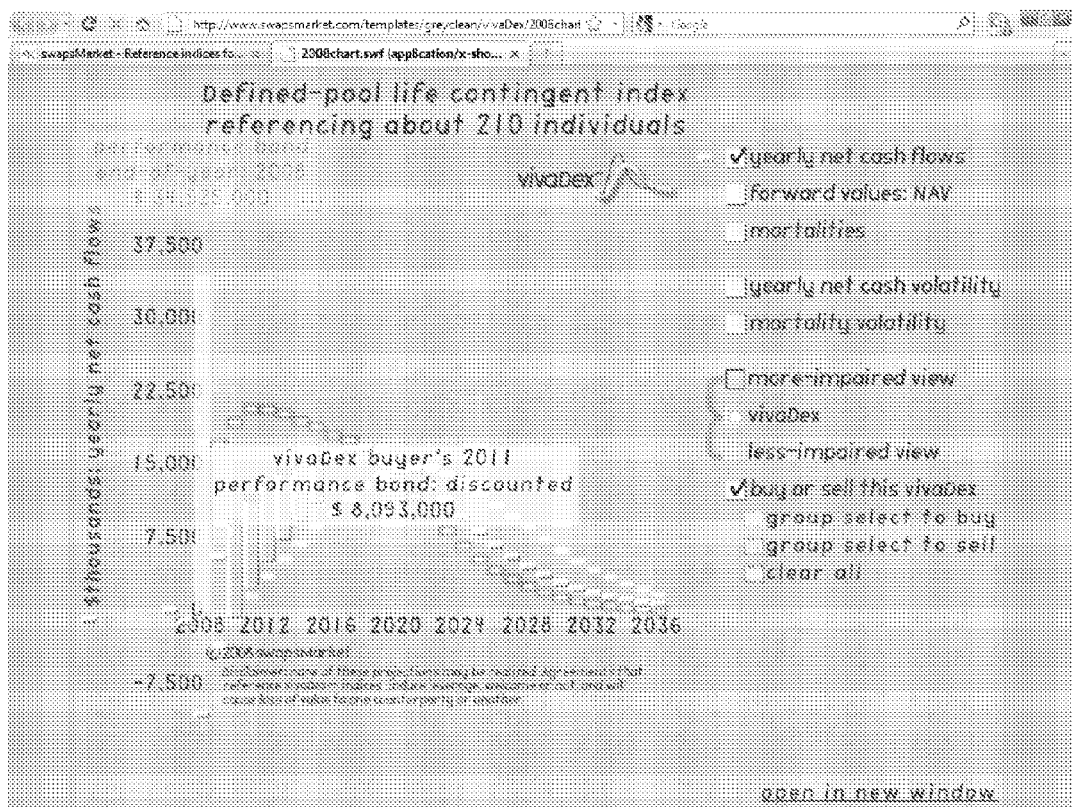
FIG. 50 is a screenshot according to the present invention.
Figure 51:
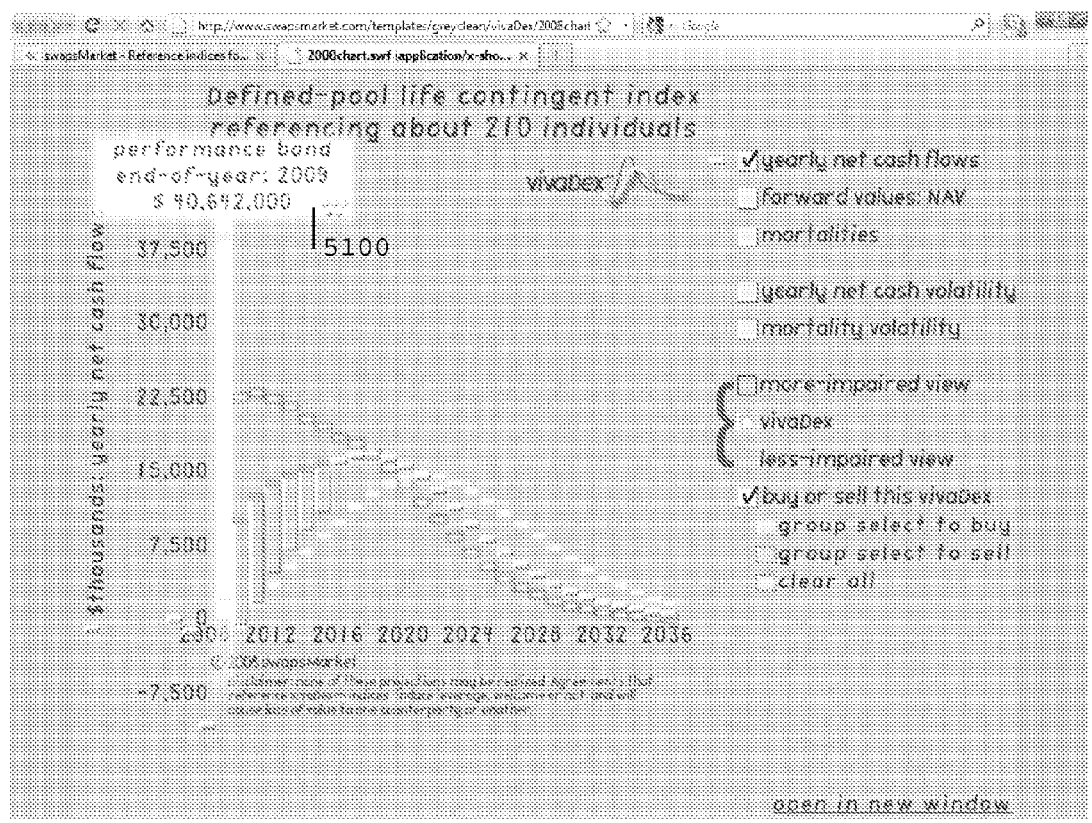
FIG. 51 is a screenshot according to the present invention.
Figure 52:
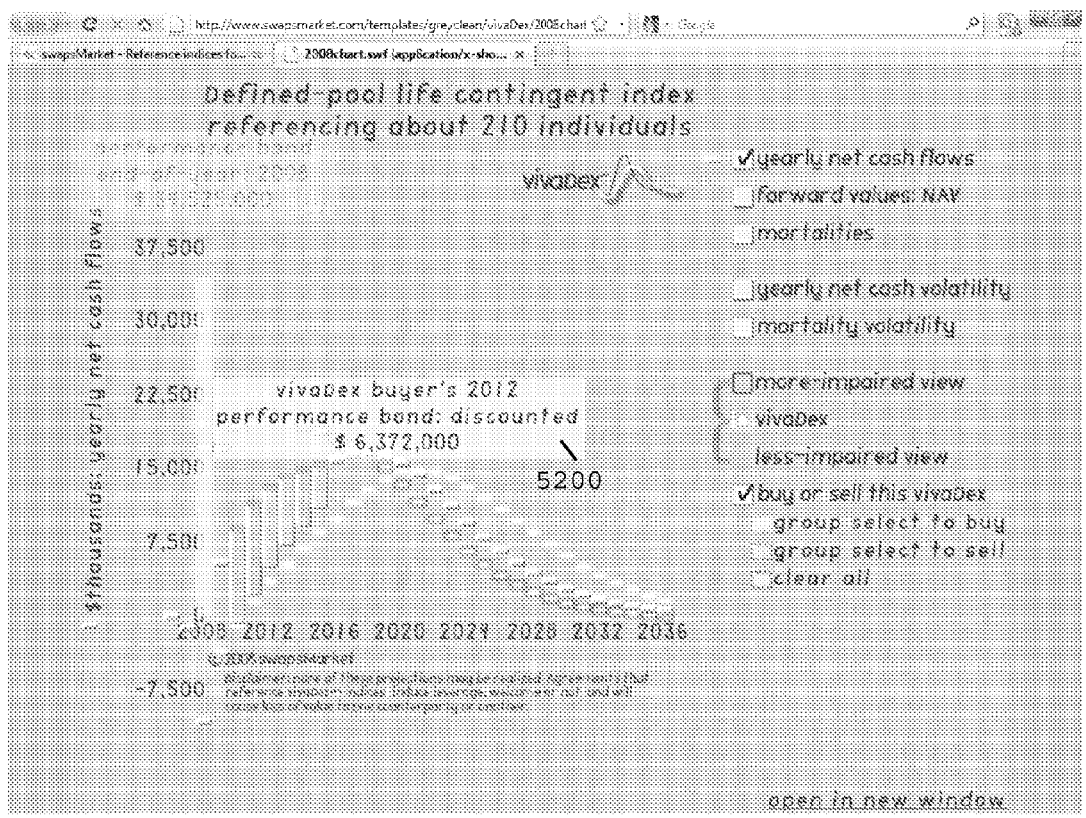
FIG. 52 is a screenshot according to the present invention.
Figure 53:
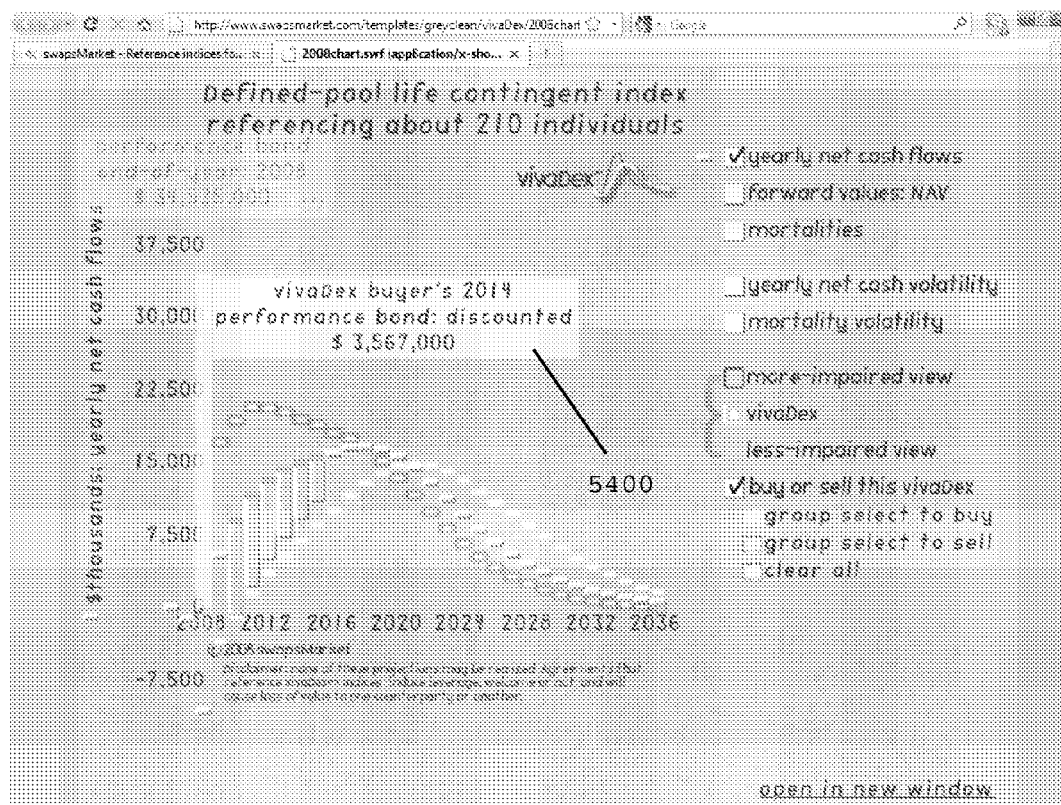
FIG. 53 is a screenshot according to the present invention.
Figure 54:
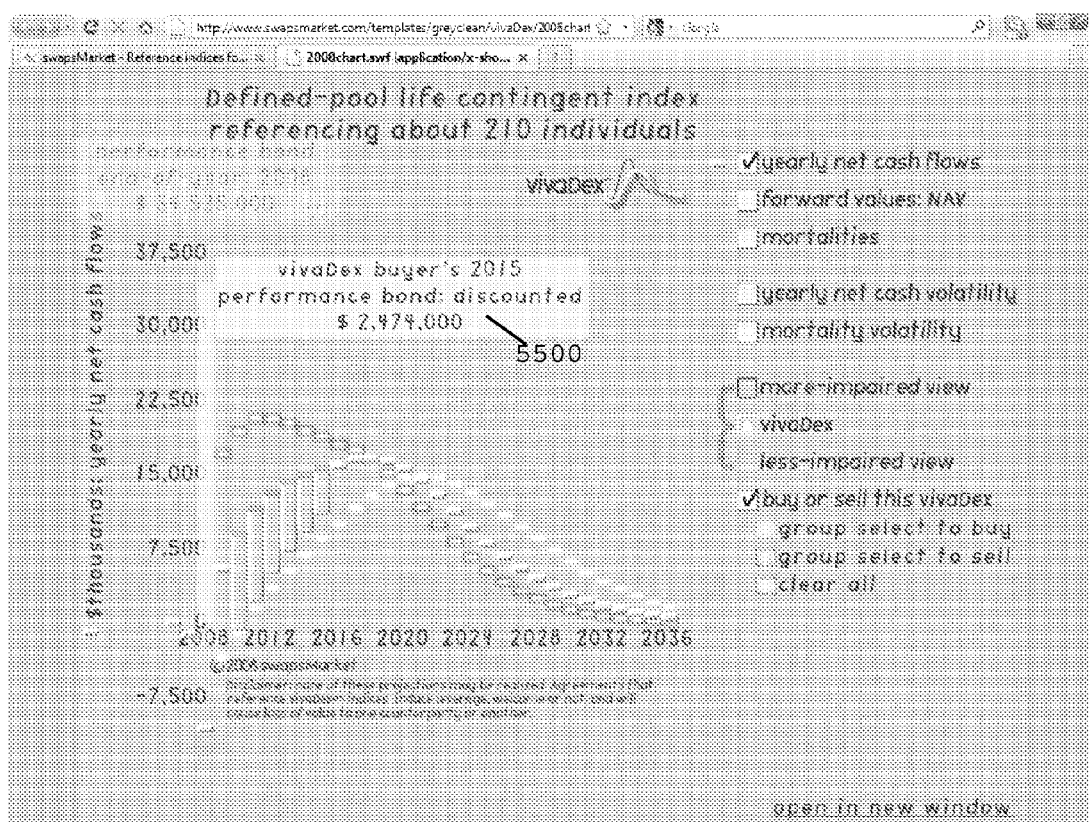
FIG. 54 is a screenshot according to the present invention.
Figure 55:
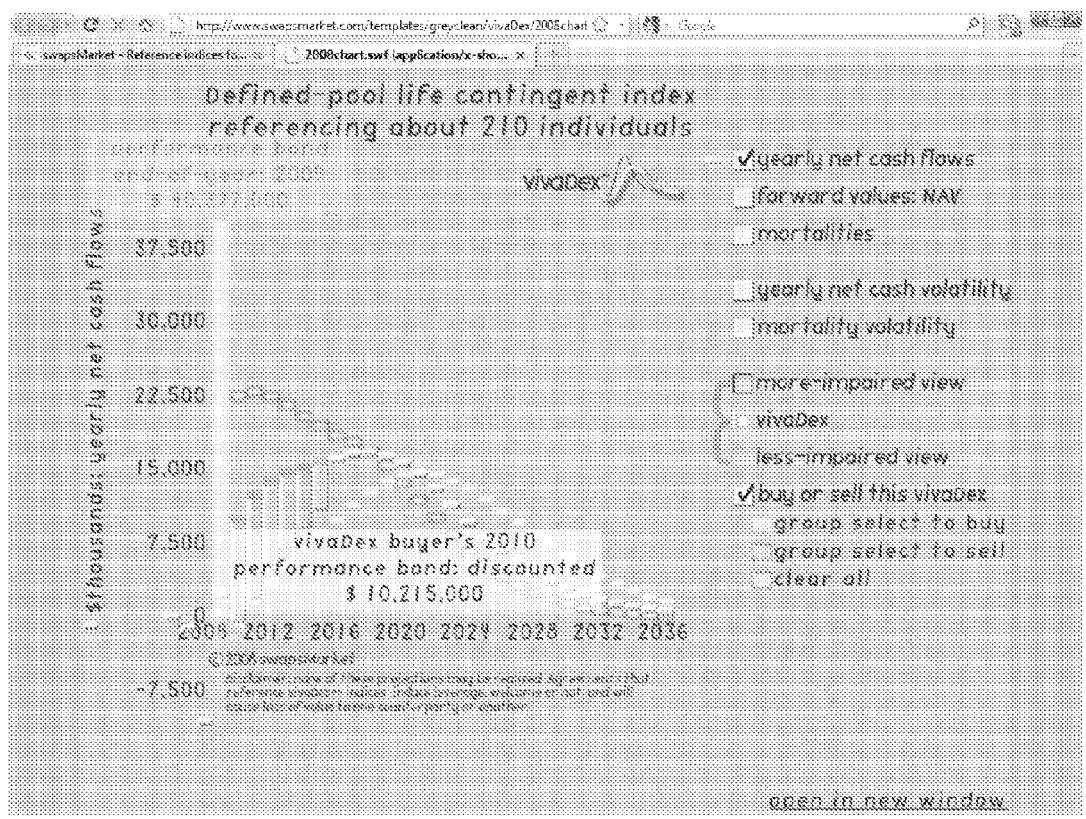
FIG. 55 is a screenshot according to the present invention.

FIG. 50 shows the performance bond for 2011. FIG. 51, moving forward, for illustration purposes, one year, we see net cash flow for 2009 was slightly less than anticipated, and so the performance bond net present value has gone up to $40,642,000 as illustrated (5100). FIG. 52 shows the performance bond for 2012 to be 6,372,000 (5200). FIG. 53 shows the performance bond for 2013 to be $4,856,00 (5300). FIG. 54 shows the performance bond for 2014 to be $3,567,000 (5400). FIG. 55 show the performance bond for 2015 to be $2,474,000 (5500).

Figure 56:
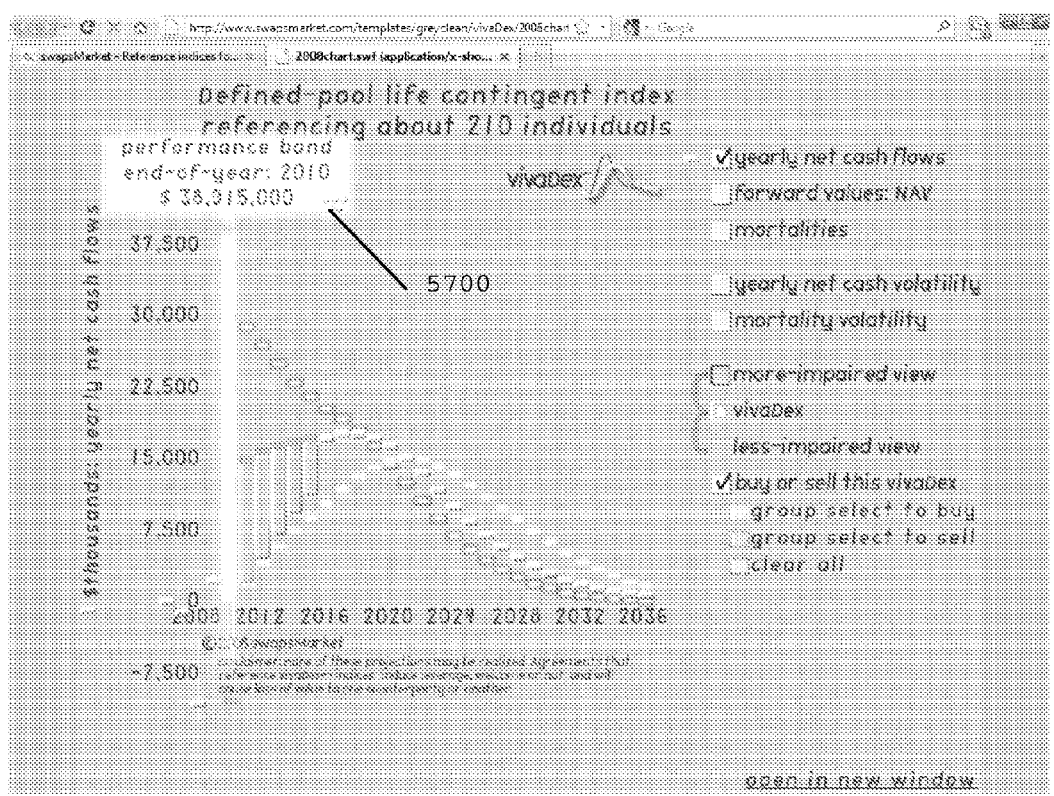
FIG. 56 is a screenshot according to the present invention.

For illustration purposes, we move through time one year, to end of 2009, and then recompute the performance bonds for each of the years, also discounted to the end of 2009. During 2009, using this scenario, the actual cash received during 2009 was slightly lower than expected, so the distributions are recomputed and performance bond recalculated as shown in FIG. 56. The total performance bond has increased, representing an immediate hedging profit to the buyer of $5,852,000 (cash distributed from the seller's performance bond to the buyer for the difference between $40,377,000 and $34,525,000). Note too that the performance bond for the year 2010 (shown in FIG. 56) has increased to $10,215,000). Other year's performance bonds are not shown, but their amounts, discounted to end of 2009, sum to $40,377,000. The following year, 2010, net yearly cash flow is substantially lower than expected, so the index buyer loses the entire performance bond for 2010 ($10,215,000), which is credited to the seller's account by the third party. Assuming the buyer took the first year's profit of $5,852,000 and did not add it to the original performance bond of $34,525,000, and taking account of the current year's loss to the buyer of $10,215,000, the buyer has only $24,310,000 left in buyer's account held as performance bond by the third party custodian.

As shown in FIG. 56, there are now only five years remaining of the original six year exposure period, however, the value of performance bond the buyer needs to lodge if the buyer wishes to be hedged fully must equal $38,915,000 (5700) which covers only the five remaining years' worth of performance bond. The buyer can either make up the difference by depositing $14,605,000 or accept being partially hedged.

If the buyer deposits zero or less than $14,605,000 and accepts being partially hedged, then the seller is automatically refunded the proportionate amount not put in by buyer, so that the transaction remains balanced, if not the same exposure magnitude as at the outset. Steps using generally accepted actuarial techniques to create the three survivorship functions and related mortality distributions, for each individual whose lifespan affects the value of the asset or liability. For each individual: Apply an appropriate (gender specific and, if it is known whether or not the individual smokes, smoking/non-smoking specific) life table. Life tables are also known as mortality tables or actuarial tables. An example of commonly used actuarial tables include the 2008 valuation basic tables (2008VBT) and 2001 valuation basic tables (2001 VBT) each published by the Society of Actuaries, available free of charge at http://www.soa.org/research/individual-life/2008-vbt-report-tables.aspx. Each life table contains, for each age up to some limit like age 115, a probability that an individual will die within the next year.

An individual with impaired health can be expected to have a shorter lifespan than an individual with average health. Depending on the individual's current health state and expected future health states for each year remaining of the individual's life, compute one or more mortality scaling factors. A mortality scaling factor, stated as a percentage, represents an indication of morbidity, at a point in time, as to the degree to which the individual can be considered more or less health-impaired than an individual with average health and having similar characteristics (i.e. age, gender, smoker/non-smoker). Factors that influence the estimation of a mortality scaling factor include morbidity, or degree of health-impairment due to disease, and other factors like socio-economic, education and occupation.

An individual who is perceived to be of average health may be assigned a mortality scaling factor of 100% for the next and all subsequent years, and will not change the values in the life table. An individual who is perceived to be currently in poor health may be assigned a mortality scaling factor of 150% for the next and all subsequent years, and will increase values in the life table. An individual who is perceived to be of unusually good health may be assigned a mortality scaling factor of 95% for the next and all subsequent years, and will decrease values in the life table. As a more complicated yet realistic example, an individual who currently has an illness that the individual will either succumb to within a few years or recover from within a few years may be assigned a temporary mortality scaling factor of 300% for the next few years, and mortality scaling factor of 110% for subsequent years. Values for nearer years in the life table will be increased more than values for later years. Estimating the degree of morbidity or relative health of an individual is frequently unreliable and is partly subjective. The medical condition and socio-economic status of an individual can and do change over time, sometimes unpredictably. To take partial account of the variance due to these unknowns, prepare three different impairment views for each individual: one view consistent with a median view of the health-impairment presented, one view assuming that the health-impairment of the individual is be one standard deviation more-impaired than the median view, and one view assuming the health-impairment of the individual is one standard deviation less-impaired than the median view. For each individual, and for each of the three impairment views, evaluate a set of mortality scaling factors. For each individual, and for each of the three impairment views, according to one embodiment, multiply the values from the life table with the one or more mortality scaling factors applicable to the individual for the individual's current age. For example, if the individual is currently aged 70, adjust 45 values from the table (to age 115). Repeat the process as if the individual was currently one year older: 71 to use the example above, which would mean adjusting 44 values from the table (to age 115). Repeat the above process, each time assuming the individual is currently one year older, until the assumed current age of the individual is 115. For each individual, and for each of the three impairment views, compute a survivorship distribution and the related probability density function. For a living individual, the survivorship function computes a value of 1 currently, indicating that as of this moment, the individual is 100% certain to be alive. Looking ahead at subsequent years, the certainty that an individual may be alive at any given future year drops below 1. Looking ahead to when an individual attains age 115, the survivorship function computes a value of zero, or very close to zero, indicating that the individual will almost certainly be dead by age 115. The probability density function is a function of the survivorship function. Mathematically, probability density function computes a distribution called, in actuarial science, a mortality distribution. The area under a mortality distribution sums to one. The term dynamic is intended to denote that distributions update as time The risk subset includes any longevity risk defined as expected variance about an assumed reference survivorship distribution, but specifically where the assumed reference survivorship distribution is not a good reflection of the actual underlying survivorship distribution. A user of my invention may perform a step to test whether: a) the real distribution is generally misunderstood or unknown, or b) the real distribution cannot be assumed normally distributed even at large numbers, but is so assumed, or c) one party to a risk transfer knows more than the other and deliberately allows an unrepresentative distribution to be used as reference (presence of information asymmetry). If a positive test, then there is a high likelihood that the underlying longevity risk is composed of at least two types of longevity risk: 'alpha' longevity risk and 'beta' longevity risk, and there may be the step of describing the survivorship distribution in terms of its kurtosis, skewness, polymodality and if necessary other distribution descriptors (not only the standard deviation which in isolation can adequately describe only a normal distribution). There may be a next step for the user to compute expected variance to define upper and lower boundary distributions typically chosen to be between 1 and 2 standard deviations, and then use these boundary distributions to compute the dollar value of the maximum-loss performance bond. This step ensures imperfect risk transfer where outlier risks are deliberately not transferred', and is practically the inverse of traditional risk-transfer methods which generally hedge lower-frequency but potentially more costly risks, including outliers, yet leave unhedged the higher-frequency less-costly risks. Advantage of the present invention includes that it protects by design the party who would be disadvantaged by information asymmetry, as downside and upside risks are capped using a performance bond. It also enables the transfer of most, but not all, longevity risk. If information asymmetry risks are present in the transaction (threatening to disadvantage one party), the portion of risk not transferred by using my method is most likely to be that risk stemming from information asymmetry rather than chance. Credit risk of either party is eliminated allowing a greater number of market participants to use the present invention to transfer longevity risk, not only banks, pension funds and insurance companies. However, any participant with funds equal to the performance bond can transfer longevity risk using the present invention.

Although the claimed subject matter has been fully described in connection with examples thereof with reference to the accompanying drawings, it is to be noted that various changes and modifications will become apparent to those skilled in the art. Such changes and modifications are to be understood as being included within the scope of the present disclosure as defined by the appended claims.

I claim:

1. A non-transitory computer readable medium tangibly embodying a software program or a plurality of software programs, comprising:

receiving an order through a computing device to trade a financial instrument in which counterparties agree to exchange a cash flow stream difference associated with, but not perfectly correlated to, at least one asset or liability affected by longevity risk characterized by underlying difficult to ascertain mortality distributions;

calculating by said computing device, for each said individual, whose lifespan affects the cash flows of said asset or liability, a morbidity description expressed as at least one mortality scaling factor for at least one age of each said individual, a survivorship distribution that varies with time and a mortality distribution that varies with time, a net cash flow projection distribution that varies with time, where each distribution value in said net cash flow projection distribution is computed as the probability-adjusted cash in-flow expected over a period, less the probability-adjusted cash out-flow expected over the same period;

calculating by said computing device, for each said individual, using said net cash flow projection distribution, a net present and net forward value distribution that varies with time;

accepting through a computer device, the starting and ending dates over which said counterparties wish to exchange said cash flow stream difference to be exchanged for each of said counterparties to provide at least one exposure period;

accepting through a computing device, an input for computing a performance bond amount to be levied on said counterparties, where said performance bond amount is insufficient to collateralize cash flow differences anticipated over said exposure period, and where said input uses data from either said net cash flow projection distribution or from said net present and net forward value distribution depending on the risk transfer preferences of the counterparties;

receiving through a computing device, over time, updated mortality information and morbidity information underlying said longevity risk; and recalculating by a computer-readable medium storing instructions executable by a processor, distributions affected by said updated mortality and morbidity information to provide recalculated distributions;

calculating, using said recalculated distributions, the difference to be exchanged for each of the counterparties wherein said difference to be exchanged cannot be greater than said performance bond for each of said counterparties.

2. The computer readable medium of claim 1, further comprising the step of:

accepting through a computing device, for each individual whose lifespan affects the cash flows of said asset or liability, three views of morbidity wherein each view is expressed as at least one mortality scaling factor for at least one age of each individual, where a first view is determined by generally accepted actuarial process to be the most likely match to the actual morbidity now and in the future, a second view is comparatively more-impaired than the most likely match, and where a third view is comparatively less-impaired than the most likely match.

3. The computer readable medium of claim 2, further comprising the step of:

computing a Monte Carlo simulation using mortality distributions drawn from a first view, a second view and a third view.

4. The computer readable medium of claim 1, wherein each said exposure period includes at least one calculation period, each said calculation period being no longer than said exposure period, and the exposure period being no longer than the expected maturity of the at least one asset or liability.

5. The computer readable medium of claim 1, wherein the counterparties include a seller and a buyer, further comprising the steps of:

incorporating the updated mortality and morbidity information, after each calculation period, computing said inputs and distributions, wherein if the cash flow stream as measured historically over the calculation period and projected over the remainder of the exposure period is determined to be lower than that which was computed at the beginning of the calculation period, the buyer becomes indebted to the seller for a calculated difference, and if the cash flow stream as measured historically over the calculation period and projected over the remainder of the exposure period is determined to be higher than that which was computed at the beginning of the calculation period, the seller becomes indebted to the buyer for a calculated difference.

6. The computer readable medium of claim 1, wherein the at least one exposure periods are at least two successive periods.

7. The computer readable medium of claim 1, wherein the mortality information includes whether fewer than or more than the expected number of mortality events occurred over the calculation period, and wherein the morbidity information includes any new information, or the lack of expected information, received over the calculation period.

8. The computer readable medium of claim 1, wherein said at least one asset or liability is selected from the group consisting of: any asset or liability affected by longevity risk, life settlement contracts, life insurance policies, annuities, reverse mortgages, long term health contracts, post employment benefits, and pensions.

9. The computer readable medium of claim 1, further comprising:

providing, via a user interface, a graphical representation, at any point in time, of the expected mortality distribution, net cash flow projection distribution, net present and net forward value distribution, and performance bond values for each calculation period of exposure and for the total exposure period, for both the buyer and seller.

10. The computer readable medium of claim 9, wherein the user interface simultaneously provides a first view for displaying a zoomed-in portion of the graphical representation and a second view for displaying a zoomed out portion of the graphical representation.

11. The computer readable medium of claim 1, further comprising:

providing, via a user interface, information disclosed by a person upon whom the longevity risk is, at least in part, based; and providing, via the user interface, interactive display controls to allow a user to adjust any of the said mortality scaling factors or said survivorship distributions, including said distributions' mean, median, mode, or polymodality, and moments about the mean including variance, skewness and kurtosis.

12. The computer readable medium of claim 1, further comprising the step of accepting through a computing device, at least one related cash flow projection function the result of which is a cash flow projection distribution description that will vary with time.

13. The computer readable medium of claim 1, further comprising the step of:

accepting through a computing device, for each individual longevity risk that affects the asset or liability, three survivorship and mortality inputs the result of which is three mortality distribution descriptions that will vary with time, a first mortality distribution description being a more impaired view, a second mortality distribution being an impaired view and a third mortality distribution being a less impaired view.

14. The computer readable medium of claim 1, wherein said step of computing a performance bond for each of said counterparties is according to at least one of said updated mortality information, morbidity information, survivorship, mortality, cash flow projection, net present value distribution and forward value distributions.

15. The computer readable medium of claim 1, wherein said difficult to ascertain mortality distributions are, individually or taken as a whole: a) generally misunderstood or unknown; b) cannot be assumed normally distributed even at large numbers, yet are generally assumed so; c) subject to information asymmetry.

16. The computer readable medium of claim 1, wherein said input is selected from the group consisting of function, a life table and distribution.

17. The computer readable medium of claim 1, wherein said risk transfer preferences are selected from the group consisting of generally accepted actuarial processes to be the most likely match to the actual morbidity now and in the future, comparatively more-impaired than the most likely match, and comparatively less-impaired than the most likely match.

* * * * *